United States Patent
Taquet et al.

(10) Patent No.: US 12,052,416 B2
(45) Date of Patent: Jul. 30, 2024

(54) ADAPTIVE LOOP FILTERING (ALF) WITH NON-LINEAR CLIPPING

(71) Applicant: CANON KABUSHIKI KAISHA, Tokyo (JP)

(72) Inventors: Jonathan Taquet, Talensac (FR); Christophe Gisquet, Acigne (FR); Guillaume Laroche, Saint Aubin d'Aubigné (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/355,933

(22) Filed: Jul. 20, 2023

(65) Prior Publication Data
US 2023/0370594 A1 Nov. 16, 2023

Related U.S. Application Data

(63) Continuation of application No. 17/415,654, filed as application No. PCT/EP2019/083066 on Nov. 29, 2019, now Pat. No. 11,750,804.

(30) Foreign Application Priority Data

Dec. 21, 2018 (GB) ..................................... 1821156
Feb. 8, 2019 (GB) ..................................... 1901775

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/136* (2014.11); *H04N 19/176* (2014.11); *H04N 19/86* (2014.11)

(58) Field of Classification Search
CPC ...... H04N 19/176; H04N 19/70; H04N 19/82; H04N 19/14; H04N 19/182; H04N 19/136; H04N 19/86; H04N 19/117; H04N 19/132
See application file for complete search history.

(56) References Cited

U.S. PATENT DOCUMENTS

| | | | |
|---|---|---|---|
| 2012/0183078 A1* | 7/2012 | Lai | H04N 19/82 375/E7.193 |
| 2013/0177068 A1* | 7/2013 | Minoo | H04N 19/117 375/240.02 |

(Continued)

FOREIGN PATENT DOCUMENTS

| | | |
|---|---|---|
| CN | 101754010 A | 6/2010 |
| EP | 3297282 A1 | 3/2018 |

OTHER PUBLICATIONS

Hyunho Jo, et al., Macroblock-Based Adaptive Loop Filter for Video Compression, 2011 International Conference on Multimedia and Signal Processing, IEEE Computer Society, 2011.

(Continued)

*Primary Examiner* — Neil R Mikeska
(74) *Attorney, Agent, or Firm* — Canon U.S.A., Inc. IP Division

(57) ABSTRACT

A method of controlling an Adaptive Loop Filter for one or more image portions of an image, the method comprising controlling filtering on a first sample of an image portion based on one or more neighbouring sample value(s) of the first sample value, wherein the controlling uses a nonlinear function which has one or more variables based on one or more of the neighbouring sample value(s).

6 Claims, 16 Drawing Sheets

(51) Int. Cl.
*H04N 19/136* (2014.01)
*H04N 19/176* (2014.01)
*H04N 19/86* (2014.01)

(56) References Cited

U.S. PATENT DOCUMENTS

2015/0016541 A1* 1/2015 Narroschke .......... H04N 19/117
　　　　　　　　　　　　　　　　　　　　　375/240.24
2021/0014488 A1* 1/2021 Ko ...................... H04N 19/176

OTHER PUBLICATIONS

Xiang Jin-Song, et al., Optimization of HEVC deblock filter algorithm, Journal of Optoelectronics, Laser, China Academic Journal Electronic Publishing House, vol. 29, No. 3, Mar. 2018.
Xi Ying, Research on H.264/AVC coding key algorithms and VLSI architecture, PhD thesis, Northwestern Polytechnical University, 2006, English abstract on page A3.

* cited by examiner

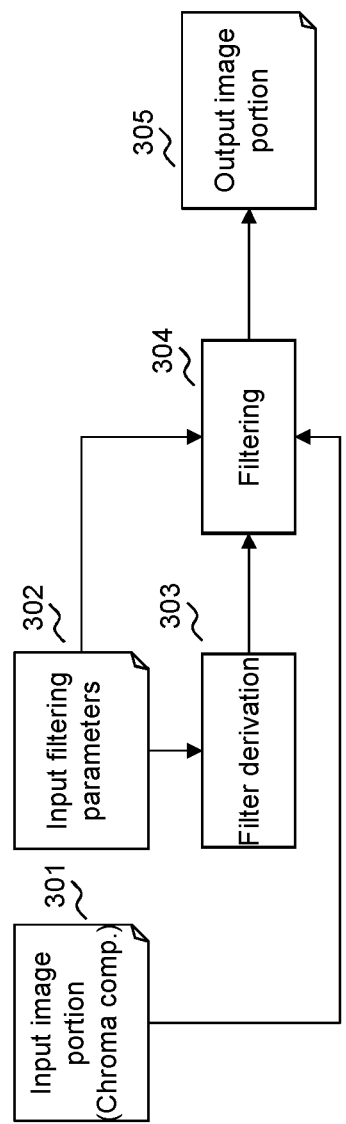
Fig. 3-b
Fig. 3-a

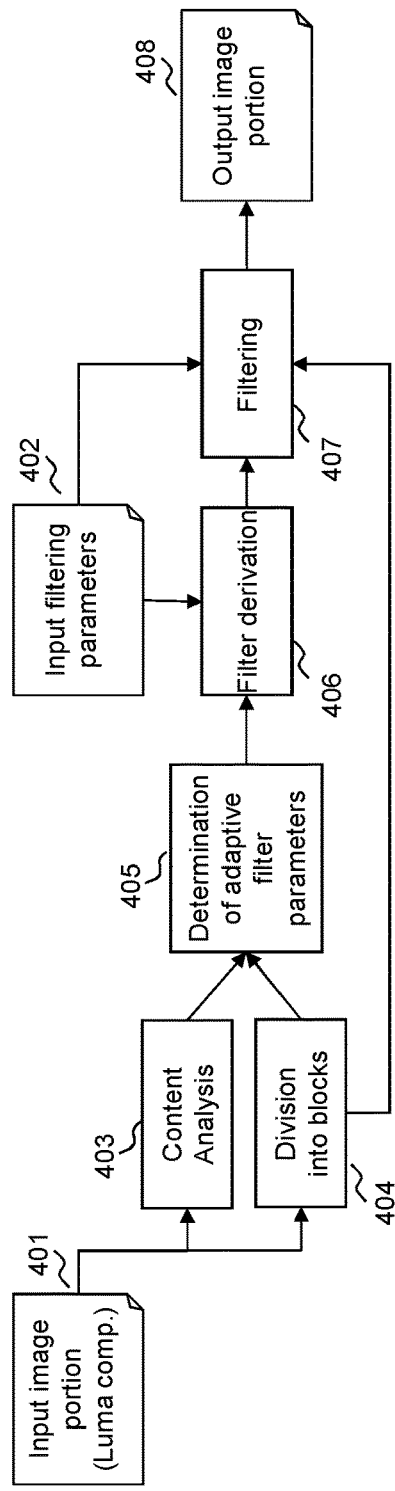
Fig. 4-a
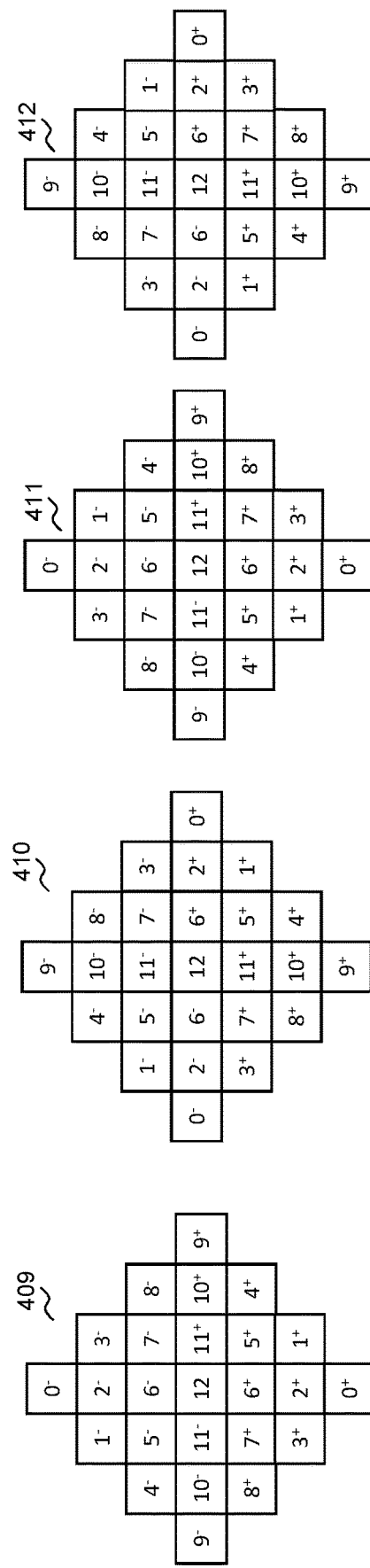
Fig. 4-b

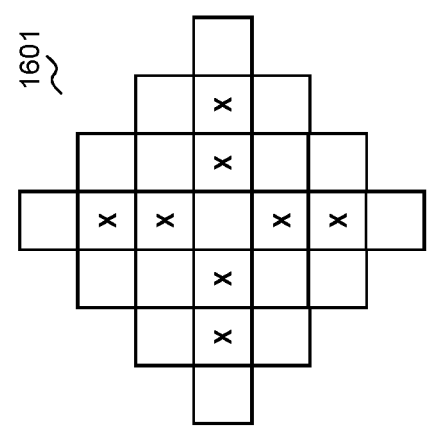
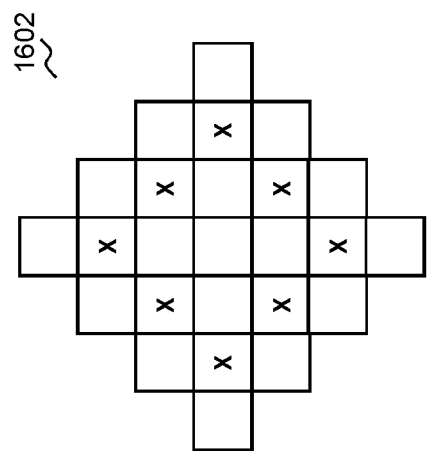
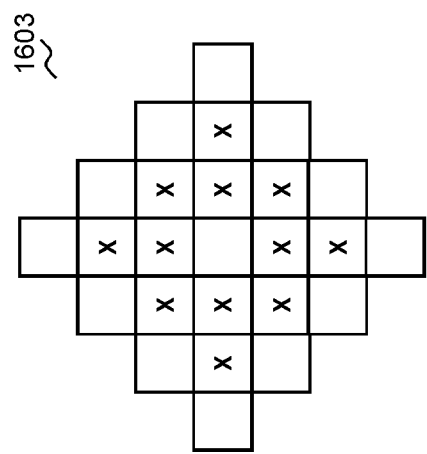
Fig. 16-a
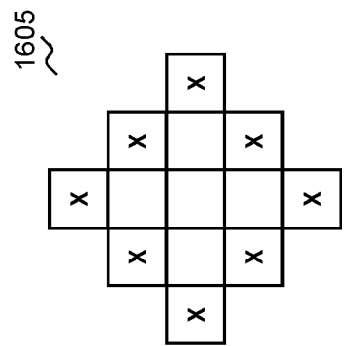
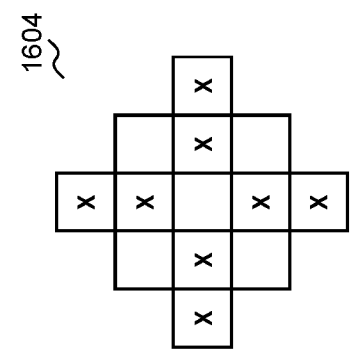
Fig. 16-b

ADAPTIVE LOOP FILTERING (ALF) WITH NON-LINEAR CLIPPING

CROSS-REFERENCE TO RELATED APPLICATIONS

This application is a continuation of U.S. patent application Ser. No. 17/415,654, filed on Jun. 17, 2021, which is the National Phase application of PCT Application No. PCT/EP2019/083066, filed on Nov. 29, 2019. This application claims the benefit under 35 U.S.C. § 119(a)-(d) of United Kingdom Patent Application No. 1821156.5, filed on Dec. 21, 2018 and United Kingdom Patent Application No. 1901775.5, filed on Feb. 8, 2019. The above cited patent applications are incorporated herein by reference in their entirety.

FIELD OF INVENTION

The present invention relates to encoding or decoding of blocks of a video component. Embodiments of the invention find particular, but not exclusive, use when controlling a filter for filtering samples of such component. In particular, but not exclusively, controlling an adaptive loop filter.

BACKGROUND

A video coding includes image coding (an image is equivalent to a single frame of a video). In video coding, some coding tools such as a quantization of transform coefficients or motion compensation (which is often performed using interpolation filters) often introduce distortion biases/effects (distortions that seem systematic or at least that are not random in a given context). In order to compensate for those biases/artefacts, and improve (or at least maintain a good level of) coding efficiency some specific coding tools, called post-filters or in-loop filters, are used. A Deblocking filter (DBF), a sample adaptive offset (SAO) filter or an adaptive loop filter (ALF) are some examples of such coding tools. In-loop filters are applied within a coding loop so that the image quality increase they provide for a current frame enables an increased coding efficiency for next frames which are coded based on the current one. For instance, quantisation of DCT coefficients is efficient for video compression but it often introduces blocking artefacts (biases) on the boundaries of compressed blocks of samples. The Deblocking filter reduces undesirable effects arising from such artefacts. Deblocking (using the DBF) a decoded frame within the coding loop (before it serves as a reference frame for the motion compensation for another frame) increases the coding efficiency of motion compensation significantly compared to deblocking the frame out of the coding loop (e.g. just before displaying it for instance).

The present invention relates particularly to the adaptive loop filter (ALF), which is also applied as an in-loop filter to reduce undesirable compression artefacts in decoded frames/images. ALF has been studied by the Video Coding Experts Group/Moving Picture Experts Group (VCEG/MPEG) standardisation groups, and it is being considered for use in the Versatile Video Coding (VVC) standard, for example in the third version of the VVC Test Model software (VTM-3.0 or VVC Draft version 3).

SUMMARY OF THE INVENTION

It is an aim of embodiments of the present invention to address one or more problems or disadvantages of the foregoing encoding or decoding of blocks of a video component.

Although ALF is an efficient coding tool, its linear filtering is a sub-optimal solution for improving image quality. The present invention enables non-linear filtering with ALF to improve its efficiency and/or performance.

According to aspects of the present invention there are provided an apparatus/device, a method, a program, a computer readable storage medium, and a signal as set forth in the appended claims. Other features of the invention will be apparent from the dependent claims, and the description.

According to a first aspect of the present invention there is provided a method of controlling an Adaptive Loop Filter for one or more image portions of an image, the method comprising controlling filtering on a first sample of an image portion based on one or more neighbouring sample value(s) of the first sample value, wherein the controlling uses a nonlinear function which has the one or more neighbouring sample value(s) as variables. Suitably, the variables of the nonlinear function comprise two or more neighbouring sample values. Suitably, the variables of the nonlinear function further comprise the first sample value and a first variable which is dependent on position(s) of the one or more neighbouring sample value(s). Suitably, the first variable is dependent on positions of two or more neighbouring sample values. Suitably, an output of the nonlinear function is used as an input (or input parameter) for the Adaptive Loop Filter.

According to a second aspect of the present invention there is provided a method of controlling a filter for one or more image portions of an image, the method comprising controlling filtering on a first sample of an image portion based on one or more neighbouring sample values of the first sample value, wherein the controlling uses a nonlinear function having a plurality of variables which comprise the first sample value, the one or more neighbouring sample values and a first variable, said first variable being dependent on position(s) of the one or more neighbouring sample values. Suitably, the plurality of variables comprises two or more neighbouring sample values. Suitably, the first variable is dependent on positions of two or more neighbouring sample values. Suitably, the filter is an Adaptive Loop Filter.

According to a third aspect of the present invention there is provided a method of controlling a filter for one or more image portions of an image, the method comprising controlling filtering on a first sample of an image portion based on one or more neighbouring sample value(s) of the first sample value, wherein the controlling uses one or more clipping function(s) with one or more control parameter(s) based on the first sample value, the one or more neighbouring sample values and a clipping parameter. Suitably, the one or more control parameter(s) is based on the first sample value, two or more neighbouring sample values and a clipping parameter. Suitably, the filter is an Adaptive Loop Filter. Suitably, each of the one or more clipping function(s) is one of: max(−b, min(b,d)), min(b, max(−b,d)), max(c−b, min(c+b,n)), or min(c+b, max(c−b,n)); and c is the first sample value, n is a neighbouring sample value, d=n−c, and b is the clipping parameter.

According to a fourth aspect of the present invention there is provided a method of controlling an Adaptive Loop Filter for one or more image portions of an image, the method comprising controlling filtering on a first sample of an image portion based on one or more neighbouring sample value(s) of the first sample value, wherein the controlling uses a nonlinear combination of the first sample value and the one or more neighbouring sample value(s) as an input parameter for the Adaptive Loop Filter. Suitably, the Adaptive Loop Filter is as specified in VTM3.0.

According to a fifth aspect of the present invention there is provided a method of controlling an Adaptive Loop Filter for one or more image portions of an image, the method comprising controlling filtering on a first sample of an image portion based on two or more neighbouring sample values of the first sample value, wherein the controlling uses a nonlinear combination of the two or more neighbouring sample values as an input parameter for the Adaptive Loop Filter. Suitably, the Adaptive Loop Filter is as specified in VTM3.0.

For the fourth and fifth aspects of the present invention, following features may be provided according to an embodiment thereof. Suitably, the nonlinear combination is a part of a nonlinear function. Suitably, the input parameters for the Adaptive Loop Filter further comprise a first variable, which is dependent on position(s) of the one or more neighbouring sample value(s). Suitably, the first variable is dependent on positions of two or more neighbouring sample values. Suitably, the nonlinear combination is of the first sample value, the one (or two or more) neighbouring sample value(s) and the first variable.

According to a sixth aspect of the present invention there is provided a method of processing one or more portions of an image, an image portion having associated therewith chroma samples and luma samples, wherein the method comprises determining, based on information obtained from a bitstream or a first sample value and its one or more neighbouring sample value(s) of the image portion, at least one of: whether to use or not use a filter controlled using the method according to the first aspect, the second aspect, the third aspect, the fourth aspect, or the fifth aspect; enabling or disabling use of said filter; or a filtering parameter for use with said filter when filtering on the first sample value. Suitably, the information obtainable from the bitstream comprises a flag or an index. Suitably, the information obtainable from the bitstream comprises one or more of: information for identifying said filter; a flag for indicating use or no use; a flag for indicating enabling or disabling; information about a first variable for use with said filter; or information about a clipping parameter for specifying a value range. Suitably, the information about the first variable is for specifying a value or identifying a first function as the first variable. Suitably, the first variable is dependent on (or is capable of varying based on) position(s) of the one or more neighbouring sample values. Suitably, the first variable is dependent on positions of two or more neighbouring sample values.

According to a seventh aspect of the present invention there is provided a method of encoding one or more image(s), the method comprising, for one or more portions of an image, controlling a filter according to the first aspect, the second aspect, the third aspect, the fourth aspect, or the fifth aspect, or processing according to the sixth aspect. Suitably, the method further comprises: receiving an image; encoding the received image and generating a bitstream; and processing the encoded image, wherein the processing comprises the controlling according to the first aspect, the second aspect, the third aspect, the fourth aspect, or the fifth aspect, or the processing according to the sixth aspect. Suitably, when dependent on the sixth aspect, the method further comprises providing said information in the bitstream. Suitably, the method further comprises: selecting the nonlinear function or the one or more clipping function(s) from a plurality of available functions; using the selected function when processing the encoded image; and providing, in the bitstream, information for identifying the selected function.

According to an eighth aspect of the present invention there is provided a method of decoding one or more image(s), the method comprising, for one or more portions of an image, controlling a filter according to the first aspect, the second aspect, the third aspect, the fourth aspect, or the fifth aspect, or processing according to the sixth aspect. Suitably, the method further comprises: receiving a bitstream; decoding information from the received bitstream to obtain an image; and processing the obtained image, wherein the processing comprises the controlling according to the first aspect, the second aspect, the third aspect, the fourth aspect, or the fifth aspect, or the processing according to the sixth aspect. Suitably, when dependent on the sixth aspect, the method further comprises obtaining said information from the bitstream. Suitably, the method further comprises: obtaining, from the bitstream, information for identifying the nonlinear function or the one or more clipping function(s) from a plurality of available functions; and using the identified function when processing the obtained image.

According to a ninth aspect of the present invention there is provided a device for controlling a filter for one or more portions of an image, the device comprising a controller configured to perform the method according to the first aspect, the second aspect, the third aspect, the fourth aspect, the fifth aspect, or the sixth aspect.

According to a tenth aspect of the present invention there is provided a device for encoding an image, the device comprising the control device according to the ninth aspect. Suitably, the device is configured to perform the method according to the seventh aspect.

According to an eleventh aspect of the present invention there is provided a device for decoding an image, the device comprising the control device according to the ninth aspect. Suitably, the device is configured to perform the method according to the eighth aspect.

According to a twelfth aspect of the present invention, there is provided a method of controlling an Adaptive Loop Filter for one or more image portions of an image, the method comprising controlling filtering of a first sample of an image portion based on a plurality of neighbouring sample values of the first sample value, wherein the controlling comprises using a nonlinear function, the nonlinear function having one or more variables based on one or more of the neighbouring sample value(s). It is understood that a neighbouring sample (value) is not limited to an adjacent sample (value), but also includes a sample (value) around or near the first sample (value). Suitably, the controlling comprises using, as input parameter(s) for the Adaptive Loop Filter, one or more neighbouring sample value(s) of one or more other neighbouring samples not used for determining, or as, a variable in the nonlinear function. Suitably, the neighbouring samples whose values are used for determining, or as, variables in one or more (or the) nonlinear function are arranged in a shape of: a cross with the first sample at the intersection; or a parallelogram. Suitably, the neighbouring samples whose values are used for determining, or as, variables in one or more (or the) nonlinear function are arranged in a shape of: when values of 8 neighbouring samples are used for determining, or as, variables in the nonlinear function, a cross of 5 samples high and 5 samples wide with the first sample at the intersection, or a hollow parallelogram with each side of 3 samples in length; or when values of 12 neighbouring samples are used for determining, or as, variables in one or more (or the) nonlinear function, a parallelogram with each side of 3 samples in length. Suitably, the cross with the first sample at the intersection (and/or at the centre) is one of: a cross of vertical and horizontal lines "+"; or a cross of oblique lines "X" (a diagonal cross). Suitably, the (hollow) parallelogram is one of: a square; a rectangle; or a diamond shape. Suitably, the (hollow) parallelogram is around, or surrounds, the first sample positioned at the centre. Alternatively, the neighbouring samples whose values are used for determining, or as, variables in one or more (or the) nonlinear function are arranged, with the first sample at the centre, in a shape of: a vertical line "|"; a horizontal line "-"; a diagonal/oblique line from top-left to bottom right "\"; or a diagonal/oblique line from top-right to bottom left "/". Alternatively, the neighbouring samples whose values are used for determining, or as, variables in one or more (or the) nonlinear function are arranged in a shape of a (hollow) polygon. Suitably, the (hollow) polygon is around, or surrounds, the first sample position at the centre. Alternatively, the neighbouring samples whose values are used for determining, or as, variables in one or more (or the) nonlinear function are arranged in a shape of any combination of the aforementioned shapes. Suitably, a filter variable is shared between two or more neighbouring samples. Suitably, the arrangement shape of the neighbouring samples has a symmetry about the centre. Suitably, the cross shape, the parallelogram shape, or the polygon shape has a symmetry about the centre. Alternatively, the shape of arrangement of the neighbouring samples does not have a symmetry about the centre. Suitably, the cross shape or the parallelogram shape does not have a symmetry about the centre. Suitably, the first sample and the neighbouring samples of the plurality of neighbouring sample values are arranged in a shape of: a cross with the first sample at the intersection; or a parallelogram or a hollow parallelogram. Suitably, the first sample and the neighbouring samples of the plurality of neighbouring sample values are arranged in a shape of a parallelogram with: each side of 4 samples in length when the plurality of neighbouring sample values consists of sample values of 24 neighbouring samples; or each side of 3 samples in length when the plurality of neighbouring sample values consists of sample values of 12 neighbouring samples. Suitably, the cross with the first sample at the intersection (and/or at the centre) is one of: a cross of vertical and horizontal lines "+"; or a cross of oblique lines "X" (a diagonal cross). Suitably, the (hollow) parallelogram is one of: a square; a rectangle; or a diamond shape. Suitably, the (hollow) parallelogram is around, or surrounds, the first sample positioned at the centre. Alternatively, the first sample and the neighbouring samples of the plurality of neighbouring sample values are arranged, with the first sample at the centre, in a shape of: a vertical line "|"; a horizontal line "-"; a diagonal/oblique line from top-left to bottom right "\"; or a diagonal/oblique line from top-right to bottom left "/". Alternatively, the first sample and the neighbouring samples of the plurality of neighbouring sample values are arranged in a shape of a (hollow) polygon. Suitably, the (hollow) polygon is around, or surrounds, the first sample position at the centre. Alternatively, the first sample and the neighbouring samples of the plurality of neighbouring sample values are arranged in a shape of any combination of the aforementioned shapes. Suitably, a filter variable is shared between two or more neighbouring samples. Suitably, the arrangement shape of the neighbouring samples has a symmetry about the centre. Suitably, the cross shape, the parallelogram shape, or the polygon shape has a symmetry about the centre. Alternatively, the arrangement shape of the neighbouring samples does not have a symmetry about the centre. Suitably, the cross shape, the parallelogram shape, or the polygon shape does not have a symmetry about the centre. Suitably, the first sample and said neighbouring samples are luma component samples. Alternatively, the first sample and said neighbouring samples are chroma component samples. Suitably, the variables of the (or one or more) nonlinear function further comprise the first sample value, and the (or the one or more) nonlinear function is applied to difference between the first sample value and each of the one or more neighbouring sample value(s). Suitably, the variables of the (or the one or more) nonlinear function further comprise the first sample value and one or more filter variable(s) which are dependent on position(s) of the one or more neighbouring samples, each filter variable being the same for two or more neighbouring samples; and the (or the one or more) nonlinear function is applied to a sum of two or more differences between the first sample value and each one of the two or more neighbouring sample values of the two or more neighbouring samples that have the same filter variable. Suitably, an output of the (or the one or more) nonlinear function is used as an input (or input parameter) for the Adaptive Loop Filter. Suitably, the nonlinear function comprises one or more clipping function(s), and each of the one or more clipping function(s) is one of: max(−b, min(b,d)), min(b, max(−b,d)), max(c−b, min(c+b,n)), min(c+b, max(c−b,n)), max(−b, min(b,d1+d2)), min(b, max(−b,d1+d2)), max (2*c−b, min(2*c+b,n1+n2)), or min(2*c+b, max(2*c−b,n1+n2)) wherein c is the first sample value, n or n1 or n2 is a neighbouring sample value, d=n−c, d1=n1−c, d2=n2−c, and b is a clipping parameter.

According to a thirteenth aspect of the present invention, there is provided a method of processing one or more portions of an image, an image portion having associated therewith chroma samples and luma samples, wherein the method comprises determining, based on information obtained from a bitstream or a first sample value and its one or more neighbouring sample value(s) of the image portion, at least one of: whether to use or not use a filter controlled using the method of the twelfth aspect; enabling or disabling use of said filter; or a filtering parameter or a filter variable for use with said filter when filtering the first sample value. Suitably, the information obtained from the bitstream comprises a flag provided for one of luma or chroma component, the flag indicating for that component at least one of: whether to use or not use the filter controlled using the method of the twelfth aspect; or enabling or disabling use of said filter. Suitably, the flag is provided in an adaptation parameter set. Suitably, the information obtained from the bitstream comprises a flag provided for the one or more image portions, the flag indicating for one or more image portions at least one of: whether to use or not use the filter controlled using the method of the twelfth aspect; or enabling or disabling use of said filter. Suitably, the flag is provided in an adaptation parameter set.

According to a fourteenth aspect of the present invention, there is provided a method of encoding one or more image(s), the method comprising, for one or more portions of an image, controlling a filter according to the method of the twelfth aspect, or processing according to the method of the thirteenth aspect. Suitably, the method further comprises: receiving an image; encoding the received image and generating a bitstream; and processing the encoded image, wherein the processing comprises the controlling according to the method of the twelfth aspect, or the processing according to the method of the thirteenth aspect. Suitably, the method (when dependent on the thirteenth aspect) further comprises providing said information in the bitstream. Suitably, the nonlinear function comprises one or more clipping function(s); the variables of the (or one or more) nonlinear function further comprise one or more filter variable(s) which are dependent on position(s) of the one or more neighbouring samples whose values are used as variables in the (or the one or more) nonlinear function; providing said information comprises providing one or more clipping parameter(s) in the bitstream; and when a filter variable for a position is zero, a clipping parameter for use with the clipping function to be applied to the neighbouring sample value of the neighbouring sample at that position is not provided in the bitstream. Suitably, the method further comprises: selecting the nonlinear function or the one or more clipping function(s) from a plurality of available functions; using the selected function when processing the encoded image; and providing, in the bitstream, information for identifying the selected function.

According to a fifteenth aspect of the present invention, there is provided a method of decoding one or more image(s), the method comprising, for one or more portions of an image, controlling a filter according to the method of the twelfth aspect, or processing according to the method of the thirteenth aspect. Suitably, the method further comprises: receiving a bitstream; decoding information from the received bitstream to obtain an image; and processing the obtained image, wherein the processing comprises the controlling according to the method of the twelfth aspect, or the processing according to the method of the thirteenth aspect. Suitably, the method (when dependent on the thirteenth aspect) further comprises obtaining said information from the bitstream. Suitably, the nonlinear function comprises one or more clipping function(s); the variables of the (or one or more) nonlinear function further comprise one or more filter variable(s) which are dependent on position(s) of the one or more neighbouring samples whose values are used as variables in the (or the one or more) nonlinear function; and when a filter variable for a position is zero, a clipping function is not applied to the neighbouring sample value of the neighbouring sample at that position. Suitably, the method further comprises: obtaining, from the bitstream, information for identifying the nonlinear function or the one or more clipping function(s) from a plurality of available functions; and using the identified function when processing the obtained image.

According to a sixteenth aspect of the present invention, there is provided a device comprising: a controller configured to perform the method of the twelfth aspect or the thirteenth aspect; an encoder configured to perform the method of the fourteenth aspect; or a decoder configured to perform the method of the fifteenth aspect.

According to a seventeenth aspect of the present invention, there is provided a device for controlling a filter for one or more portions of an image, the device comprising a controller configured to perform the method of the twelfth aspect or the thirteenth aspect.

According to an eighteenth aspect of the present invention, there is provided a device for encoding an image, the device comprising the control device of the seventeenth aspect. Suitably, the device is configured to perform the method of the fourteenth aspect.

According to a nineteenth aspect of the present invention, there is provided a device for decoding an image, the device comprising the control device of the seventeenth aspect. Suitably, the device is configured to perform the method of the fifteenth aspect.

According to a twentieth aspect of the present invention there is provided a program which, when run on a computer or processor, causes the computer or processor to carry out the method according to the first aspect, the second aspect, the third aspect, the fourth aspect, the fifth aspect, the sixth aspect, the seventh aspect, the eighth aspect, the twelfth aspect, the thirteenth aspect, the fourteenth aspect, or the fifteenth aspect.

According to a twenty-first aspect of the present invention there is provided a computer-readable storage medium storing a computer program according to the twentieth aspect.

According to a twenty-second aspect of the present invention there is provided a signal carrying an information dataset for an image encoded using the method according to the seventh aspect, or the fourteenth aspect, and represented by a bitstream, the image comprising a set of reconstructable samples, each reconstructable sample having a sample value, wherein the information dataset comprises control data for controlling filtering on a first reconstructable sample based on sample values of neighbouring samples of the first reconstructable sample.

For the aforementioned aspects of the present invention, following features may be provided according to an embodiment thereof. Suitably, the nonlinear function comprises one or more of a clipping function, a sawtooth kernel function, a triangle kernel function, or a Gaussian kernel function. Suitably, the nonlinear function comprises one or more clipping function(s), and each of the one or more clipping function(s) is one of: $\max(-b, \min(b,d))$, $\min(b, \max(-b,d))$, $\max(c-b, \min(c+b,n))$, $\min(c+b, \max(c-b,n))$, $\max(-b, \min(b,d1+d2))$, $\min(b, \max(-b,d1+d2))$, $\max(2*c-b, \min(2*c+b,n1+n2))$, or $\min(2*c+b, \max(2*c-b,n1+n2))$ wherein c is the first sample value, n or n1 or n2 is a neighbouring sample value, $d=n-c$, $d1=n1-c$, $d2=n2-c$, and b is a clipping parameter Suitably, the (plurality of) variables are independent variables of the (mathematical) nonlinear function, with the output of the nonlinear function being the dependent variable thereof. Suitably, a position of a neighbouring sample is defined as a relative distance or a relative displacement from the position of the first sample. Suitably, a position of a neighbouring sample is defined as its position in a (raster) scan order (suitably, in relation to the first sample's position in the (raster) scan order). Suitably, the Adaptive Loop Filter performs the filtering using the nonlinear function. Suitably, an output of the nonlinear function is used as an input (or input parameter) for the Adaptive Loop Filter. Suitably, applying the Adaptive Loop Filter on one or more such input (parameter(s)) comprises using a linear function with the one or more input (parameter(s)) as its variables. Suitably, the Adaptive Loop Filter is as specified in VTM3.0.

Yet further aspects of the present invention relate to programs which when executed by a computer or processor cause the computer or processor to carry out any of the methods of the aforementioned aspects. The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Yet further aspects of the present invention relate to a camera comprising a device according to any of the aforementioned device aspects. According to yet another aspect of the present invention there is provided a mobile device comprising a device according to any of the aforementioned device aspects and/or a camera embodying the camera aspect above.

Any feature in one aspect of the invention may be applied to other aspects of the invention, in any appropriate combination. In particular, method aspects may be applied to apparatus aspects, and vice versa. Furthermore, features implemented in hardware may be implemented in software, and vice versa. Any reference to software and hardware features herein should be construed accordingly. Any apparatus feature as described herein may also be provided as a method feature, and vice versa. As used herein, means plus function features may be expressed alternatively in terms of their corresponding structure, such as a suitably programmed processor and associated memory. It should also be appreciated that particular combinations of the various features described and defined in any aspects of the invention can be implemented and/or supplied and/or used independently.

BRIEF DESCRIPTION OF THE DRAWINGS

Embodiments of the invention will now be described, by way of example only, and with reference to the following drawings in which:

FIG. 3-a is a flow chart illustrating steps for filtering a Chroma component according to an embodiment of the invention;

FIG. 3-b provides a filter shape and coefficient arrangement for a Chroma filter according to an embodiment of the invention;

FIG. 4-a is a flow chart illustrating steps for filtering a Luma component according to an embodiment of the invention;

FIG. 4-b provides a filter shape and four possible coefficient arrangements for a Luma filter according to an embodiment of the invention;

FIG. 16-a provides 7×7 diamond filter shapes with reduced number of clipped positions according to embodiments of the invention; and FIG. 16-b provides 5×5 diamond filter shapes with reduced number of clipped positions according to embodiments of the invention.

DETAILED DESCRIPTION

Embodiments of the present invention described below relate to improving encoding and decoding of images.

In this specification "signalling" may refer to inserting into (providing/including/encoding in), or extracting/obtaining (decoding) from, a bitstream information about one or more parameters for controlling a filter, for example use, disuse, enabling, or disabling of a mode/scheme or other filter control related information.

It this specification, the term "slice" is used as example of an image portion (other examples of such an image portion would be a tile or a tile group, which is a group/set of tile(s)). It is understood that embodiments of the invention may also be implemented based on an image portion (e.g. a tile or a tile group), instead of a slice, and an appropriately modified parameter/value/syntax such as a header for the image portion/tile/tile group (instead of a slice header), a type of an image portion/tile/tile group (instead of a slice type), and statistics for an image portion/tile/tile group (instead of slice statistics). It is also understood that in embodiments of the invention an adaptation parameter set (APS) or a tile (group) header may also be used to signal ALF parameters (or information for using ALF filtering), instead of a slice header or a sequence parameter set (SPS). When APS is used for signalling the ALF parameters (or information for using ALF filtering), the slice header or the tile group header may be used to indicate which APS has to be used for obtaining the ALF parameters (or information for using ALF filtering), for example by indicating an adaptation set identifier (aps_id). It is also understood that any of a slice, a tile group, a tile, a Coding Tree Unit (CTU)/Largest Coding Unit (LCU), a Coding Tree Block (CTB), a Coding Unit (CU), a Prediction Unit (PU), a Transform Unit (TU), or a block of pixels/samples may be referred to as an image portion.

It is also understood that: when a filter or a tool is described as "active", the filter/tool is "enabled" or "available for use" or "used"; when described as "inactive", the filter/tool is "disabled" or "unavailable for use" or "not used"; and a "class" refers to a group, grouping, category, or classification of one or more elements. Further, it is also understood that when a flag is described as "active" it means the flag indicates the relevant filter/tool is "active".

Adaptive Loop Filter (ALF)

Figure 1:
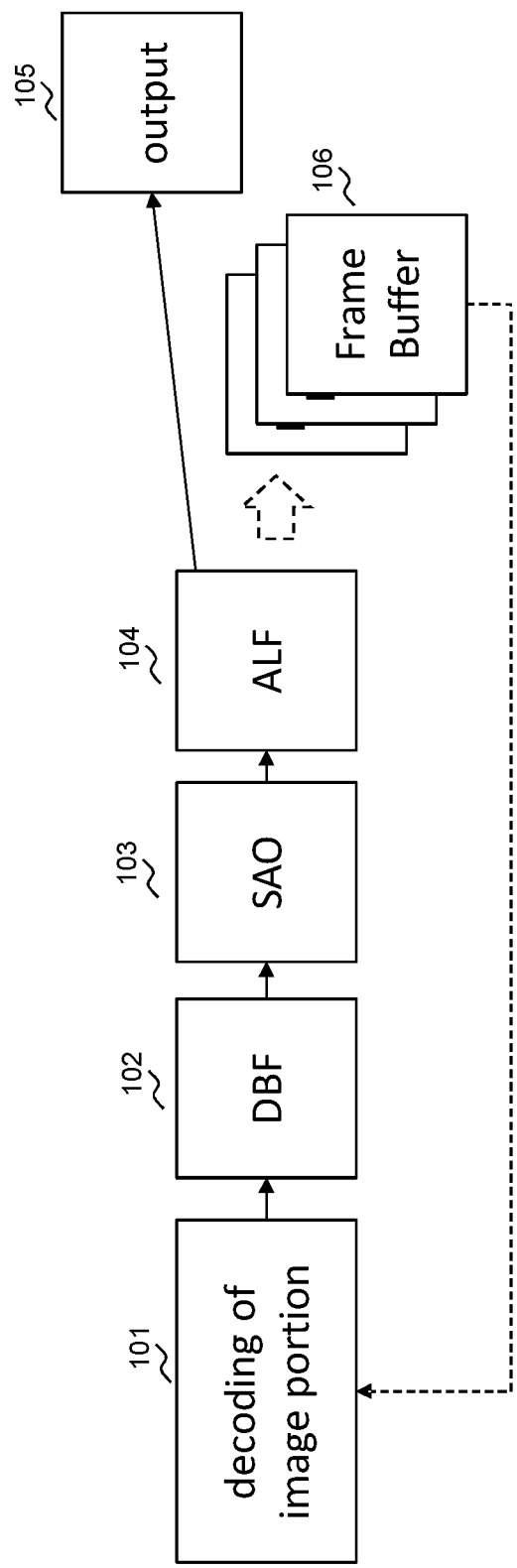
FIG. 1 shows where ALF takes place in a typical decoding loop of VTM-3.0.

FIG. 1 shows where ALF takes place in a typical decoding loop of VTM-3.0. In 101, an image portion (e.g. a slice) is decoded, in units of a coding tree unit (CTU: the largest coding unit in VVC, typically of 128×128 sample/pixel size). A CTU is split into rectangular blocks, or coding units (CU), that are encoded using a particular prediction scheme/mode and, often, a lossy encoding of a residual block. Due to use of the block based encoding, blocking artefacts may be visible at the boundaries between encoded blocks. In 102, the decoded image portion is then processed by the DBF to reduce/remove those artefacts. Typically, to encode the residual (block) for a block prediction, the residual values are transformed using a DCT-like transform (in order to compress the residual energy in a few coefficients), and the transformed coefficients are quantized to reduce the encoding cost. This quantization often introduces some ringing artefacts in reconstructed blocks (i.e. blocks in reference frames stored in the Frame Buffer 106). In 103, the output image portion of DBF is then processed by the SAO filter, which is useful in reducing some of these artefacts at a low computational cost. In 104, the output image portion of the SAO filter is then processed by the ALF. The ALF can further reduce artefacts like "ringing" for instance. The ALF has a higher order error modelling capability but it is at a higher computational cost. The output image portion of the ALF is then sent to an output (e.g. a display or a communication interface for communicating with the display) 105. It can also be put in a frame buffer 106 (as a portion of a reference frame stored therein) so that it can be used for temporal prediction (when temporal prediction tools are used). This is why DBF, SAO filter and ALF are called "in-loop" filters. An encoder may disable some of the in-loop filters so that at the decoding they may be bypassed (i.e. no filtering is performed and the output of a step corresponding to the disabled tool is the same as its input). Also, in some cases the image portion processed is not limited to a slice but may be a full frame containing one or multiple slices, with the possibility of applying the filters across the slice boundaries (if more than one present), to reduce the artefact on those boundaries. For multi-components images (e.g. an image in YCrCb format) the DBF, SAO filter or ALF processing are applied to each component individually, and possibly differently (e.g. using a different filtering parameter to the other component).

Figure 2:
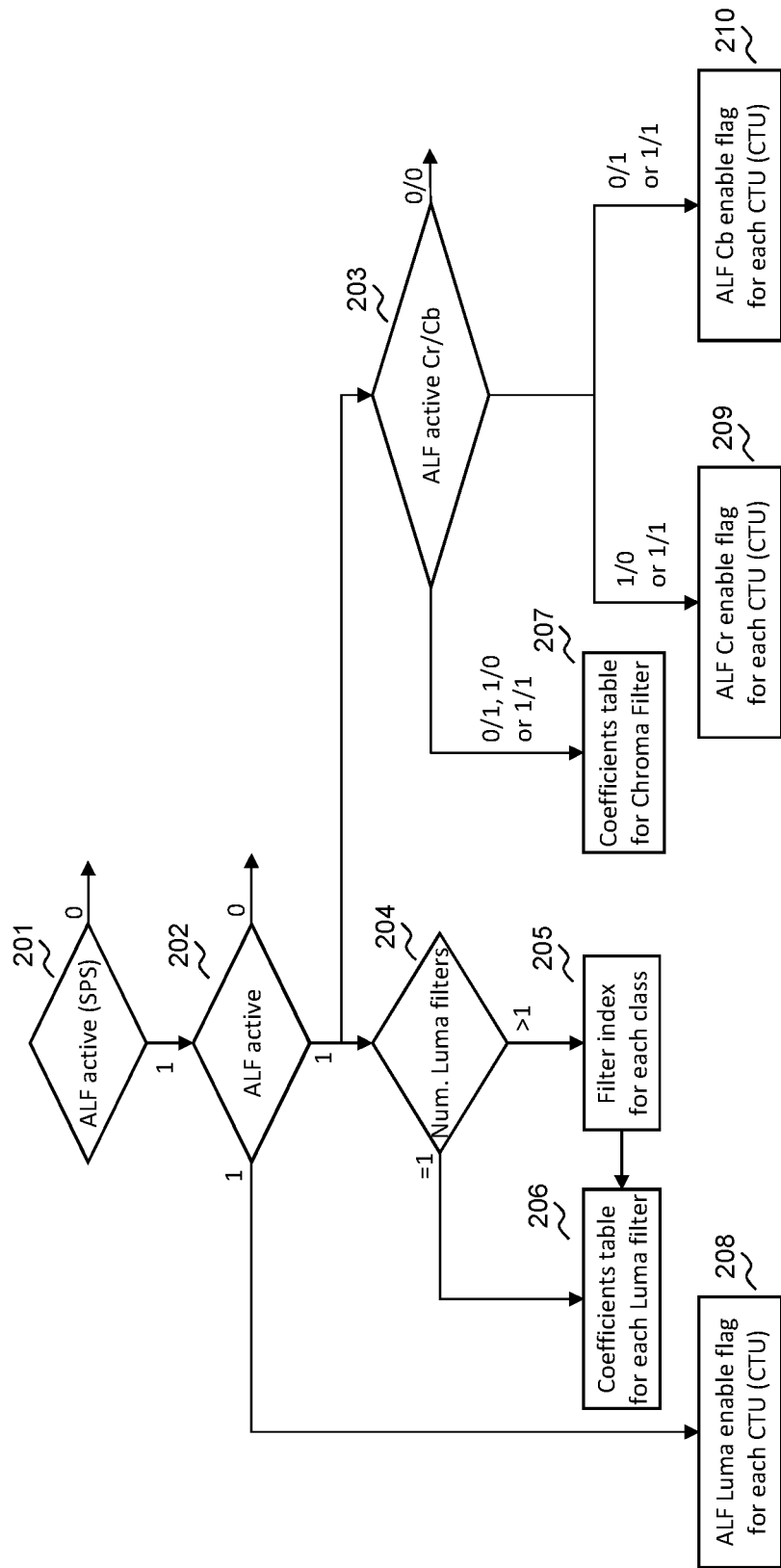
FIG. 2 is a flow chart with an overview of syntax elements that are present in VTM-3.0 for ALF.

FIG. 2 provides an overview of the syntax elements that are present in VTM-3.0 for ALF. The sequence parameter set (SPS) indicates, using a flag, if ALF tool is active (i.e. enabled) for the video sequence (201), and if so, the slice header indicates if ALF is active for the slice (202) and provides filter parameters (203 to 207) for controlling the ALF. When the ALF is active in 202, it is active at least for Luma component, and Slice Header furthermore indicates if the ALF is active for each of the Chroma components (203).

The ALF may use more than one filters on a Luma component. That is more than one tables of filter coefficients may be used because different filter configurations may share the same filter coefficients (to be described later). In the syntax element scheme of VTM-3.0 software, these different filter configurations are not individually distinguishable, and the filters with different configurations are considered as the same filter. In the following description, the same reference to a single filter is used except when explicit references to different tables of coefficients are made. This sharing of the single filter in the syntax element scheme is an effective way of reducing the number of bits allocated to the filters by considering that statistics on the filtered image are the same for rotated orthogonal and/or mirror configurations: i.e. one reference filter, designed for a reference sample configuration, is specified as being rotated and/or mirrored to filter orthogonal and/or mirror sample configurations. The slice header contains the number of encoded Luma filters (204) (which is one or more).

When filtering Luma samples, the ALF locally classify (categorize) samples (according to neighbouring samples' configuration) into one of twenty-five possible classes (categories/classifications/groups) to choose a filter (which is associated with/assigned to that particular class/category/classification/group) to locally apply to those samples. Here the terms "locally" classifying and "locally" applying are used because the samples are processed in units of blocks (typically 4×4 samples, e.g. in VTM-3.0) or in CUs. The chosen/selected Luma filter is then signalled in the a bitstream, e.g. using an index/information for identifying the chosen Luma filter. When the number of Luma filters used during the encoding process is greater than one, the slice header also contains one or more index(es) for identifying/ selecting those Luma filters (e.g. indexes for up to twenty-five filters used for the twenty-five classes, each index corresponding to a Luma filter used for one of those classes) (205). In the case where the number of Luma filters used in the encoding process is one, this single Luma filter is applied to all the classes.

Then, the slice header contains all the filter coefficients (or filter parameters) for each one of the Luma filters (206) (i.e. a coefficient table for each of the Luma filters used during the encoding process) followed by the filter coefficients for a Chroma filter (207). Note that in VTM-3.0 the two Chroma components share the same Chroma filter when ALF is active (i.e. enabled) for both Chroma components.

When ALF is active, for each one of the components on which ALF is active, the filtering can be enabled a CTU-by-CTU basis. Inside of the encoded bitstream, for each CTU, encoded slice data includes one entropy-coded flag, per each component for which ALF is active, to indicate whether ALF is enabled on the component of that CTU (208, 209 and 210), and so whether the samples of that component of that CTU have to be filtered using the ALF or not. This flag is encoded using a context-adaptive binary arithmetic coding (CABAC).

In VTM-3.0, the signalling of the coefficients for the Luma filters 206 is performed as follow:

[1] An 'alf coefficients delta flag' is first signalled, the flag indicating whether some filters can be disabled, and if 'alf coefficients delta flag' is zero and if the number of Luma filters is greater than 1, a 'coeff delta pred mode flag' is signalled, indicating that the filter coefficient encoding will use prediction (described in more detail later).

[2] In VTM-3.0, to encode the Luma coefficients using (exp-)Golomb codes, we use 3 (2 for Chroma) (exp-)Golomb configurations. The only parameter of (exp-)Golomb encoding is the (exp-)Golomb order (often noted 'k'). Each configuration has an (exp-)Golomb index. The parameters for a (exp-)Golomb encoding of the filter coefficient are signalled using a variable length code (VLC) for the 'minimum order' of the (exp-)Golomb codes, and then for each (exp-)Golomb index a flag to signal if the (exp-)Golomb order must be increased for that index and for the next ones (starting with 'minimum order' for the first index).

[3] Then, if 'alf coefficients delta flag' indicates some filters are enabled, a flag is signalled for each filter, indicating whether that filter is disabled (and so, not coded), or not.

[4] Then, filter coefficients are signalled for each (not disabled) filter using (exp-)Golomb codes (for signed integer) with (exp-)Golomb order taken with the (exp-)Golomb index associated to the filter coefficient index (in a fixed table) from the table storing (exp-)Golomb parameters.

In the case where a 'coeff delta pred mode flag' is signalled, it indicates that the filter coefficient encoding uses prediction. This means filter coefficients of a 'current' filter with a filter index (i.e. an index identifying each filter) greater than or equal to one are encoded as differences between the filter coefficients of the "current" filter and the filter coefficients of a previously processed filter (e.g. encoded as a filter coefficient residual value using the filter coefficients of the previously processed filter as filter coefficient predictors—i.e. using prediction). The first filter (with a filter index zero) is encoded without prediction.

The signalling of the coefficient of the Chroma filter 207 is performed similarly for the Luma filters, excepted that there is no 'alf coefficients delta flag', no 'coeff delta pred mode flag', and that there are two (exp-)Golomb indexes instead of 3.

FIG. 3-*a* is a flow chart illustrating steps for filtering a Chroma component according to an embodiment of the invention, and FIG. 3-*b* provides a filter shape and coefficient arrangement for a Chroma filter according to an embodiment of the invention.

In FIG. 3-*a*, the ALF filtering is applied differently between Luma and Chroma components. Starting with a simple case, FIG. 3-*a* provides the main steps for filtering a Chroma component. The input image portion 301 (e.g. tile or tile group) contains Chroma samples to be filtered. The Input filtering parameters 302 include ALF parameters (e.g. 'alf coefficients delta flag', 'coeff delta pred mode flag', filter coefficients, or any other flags or filter parameters for the ALF) described with reference to the ALF syntax elements in FIG. 2. Using the encoded filter coefficients for the Chroma filter, the Chroma filter is derived/obtained in 303.

In a variant, the Chroma filter has a diamond shape/pattern/mask/support of size 5×5, i.e. 5 samples high and 5 samples wide (see 306 in FIG. 3-*b*). The filter coefficients of the Chroma filter are organized so that the Chroma filter has a symmetry about the centre. There are 6 encoded filter coefficients for this Chroma filter, with an index numbered from 0 to 5, which are positioned at corresponding coefficient positions shown in the figure. The superscript sign ("+" or "−") for the index number is provided so that a distinction can be made between different coefficient positions sharing the same filter coefficient, i.e. when referring to two symmetric (in the sense that they share the same filter coefficient) neighbours: $i^+$ corresponds to a neighbour sample with an index i that is encoded/decoded/processed/stored/accessed after the sample to be filtered (i.e. at the centre in the filter shape/pattern/mask/support) in a (raster) scan order; and $i^-$ corresponds to a neighbour sample with the index i that is encoded/decoded/processed/stored/accessed before the sample to be filtered in the (raster) scan order. The $7^{th}$ coefficient for the centre of the Chroma filter shape (the coefficient position with an index number 6) is deduced/derived from the other filter coefficients. The value of this 7th coefficient at coefficient position 6 is equal to 1-2·$\Sigma_{i<6}$ $w_i$, evaluated with a fixed point computation ($w_i$=filter coefficient for the index i). That is, one minus two times (because of the symmetry) the sum of all the filter coefficients for coefficient positions 0-5. Thus, the sum of all the coefficients of the diamond shape, including the $7^{th}$ coefficient, is one on which a left 7 bit shift is applied (1<<7), wherein 7 is the bit precision of the encoded filter coefficients minus one for fixed point computations. This is why only half of "the total number of filter coefficients minus one" is the number of filter coefficients which are encoded in the bitstream.

For each Chroma component sample on which ALF is active (i.e. applied), the filtering in step 304 is performed as follows to obtain an output image portion 305: for each current sample of the input image portion, if the current sample belongs to a CTU where ALF is enabled and if the neighbouring samples of current sample required for obtaining filter coefficients for the coefficient positions in the diamond shape of the Chroma filter (with the current sample being positioned at the centre of the diamond shape) are available (for instance using a border extension on the boundaries of a picture, or using neighbour slice samples if they are available on the border of the slice); then, the output filtered sample, at same position as current sample I(x, y) at position (x,y), is equal to:

$$O(x,y)=((1<<(N-1))+\Sigma_{(i,j)}w(i,j)\cdot I(x+i,y+j))>>N, \quad (1)$$

where i &j are two integer offsets (horizontal and vertical) relative to the centre of the filter shape (i.e. the current sample's position at (x,y)), w(i,j) are filter coefficients at offset (i,j), N=7 is the number of bits for an integer approximation of the decimal part of real numbers (fixed point representation) used in the representation of the filter coefficients w(i,j) at offset (i,j), I(x+i, y+j) are input sample values at offset (i,j) relative to current sample position (x, y), O(x, y) is the output filtered sample value for position (x, y). α<<N means that a bit-shift to the left of N bits is applied to the integer value of α. It is equivalent to performing an integer multiplication by two to the power of N. α>>N means that a bit-shift to the right of N bits is applied to the integer value of α. Here, since the result of the sum inside the parentheses of the equation (1) is positive in most of the cases, so this is equivalent to performing an integer division by two to the power of N. For negative numbers, the sign is propagated when right shifting so a negative number will stay negative (at least −1). There is no non-integer part because output of the ALF are generally clipped between zero and two to the power of the bit depth, minus one. N=7 provides the decimal precision fixed in VVC for ALF computation but other values could be used in other embodiments. The effect of adding (1<<(N−1)) before performing the right shift>>N is a rounding of the fixed point result of the scalar product.

Else, output the current sample value at the same position as it is (i.e. without applying this ALF).

According to a variant of this embodiment, to reduce the number of multiplication operations performed while implementing the filter, and to simplify the notation, for an ALF filter with a filter shape which is symmetric about the centre, equation (1) can be reformulated as follow:

$$O_n=((1<<(N-1))+w_c\cdot I_n^c+\Sigma_{i=0}^{i<c}w_i\cdot(I_n^{i-}+I_n^{i+}))>>N, \quad (2)$$

where $O_n$ is the output sample at a raster scan order index/position n. By raster scan order index n, we mean an index n which is a sample index that increases from left to right in a row of samples, and then increases with each row of samples from top to bottom. $I_n^c$ is the input sample at the same position n as the output sample (and corresponds to the position of the input sample at the centre of the filter), $I_n^{i-}$ is the i-th (in the raster scan order) neighbouring input sample of $I_n^c$ in the filter shape/pattern/mask/support of the filter, with a raster scan order lower than n, and $I_n^{i+}$ is the neighbouring input sample at a mirrored spatial position of $I_n^{i-}$ about the centre position of $I_n^c$. So, the shape being symmetric about the centre means that when $I_n^{i-}$ is in the shape/pattern/mask/support of the filter, $I_n^{i+}$ is also in the same filter shape/pattern/mask/support of the filter. $w_i$ is the filter coefficient associated with the neighbouring input samples $I_n^{i-}$ and $I_n^{i+}$, $w_c$ is the filter coefficient for the centre input sample $I_n^c$, and c is the number of encoded filter coefficients (this is the same as an index value for the central filter coefficient, which is not encoded because it can be evaluated from its neighbouring filter coefficients). The values of i and the associated positions of $I_n^{i-}$ and $I_n^{i+}$ correspond to the index values and to the index values with their superscript sign ("+" or "−") in the filter shape 306 of FIG. 3-*b*, for instance for c which is the index of the filter coefficient at the centre of the filter shape, is i=c="6".

FIG. 4-*a* is a flow chart illustrating steps for filtering a Luma component according to an embodiment of the invention, and FIG. 4-*b* provides a filter shape and four possible coefficient arrangements for the Luma filter according to an embodiment of the invention.

FIG. 4-a illustrates the main steps of the filtering process for Luma component. The input image portion 401 contains the Luma samples to be filtered. The Input filtering parameters 402 include ALF parameters (e.g. 'alf coefficients delta flag', 'coeff delta pred mode flag', filter coefficients, or any other flags or filter parameters for the ALF) described with reference to the ALF syntax elements in FIG. 2. Before filtering, the content of the image portion is analysed in 403. The main goal of this analysis is to allow/enable determining of local content orientation and level of activity (see step 405). This allows/enables local estimation/assessment of whether the content is homogeneous or has any sharp variations (roughly the strength or contrast of the content), and of whether the content has a predominant orientation (e.g. based on edges or oriented textures), and which orientation that predominant orientation is. For example, in VTM-3.0 the analysis comprises a local gradient analysis using Laplacian values computed for 4 orientations (horizontal, vertical, and the two diagonals) for every two samples horizontally and vertically (i.e. on one fourth of the samples). By dividing the samples of the input image portion into blocks 404 (e.g. 4×4 samples in VTM-3.0), and using the results of the analysis, in step 405 each block is classified into one of 25 possible classes, each class being identifiable using an index (i.e. the block is categorized into one of 25 categories/classifications/groups) according to the Laplacian values computed for the samples in the block. For example, in VTM-3.0 it corresponds to using 16 Laplacian values (4 orientations on 4 samples). The classification achieves a partitioning of the activity, of the strength of the directivity and dissociates horizontal and vertical orientations from diagonal orientations. Also, in step 405, each block is associated with a transposition index. This transposition index (e.g. 'transposeIdx') can be seen as a complementary/additional information to the classification to fully represent/indicate the content's orientation. There are four possible transposition indexes. When the class of the block indicates that the block is either horizontal or vertical, the transposition index further indicates whether the orientation is north to south, east to west, west to east, or south to north. When the class of the block indicates that the block is diagonal, the transposition index further indicates whether the orientation is northwest to southeast, northeast to southwest, southwest to northeast, or southeast to northwest.

The class index and the transposition index may be seen as adaptive loop filter parameters for a given block of samples. Step 406 takes these parameters to derive the Luma filter that will be used for filtering each one of the samples of the block. As previously described with reference to FIG. 2, in 402 each class is associated with an index of a coefficient table of Luma filters. To derive the Luma filter for the 4×4 block, the transposition index allows/enables to select one of the four shapes/patterns 409, 410, 411, or 412 shown in FIG. 4-b. The pattern indicates how to organize the encoded filter coefficients (e.g. based on a scan(ning) order), which are associated with the class of the block as explained in the description for 204 to 206, to build the Luma filter. The Luma Filter has a diamond shape of size 7×7. There are 12 encoded filter coefficients for each Luma filter (index numbers 0 to 11). The $13^{th}$ coefficient for the centre of the filter shape (index number 12) is deduced/derived from the other filter coefficients in the same way as for the centre coefficient of the Chroma filter described above.

The filtering in step 407 to obtain an output image portion 408 is performed in the same way as how filtering was performed by the Chroma Filter, namely for each current block of samples, the Luma filter derived/obtained in 406 for the current block is applied on each current sample of the current block.

When filtering Luma samples, because of the orientation based classification (class) and of the associated transposition (transposeIdx), optimal ALF filters for each class (i.e. "orientation based filters" which are selected according to a local orientation, e.g. based on local gradients), especially those with a high activity (e.g. high local gradients) tend to be oriented filters. For a region with a lowest activity, i.e. a region with blocks belonging to class(es) where local gradients are relatively small, such an orientation would be less pronounced and orientation based filters for such a block tends to be not an orientated filter.

Orientation based filters are well suited for filtering around edges without affecting the sharpness of the edges too much. As described below, classes can be grouped together to reduce the signalling cost of the filters. Even with this grouping of classes, a filter optimization will generally lead to obtain orientated filters. With such orientation based (ALF) filters, when the local gradient is along a horizontal direction, the filter orientation is generally vertical (i.e. the highest coefficients (in absolute value) will generally be at positions above and below the centre, while the coefficients on the left and on the right of the centre will generally be closer to zero). Similarly, when the local gradient is along a vertical direction, the filter orientation is generally horizontal, and when the local gradient is along a diagonal direction, the filter orientation is generally along a direction that is perpendicular to that diagonal direction of the local gradient.

When filtering Chroma samples in VTM-3.0, in contrast with the Luma sample filtering, because no classification is used (and since Chroma is often smooth) the filters used are generally more responsive to all the orientations and are not an oriented filter (or not an orientation based filter).

In both FIG. 3-b and FIG. 4-b filter shapes are symmetric about the centre pixel. This symmetry has been chosen in the design of ALF in VTM software, but in a variant of the embodiments, a non-symmetric shape could be used as well. Then, instead of sharing 7 coefficients for 13 input samples, up to 13 coefficients could be used for the same filter support/mask as in FIG. 3-b. And instead of sharing 13 coefficient for 25 input samples, up to 25 coefficients could be used for the same filter support/mask as in FIG. 4-b. In other variants, even the filter support/mask is non-symmetric. In variants the shape/pattern/support/mask of the filter are transmitted with the ALF parameters.

In other variants the filter shape/pattern/support/mask is different from a diamond shape. For instance in a variant it is a square, in another variant it is a rectangle, in yet another variant it is an hexagon, and in another variant it is an octagon.

In some variants the filter shape/pattern/support/mask are not the same for all the class orientations. In one variant the shape is a horizontal rectangle (e.g. "-") for horizontal class/transposeIdx orientation configurations, a vertical rectangle (e.g. "|") for vertical class/transposeIdx orientation configurations, a North-West South-East (NW-SE, e.g. "\") rectangle for NW-SE and SE-NW class/transposeIdx orientation configurations, a North-East South-West (NE-SW, e.g. "/") rectangle for NE-SW and SW-NE class/transposeIdx orientation configurations. In other variants, the filter shape/pattern/support/mask is a horizontal-vertical cross ("+"), a diagonal cross ("X"), a vertical segment ("|"), a horizontal segment ("-"), a diagonal segment from top-left to bottom right ("\"), a diagonal segment from top-right to bottom left ("/"), or any combination of aforementioned filter shapes/patterns/supports/masks.

Figure 6:
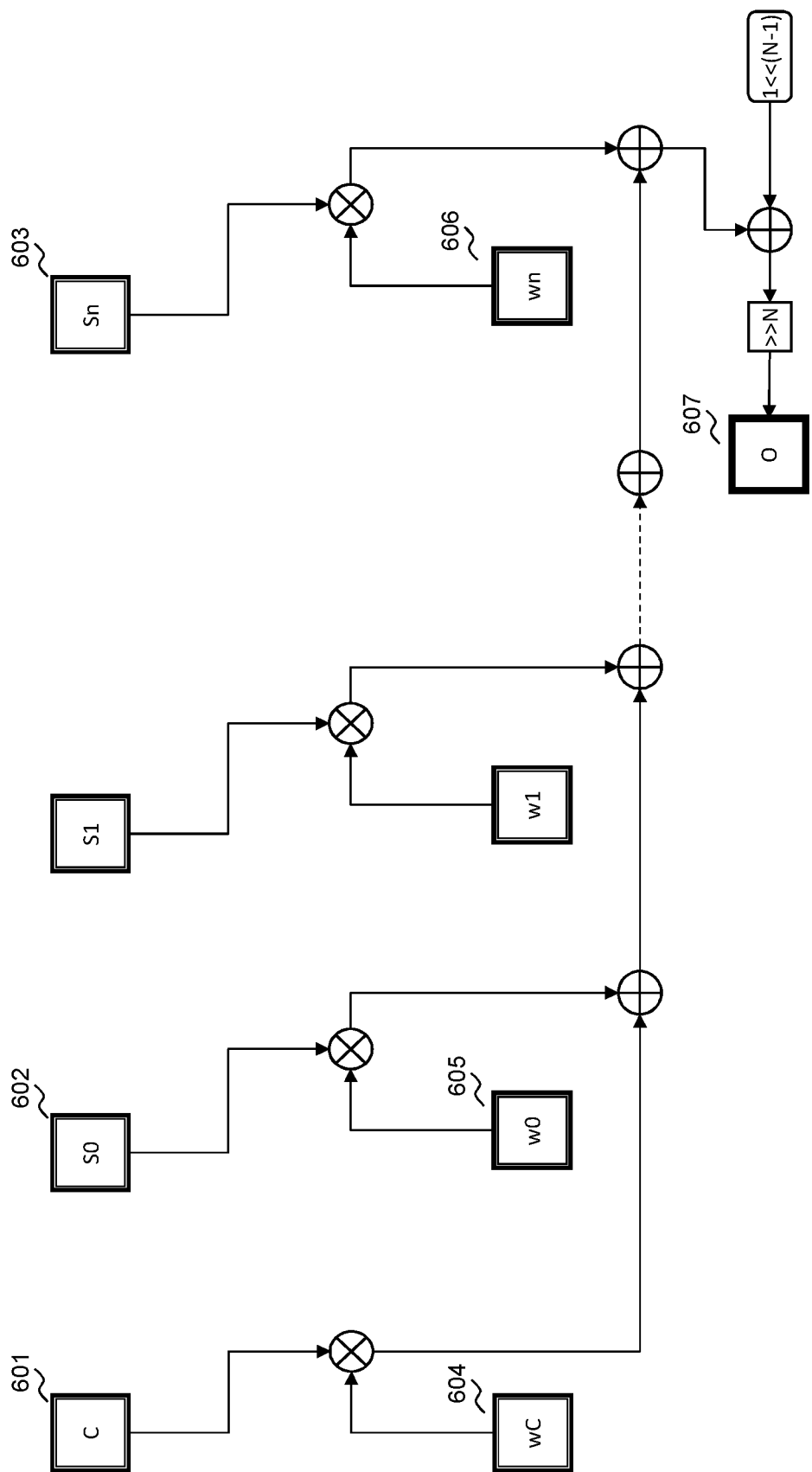
FIG. 6 is a block diagram of a linear filter in ALF in VTM-3.0.

FIG. 6 provides a block diagram of a linear filter in ALF. It corresponds to an example implementation of a ALF whose filtering functionally corresponds to the equation (1), with 'C' 601 corresponding to I(x, y) which is the sample value of the current sample, 'S0' 602 to 'Sn' 603 corresponding to I(x+i,y+j) for each (i,j)≠(0,0) which are neighbouring sample values, 'wC' 604 corresponding to w(0,0) which is the filter coefficient for the current sample, 'w0' 605 to 'wn' 606 corresponding to w(i,j) for each (i,j)≠(0,0) which are filter coefficients for the neighbouring samples at position (x+i, y+j), and 'O' 607 corresponding to O(x, y) which is the output of the ALF filter, i.e. the filtered sample value of the current sample. The process takes, as inputs, a table of integer input sample values (i.e. 'C', and 'S0' to 'Sn'), and a table of input weights, i.e. 'wC' and 'w0' to 'wn' (or filter coefficients—note that this table has the same number of elements as the table of integer input sample values) in an integer representation of a real number with a fixed point precision. The two tables have the same number of elements and are multiplied element by element, and the outcome of those multiplications are summed together (i.e. a linear combination of elements of those two tables is obtained). The outcome of this operation is a fixed point precision approximation of a real number. This fixed point value is rounded to an integer value, the result of which is the one output sample value 'O'.

From an encoder's point of view, the ALF is inspired by Wiener Filters. A Wiener Filter is a linear filter (often applied as a linear convolution filter in signal/image processing), which minimizes the mean square error between: 1) an estimated random process/variable (its output), which is a linear combination of a finite number of observed processes/variables (its inputs), and 2) a desired process/variable (its target, i.e. the original image before the artefacts have occurred). In signal/image processing, a finite impulse response (FIR) Wiener filter has applications in source separation or in denoising, for instance. In the case of image coding the target is the original image (before being altered by compression/quantization) while the inputs are samples from the compressed image we want to improve on by applying the filter.

The least squares solution for X (which is an input matrix of realisations of the observed random processes, each column containing one realization for each one of the random processes), and y (which is an output row vector which contains the realization of the desired process for the observed random process at the same column index), is $$\hat{w} = (XX^T)^{-1}Xy^T. \quad (3)$$

The Wiener filter coefficients correspond to $\hat{w}$.

It is understood that a 'realization' is an observation or an observed value of a random variable, i.e. the value that is actually observed in practice.

In a VTM-3.0 ALF encoder, the FIR Wiener filters (or functionally equivalent Least squares solutions) are used to optimize Rate/Distortion (R/D) compromise between the coding cost of the ALF parameters (which is mainly dominated by the cost for encoding FIR filter coefficients) and the distortion gains obtained by filtering a picture using the encoded ALF parameters (i.e. using the FIR filters). If the rate for encoding ALF parameters (i.e. the coding cost) was not a concern, and if maximizing the Peak Signal to Noise Ratio (PSNR) of a given frame was the only goal (without considering temporal impacts), Wiener filters would enable achieving an optimal solution for the ALF filtering design in VTM-3.0. So an ALF encoder according to an embodiment of the invention can use the same or similar filter as a linear ALF filter provided therewith.

Figure 9:
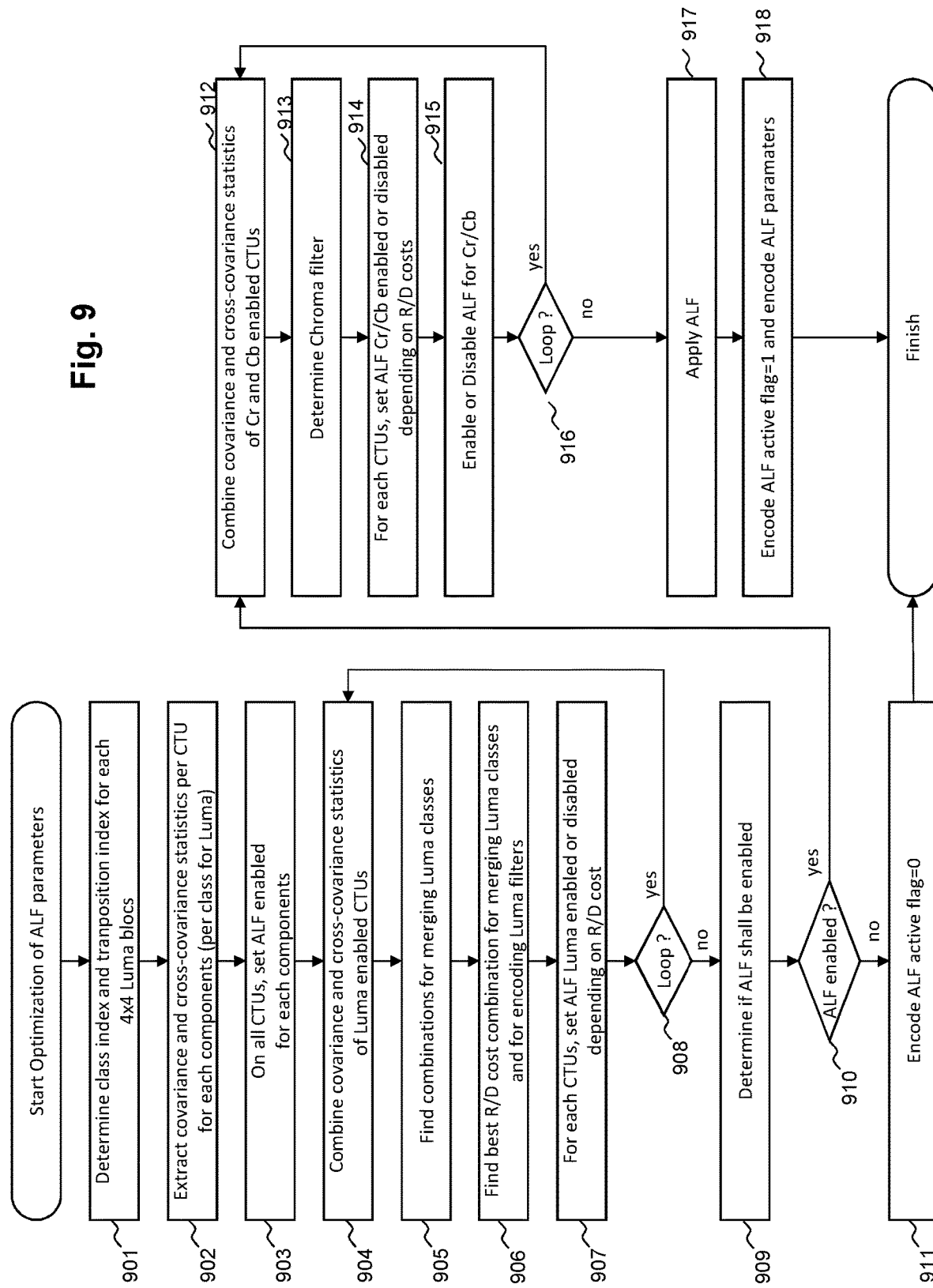
FIG. 9 is a flow chart illustrating an ALF encoding process according to an embodiment of the invention.

FIG. 9 shows a flow chart illustrating an ALF encoding process according to an embodiment of the invention, the embodiment being implemented by modifying the ALF of VTM-3.0 described with reference to FIG. 6. It is understood that according to other embodiments of the invention, another ALF may be modified in the same way to implement said other embodiments.

An ALF encoding process starts by determining a class index and a transposition index for each 4×4 block of luma samples 901.

Then statistics that will be used for deriving Wiener filters are extracted/obtained at 902. These statistics are (auto-)covariance statistics which corresponds to $XX^T$ in equation (3), and cross-covariance statistics which corresponds to $Xy^T$ in equation (3). They are used to build/obtain/estimate (auto-)covariance matrices and cross-covariance matrices, by dividing respectively $XX^T$ and $Xy^T$ by N (the number of columns in X, i.e. the number of samples to filter). These (auto-)covariance matrices and cross-covariance matrices are built/obtained/estimated for each class and for each CTU of Luma component samples, and for each CTU of each Chroma component samples 902. In the following description, the terms '(cross-)covariance matrix statistics' and '(cross-)covariance matrix' are interchangeably used to refer to the same thing. It is understood that the difference between these two is that the '(cross-)covariance matrix statistics' is obtained by accumulating (or summing) values while the '(cross-)covariance matrix' is also obtained by accumulating (or summing) values but then it is normalized by the number of accumulations (to estimate an Expected value).

For a given CTU/class/component, X is obtained as follow. As the shape of the filters are considered to be symmetric, the number of rows in X corresponds to the number of filter coefficients of the filter. One row (the last one) of X contains the realizations of the centre sample in the filter shape (where the centre of the filter shape belongs to the given CTU/class/component), while each other row, with index i, contains the sum of the two symmetric samples with index i in the filter shape (where the symmetric samples are neighbours of the centre of the filter shape that belongs to the given CTU/class/component). In the case of the Luma component samples, the transposition index is also used to transpose the sample positions of the filter shape according to the different shapes of FIG. 4-b so that each row i of X contains the sample statistics for the samples belonging to the shape of the filter with index i. For instance, for shapes of the FIG. 4-b, $X_{i,j}$ contains: for i<12 the sum of the two symmetric neighbours (of the jth filtered sample) with index i in the shape, and for i=12, the jth filtered sample; where $X_{i,j}$ is the value in matrix X at row i and column j.

The vector y contains all the target sample values (i.e. $y_j$ is the value of the jth sample in the source/original image before its compression).

The X matrix is not actually built/computed. Instead $XX^T$ is computed by iteratively summing the result of $X_iX_i^T$ where $X_i$ is the i-th column of X obtained for a given sample position.

The y vector is also not actually built/computed. Instead $Xy^T$ is computed by iteratively summing the result of $X_iy_i$ where $y_i$ is the i-th element of y and corresponds to the target sample value when filtering the i-th input sample using the input $X_i$.

In VTM-3.0, an ALF encoder tries to reduce the R/D cost, which is equal to D+λR for Lagrangian optimization of the rate-distortion compromise. Here, D is the distortion (quadratic error), R is the rate, and λ is determined by the encoder principally based on VTM-3.0 encoder quantization parameter (QP), on the slice type (intra or inter), and on a type of the compressed component (Luma or Chroma). The ALF encoder first tries to optimize ALF parameters by minimizing this Lagrangian R/D cost.

If the ALF reduces the cost for the Luma component, i.e. the distortion of the output slice when ALF is not active is larger than the distortion when ALF is active plus λ times the rate needed to signal the ALF parameters, then the encoder determines the ALF as active for the Luma component. Then if active for the Luma component, it tries to optimize the ALF parameters for Chroma components, to see if it can improve the R/D cost of signalling those Chroma components. Based on this, the encoder can determine whether it is better to activate/enable the ALF for each of those components or not.

According to an embodiment of the invention, the ALF encoder performs the same or functionally equivalent optimization process for its ALF parameters. According to a variant of such an embodiment, at the beginning of the ALF parameters optimization process, the ALF is set as active for all CTUs 903. The statistics at slice level for building the covariance matrices and the cross-covariance matrices are obtained by aggregating the statistics for each CTU where ALF is active/enabled. One Matrix is computed for each class for the Luma component 904, using the statistics obtained for all the samples of the 4×4 sample blocks classified as belonging to that class; and One Matric is computed by aggregating (summing) the statistics of the two Chroma components for Chroma 912.

The filter optimization process for Luma starts by looking for 25 groups of filters for combining/merging classes together, namely a first group of 25 filters, a second group of 24 filters, and so on down to a last group of 1 filter (one group for each possible number of filters) 905. The encoder starts with one filter for each class (so 25 filters in total), which is the Wiener filter computed from the covariance and cross-covariance of samples of blocks in that class. This is the first group of 25 filters. It tries to iteratively reduce the number of the filters (one by one, and until only one is remaining, to obtain all the wanted groups) by merging the filters together, i.e. merging the filters' associated classes together to be more precise. The encoder makes the classes initially associated with two different filters to share a common filter (i.e. the encoder merges the two classes to share one associated filter). To determine which filters to merge (i.e. which classes to merge), covariance and cross-covariance statistics are determined for each filter. The encoder estimates/evaluates, for each filter associated with one or more class(es) (index(es)), the total residual error obtained after using the filter to perform filtering on all blocks of samples associated with that class(es). Then for each pair of filters (and their associated classes), the encoder computes merged covariance and cross-covariance statistics to determine the Wiener filter for the merged classes and the total residual error obtained after filtering all the blocks of samples associated with the classes index with the determined Wiener filter. Then the encoder determines two filters for which the difference between the total residual error of the merged filter (derived from statistics associated with the class(es), which are associated with the two filters) and the sum of the total residual error of those two filters (by adding one filter's total residual error with another's) is the smallest, and merges those two filters (so that this merged filter is ready for the next filter merging iterations). In short, the encoder merges (a, b), a couple of different filter statistics that minimizes: $\arg\min_{(a,b)}(\text{Err}(a+b)-\text{Err}(a)-\text{Err}(b))$, where Err(x) returns the error for the filter statistics x, and a+b is the merged statistics of the two filter statistics a and b.

Up to here, statistics, filters and errors are estimated using double precision floating point values. Now encoder tries to find the best R/D cost compromise for encoding Luma filters 906. Once the 25 groups of filters/classes are determined (starting from 25 filters to 1 filter), for each group the ALF encoder derives integer filter coefficients (for an integer value encoding and fixed point precision computations) for each filter. Then it searches for the best filter in terms of R/D cost compromise when different alternative coding schemes are used. A first alternative is to encode all coefficients for all filters using a (exp-)Golomb encoding. A second alternative it to use delta encoding of the filters, wherein the filter coefficients of each filter are encoded as difference with the filter coefficients of the previous filter (using (exp-)Golomb encoding). A third alternative (R/D optimized) allows to disable some filters with one flag and encodes all the filter coefficients (using (exp-)Golomb encoding) of the filters that are not disabled. The two first alternatives can lead to reduction in bitrate while the third could lead to more distortions for less bitrate.

The encoder takes/selects/chooses the filter group and encoding compromise that minimize the R/D cost.

Once the Luma filters for use are determined/selected by the encoder, for each CTU, the encoder uses CTU statistics to see if the R/D cost of filtering the Luma samples of the CTU is better than the R/D cost of not filtering the Luma samples of the same CTU. If it is not better, the ALF is disabled for the Luma samples of that CTU 907. The encoder can then loop back at 908 to the Luma filter optimization step for Luma while updating the slice statistics on the covariance and cross-covariance statistics of the CTU (for which the ALF is enabled) 904. For example, in VTM-3.0, the encoder loops back 4 more times.

Depending on the R/D cost difference between applying the ALF on the Luma component sample or not, the encoder determines whether the ALF should be active/enabled for the Luma component or not at 909.

If the ALF is to be active/enabled for the Luma component, the encoder proceeds to processing Chroma component(s) at 910. If the ALF is to be inactive/disabled for the Luma component, the ALF is signalled as being not active/disabled at 911 and the ALF encoding process finishes.

The ALF encoding process for the Chroma component starts with a combined statistics of the two Chroma components 912, provided that the ALF is active/enabled for all CTUs of the slice.

The encoder then determines the Chroma filter 913. The encoder first determines a (floating point) Wiener filter using the CTU statistics of both Chroma components. It derives integer filter coefficients. Then for each Chroma component, the encoder uses the CTU statistics to see if the R/D cost of filtering the Chroma component of the CTU is better than the R/D cost of not filtering the Chroma component of the CTU. If it is not better, the ALF is disabled for the Chroma component samples of that CTU 914. If the encoder determines that the ALF should not be active (i.e. should be disabled) for all of the CTUs of a given Chroma component, it disables ALF on that Chroma components, and so does not need to code for each CTU the 'enable flag' which is 0, 915.

The encoder can then loop back at 916 to the Chroma filter optimization step while updating the slice statistics on the covariance and cross-covariance statistics of the Chroma components for the CTU (for which the ALF is enabled). For example, in VTM-3.0, the encoder loops back 2 more times.

The encoder then applies the ALF according to an embodiment of the invention at 917 with the determined ALF parameters (i.e. using the determined Chroma filter from step 913). Depending on the encoder configuration, resulting image may be output and/or put in the reference frame buffer. The encoder finally encodes the best R/D cost parameters, namely ALF enable flag and, if the ALF enable flag indicates active/enabled, the determined ALF parameters 918.

It is understood that according to variants, an optimization process for other ALF parameters may be performed to optimize those parameters of the ALF.

ALF with a Nonlinear Filtering Capability

The linear filtering used in steps 304 and 407 can be modified according to embodiments of the invention, which introduce non-linearity and improve filtering results (obtains a better compromise between filtering quality and coding efficiency). The goal of ALF filtering is to remove some "noise" introduced by the coding tools (e.g. quantization noise/error). To remove such noise, low-pass linear filters are often used to smooth the signal and reduce small local variations. Such kinds of filters can introduce blurring in the filtered output, especially in areas where contrast is strong, near edges for instance. Nonlinear filters, like a bilateral filter for instance, have been developed to allow more efficient denoising, whilst introducing less blurring or ringing effects, even around edges. To do so, these nonlinear filters often rely on filtering a sample based on its local neighbourhood (i.e. neighbouring samples), like linear filters, but pays more attention (or weight) to samples that have similar values to the sample to be filtered than to samples that have very different values. The weighting of the neighbour values is often performed using nonlinear functions (i.e. nonlinear mappings). These kind of nonlinear filters are often more complex than linear filters, and it may be difficult to optimize their parameters, and/or they may have less flexibility than linear filters if one wants to use such kinds of filters in a new ALF design.

According to an embodiment of the invention, an ALF of VTM-3.0 (or of any of the aforementioned embodiments or variants thereof) is modified by introducing nonlinearity with relatively low complexity involving operations that retains the parallelizable design of the ALF.

Looking at the ALF in VTM-3.0, by reformulating equation (1) using real numbers to simplify the equation, we have (removing operations related to a fixed-point representation and an integer rounding):

$$O(x,y)=\Sigma_{(i,j)}w_{(i,j)}\cdot I(x+i,y+j). \quad (4)$$

For this ALF, the condition $$\Sigma_{(i,j)}w(i,j)=1 \quad (5)$$

is satisfied. This means the sum of all the filter coefficients of the ALF is one. Then it can be seen that equation (4) can be reformulated as:

$$O(x,y)=I(x,y)+\Sigma_{(i,j)\neq(0,0)}w(i,j)\cdot(I(x+i,y+j)-I(x,y)), \quad (6)$$

The output sample O(x,y) is then the result of adding the input sample I(x,y) (at the same location) to a scalar product between a filter coefficient vector and a local gradient vector (a vector of local gradients computed as differences between neighbouring samples of the input sample and the input sample itself). In other words, the output sample (i.e. the filtered sample value) is the result of adding the input sample to a linear combination of the filter coefficients and local gradients.

Instead of using this usual linear formulation for the filter, according to an embodiment of the invention, the ALF filtering process is modified to introduce a non-linearity in the ALF filters. This non-linearity is achieved using a multivariate function K(d, b) that takes a local gradient d at offset (i, j) as a first parameter and varies in its value depending on a second parameter b=k(i,j). Instead of using the local gradients for offsets (i, j) in the scalar product in equation (6), K(d, b) is used in the scalar product, resulting in an output sample O(x,y) that varies in a nonlinear manner with the local gradient:

$$O(x,y)=I(x,y)+\Sigma_{(i,j)\neq(0,0)}w(i,j)\cdot K(I(x+i,y+j)-I(x,y),k(i,j)), \quad (7)$$

where K(d, b) is a function which takes as its first parameter/variable d=I(x+i, y+j)−I(x, y) (the local gradient at offset (i,j) computed as the difference between the neighbouring sample value at position (x+i, y+j) and the current sample value at position (x, y)), and as its second parameter/variable b=k(i, j) (an additional filtering parameter). The additional filtering parameters k(i,j) are determined at the same time as w(i,j). In an implementation, the values of k(i, j) and w(i, j) are determined to optimize the filtering and signalling process (to minimize the distortions for instance). This optimization process is performed by an encoder which is using the ALF. An example of such an optimization process will be provided later in the description.

So according to the embodiments of the invention, an input sample value is filtered by using a linear combination of the input sample itself and of an adaptive nonlinear transform of input samples that are neighbours of the input sample. The adaptive nonlinear transform depends on the relative positions of the neighbouring input samples in relation to the position of the input sample that is being filtered.

With such modified ALF, it is still possible to achieve a linear filtering, for a particular K when K satisfies the condition that there exists b, and there exists α not equal to zero, such that K(d, b) is equal to α multiplied by d for all d, i.e:

$$\exists b, \exists a\neq 0 \text{ such that } K(d,b)=ad, \forall d \quad (8)$$

So, choosing a function K(d, b), which behaves like a linear function (i.e. a linear mapping) for some values of b (i.e. the function K(d, b) satisfies condition (8)), ensures that the modified ALF filtering process of the embodiment can still be at least as efficient as using the standard linear ALF (i.e. in the worst case, the modified ALF can achieve the same level of efficiency as the ALF in VTM-3.0). For example, when a clipping function is used, the parameter b could be set to the maximum possible integer value (ideally it should be set to infinity but we can achieve the same effect using the maximum possible integer value in the limited integer precision scheme) to make it behave as a linear function.

Note that in some embodiments of the invention the ALF filtering uses an alternative formulation/filtering formula. The multivariate function K(d, b), that takes a local gradient and an additional parameter/variable, is replaced by another multivariate function that takes three parameters/variables: a neighbouring sample value, the sample value to be filtered, and an additional parameter/variable. It is reformulated using equation (7) while using a similar notation as the equation (4) and satisfying the condition (5):

$$O(x,y)=w(0,0)\cdot I(x,y)+\Sigma_{(i,j)\neq(0,0)}w(i,j)\cdot K'(I(x+i,y+j),I(x,y),k(i,j)),\quad(9)$$

where K'(n, c, b) is a function that takes as its parameters/variables, a neighbouring sample value (n), the current sample value to be filtered (c), and an additional filtering parameter/variable (b).

According to an embodiment of the invention, filtering steps for both of the Chroma components (304) and the Luma component (407) are modified to use this filtering with a non-linear formulation (preferably using equation (7), but also alternatively using equation (9)) implemented using an integer arithmetic (as described with reference to the equation (1)).

According to alternative embodiment, where any choice is based on complexity, for instance, only one of the two filtering steps (304) or (407) is modified to use the filter with the non-linear formulation.

According to some embodiments, the parameter/variable b=k(i,j) has more than one dimension, for instance it could be K(d, b=($S_b$, $D_b$))=f(d, $S_b$, $D_b$), for example using:

$$f(d, S_b, D_b) = \begin{cases} \min\left(d, \max\left(0, S_b - \left\lfloor\frac{d}{2^{D_b-\lfloor \log_2 S_b \rfloor}}\right\rfloor\right)\right), & d \geq 0 \\ \max\left(d, \min\left(0, \left\lceil\frac{-d}{2^{D_b-\lfloor \log_2 S_b \rfloor}}\right\rceil - S_b\right)\right), & d < 0 \end{cases} \quad(10)$$

with $S_b$ and $D_b$ values that can vary with (i, j).

Using parameters/variables/functions with more than one dimension often allows to improve filtering, but at a higher cost for signalling the filter parameters. In addition, it introduces more complexity when optimizing the filter parameters in a higher dimension space at the encoder, and it is often more complex to compute the function at the decoder (more filter parameters often imply more operations to use them). In an embodiment, b has a single dimension, which can achieve a good compromise for many ALF applications.

According to some embodiments, the function K may also be a function comprising more than one different functions for different offset (i,j). In some embodiments, the configuration/arrangement of the functions in the filter shape/pattern is predefined at both the encoder and the decoder. Alternatively, the configuration of the functions is chosen/selected from a set of predefined configurations, and an index for the chosen configuration is transmitted/signalled. In other embodiments, a function is chosen from a set of predefined functions for each coefficient index in the filter shape/pattern (except for the centre position) and its index is transmitted/signalled. In a variant of such embodiments, each function is a single variable function (i.e. K function no longer has the additional parameter/variable b) so instead of signalling b parameters a function index is signalled. Such a variant can be considered as using a multivariate formulation, for instance K(d, b)=$K_b$ (d) formulation. For instance, b is an integer index for selecting a single variable function $K_b$ from a set of functions.

According to some embodiments the function K is not the same for the Luma filter(s) and the Chroma filter(s). According to some embodiments the function K is not the same for each Luma filter. In some of these embodiments, for each filter an index of the selected function is provided in a slice header.

According to an embodiment of the invention, K is selected to be simple to compute (to not introduce too much decoding complexity). For example, in such an embodiment, K is simply a clipping function:

$$K(d,b)=\max(-b,\min(b,d)).\quad(11)$$

or equivalently:

$$K(d,b)=\min(b,\max(-b,d)).\quad(12)$$

Contrarily to some of the alternative functions describe below, a clipping function does not vanish for high values of local gradients (in other words, a clipping function f(x) does not converge toward zero as x approaches infinity). But It has been experimentally observed that compression results using such a simple function are often as efficient as, and can even be better than, using more complex functions. In fact, the clipping function not vanishing for high values of local gradients, but just clipping them, may allow to continue taking into account of sharp edges transitions, while limiting the impact of the high variance that exists around that sharp edge transition areas. Since artefacts are generally stronger around sharp transitions, this is of interest.

An equivalent function K' of this clipping function K using the filtering formulation of equation (9) is $$K'(n,c,b)=\max(c-b,\min(c+b,n)).\quad(13)$$

or equivalently:

$$K'(n,c,b)=\min(c+b,\max(c-b,n)).$$

The clipping function satisfies equation (8), as soon as b is greater than or equal to the maximum possible sample value (two to the power of the image bitdepth, for instance).

In the following description, a 'clipping range', or a 'clipping parameter' is used to refer to the b parameter/variable of K or K'. It is understood that such terms can be considered as being a generic term for referring to nonlinear function parameters. Similarly 'clipping' or 'clipping function' may be used to refer to K or K' described above or a functionally equivalent function thereof.

In an alternative embodiment, K may be another nonlinear function. In a variant, K is an anti-symmetric function, for instance one sawtooth period, corresponding to:

$$f(d, p) = \begin{cases} 0 & \text{if } |d| > p \\ d & \text{else} \end{cases};$$

or some triangle periods which correspond to a particular case of the equation (10) when $D_d = \lfloor \log_2 S_d \rfloor$; or it may also use a Gaussian kernel in similar ways to a bilateral filter:

$$K(d, b) = de^{-\frac{d^2}{b}}$$

for instance. For example, K may be any function which is set to zero above (or below) a certain threshold like the above variant's anti-symmetric functions.

According to an embodiment, a non-linear ALF is used instead of a linear ALF to reduce the number of sample line buffers (i.e. to reduce the number of samples of the input image component that are needed to be processed/accessed/kept in memory when performing the filtering, e.g. at a decoder), which are needed to perform ALF filtering.

According to a variant, as a trade-off/compromise, the size of the filter shape/pattern for Luma filters is reduced from 7×7 diamond shape to a smaller filter shape/pattern. For instance, a 5×5 diamond shape is used (e.g. the same shape as for Chroma filter in FIG. 3-*b*, but still using transpose index variants) for Luma filter(s). This can still achieve a similar coding gain as a linear-only ALF with 7×7 diamond shape Luma filter(s) (e.g. those shown in FIG. 4-*b*), but with a reduced number of samples to process/access/store (e.g. reduced number of sample line buffers), and also a reduced computation complexity: i.e. the number of multiplications needed to process the ALF filter is reduced by 6 per each filtered input sample whilst achieving a good coding gain.

According to a variant, when performing ALF filtering on a sample, the nonlinear ALF is used based on all neighbouring samples which would have been used for the linear ALF. According to another variant, when performing ALF filtering on a sample, only some of the neighbouring samples, which would have been used with the linear ALF, are used with the nonlinear ALF, and the rest of the neighbouring samples are used with the linear ALF. According to yet another variant, when performing ALF filtering on a sample, only some of the neighbouring samples, which would have been used with the linear ALF, are used with the nonlinear ALF, and the rest of the neighbouring samples are not used with the linear ALF either.

According to variants, by exploiting the symmetry in these filter shapes/patterns, using the same notation as the equation (2) to simplify a linear and/or nonlinear ALF filter implementation, the linear function in equation (4) can be reformulated as:

$$O_n = w_c \cdot I_n^c + \Sigma_{i=0}^{i<c} w_i \cdot (I_n^{i-} + I_n^{i+}), \quad (14)$$

which, for the ALF, satisfies the condition:

$$w_c + 2 \cdot \Sigma_{i=0}^{i<c} w_i = 1. \quad (15)$$

The linear function in equation (6) can also be reformulated as:

$$O_n = I_n^c + \Sigma_{i=0}^{i<c} w_i \cdot (I_n^{i-} + I_n^{i+} - 2 \cdot I_n^c), \quad (16)$$

and the nonlinear function in equation (7) becomes:

$$O_n = I_n^c + \Sigma_{i=0}^{i<c} w_i \cdot (K(I_n^{i-} - I_n^c, k_i) + K(I_n^{i+} - I_n^c, k_i)), \quad (17)$$

where $k_i$ is the filter clipping parameter associated with the filter coefficient $w_i$.

Finally, the nonlinear function in equation (9) can be reformulated as:

$$O_n = w_c \cdot I_n^c + \Sigma_{i=0}^{i<c} w_i \cdot (K'(I_n^{i-}, I_n^c, k_i) + K'(I_n^{i+}, I_n^c, k_i)). \quad (18)$$

According to a variant of this embodiment, K' function or K function is a clipping function.

According to an embodiment, in order to reduce the number of computations involved in processing a nonlinear function compared to the number of computations for processing the function K in equation (17), a non-linearity is introduced on the sum of at least two neighbour differences instead (i.e. a nonlinear function with the sum of two or more local gradients as its variables may be used):

$$O_n = I_n^c + \Sigma_{i=0}^{i<c} w_i \cdot (K(I_n^{i-} + I_n^{i+} - 2 \cdot I_n^c, k_i)). \quad (19)$$

Equation (19) is not always equivalent to equation (17), and a filter using equation (19) can be less efficient but it reduces the computation complexity. According to a variant, the number of signalled/encoded clipping parameters/values is unchanged from those of equation (17), for example when K is a clipping function.

It is understood that a similarly derived equation based on equation (18) with reduced complexity can be used according to another variant, with K' function having the sum of the two or more neighbour difference values (local gradients) as its variables:

$$O_n = w_c \cdot I_n^c + \Sigma_{i=0}^{i<c} w_i \cdot (K'(I_n^{i-} + I_n^{i+}, 2 \cdot I_n^c, k_i)). \quad (20)$$

Figure 7:
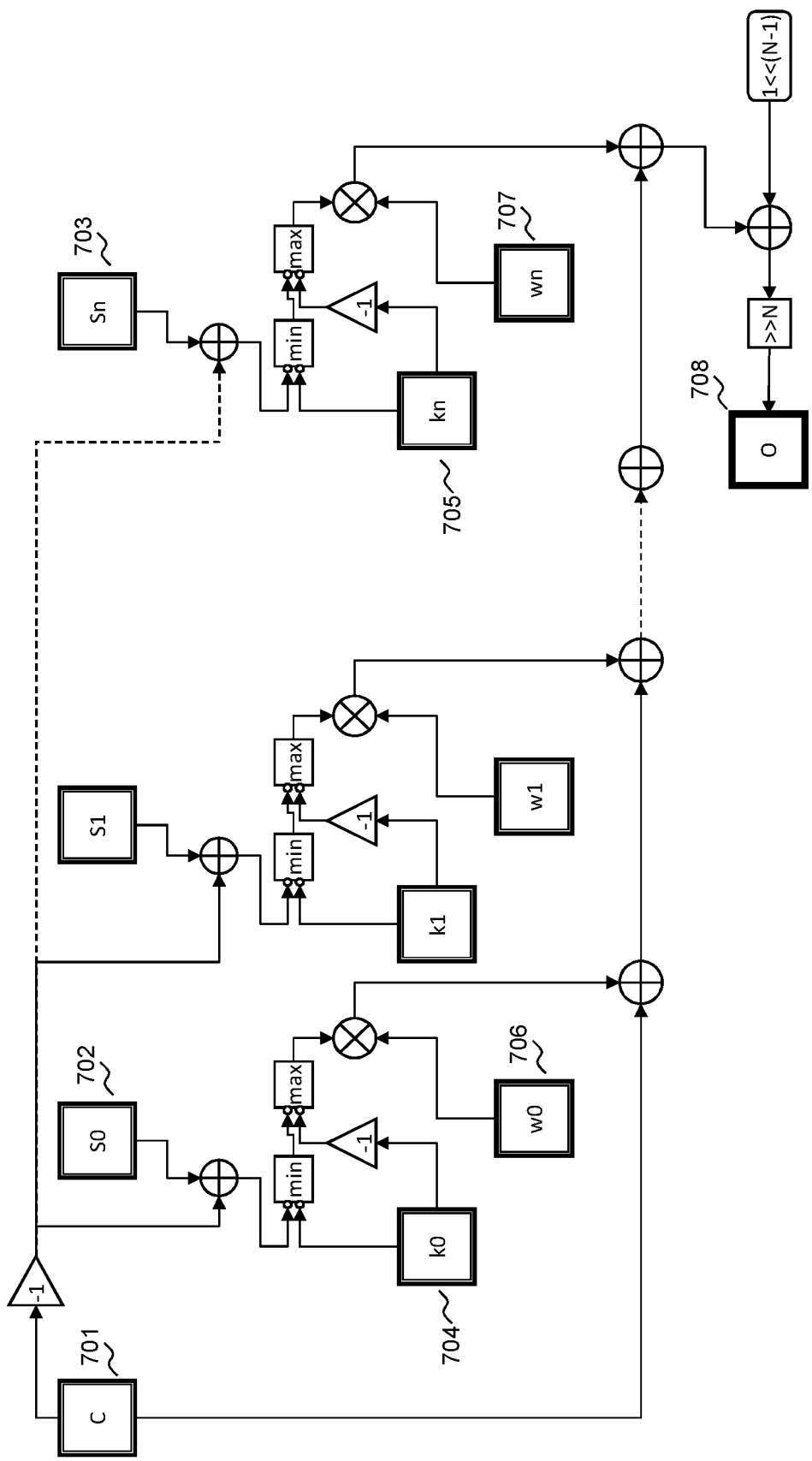
FIG. 7 is a block diagram of a nonlinear filter according to an embodiment of the invention.

FIG. 7 provides a block diagram of a nonlinear filter according to an embodiment of the invention, which can be a replacement for the linear filter in the ALF in VTM-3.0 (or be an additional nonlinear filter in addition to a linear filter in the ALF). It corresponds to an implementation of the equation (7) with an integer fixed-point arithmetic, using the clipping function of equation (11). 'C' 701 corresponds to I(x, y), 'S0' 702 to 'Sn' 703 correspond to I(x+i, y+j) for each (i, j)≠(0,0), 'k0' 704 to 'kn' 705 correspond to k(i, j) for each (i,j)≠(0,0), 'w0' 706 to 'wn' 707 correspond to w(i,j) for each (i,j)≠(0,0) and 'O' 708 corresponds to O(x, y).

Figure 5:
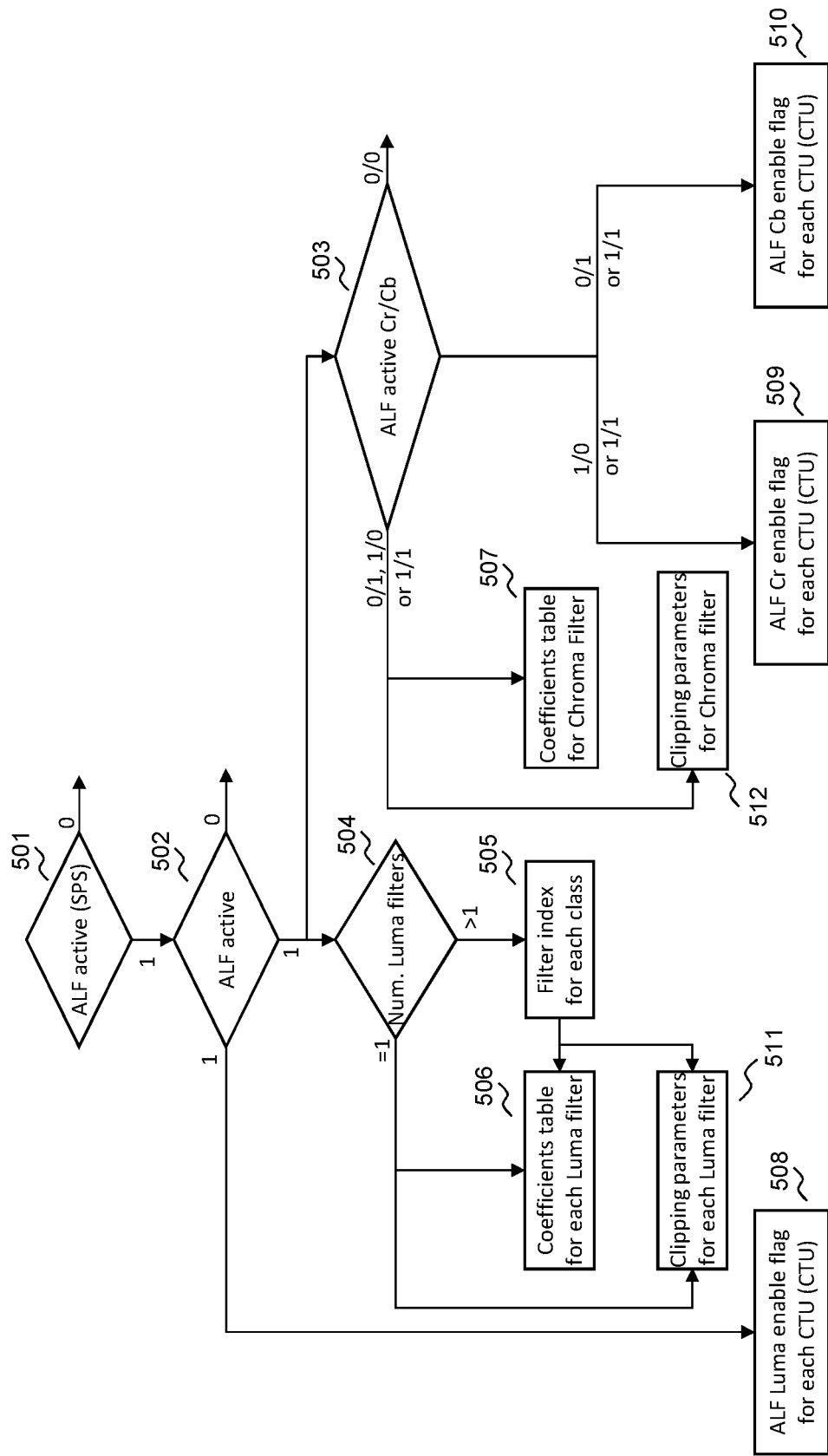
FIG. 5 is a flow chart with an overview of modified syntax elements according to an embodiment of the invention.

FIG. 5 is a flow chart with an overview of modified syntax elements according to an embodiment of the invention, which provides an example of the syntax elements that could be used to implement the non-linear function (and its parameters) of the aforementioned and their related embodiments/variants. In this embodiment, equation (7) (or (9))'s encoded filter coefficient for each filter is associated with its own clipping range, and thus k(i,j) can have different values varying with offset (i,j). Most of the syntax elements are the same as the one already used in VTM-3.0 and explained with reference to FIG. 2: 501, 502, 503, 504, 505, 506, 507, 508, 509, 510 in FIG. 5 have the same signalling and semantics as 201, 202, 203, 204, 205, 206, 207, 208, 209, 210 in FIG. 2. New syntax elements are the clipping parameters for each luma filter 511, all the filter coefficients for the Luma filters (506), and all the clipping parameters for each of the Luma filters (511), which may be signalled, for instance, in the slice header. This signalling is followed by the signalling of all the filter coefficients for the Chroma filter (507) and all the clipping parameters for the Chroma filters (512).

According to an embodiment, for any filter, the number of signalled clipping parameters is the same as the number of the signalled filter coefficients. The clipping parameters for the offset (i,j) are obtained in the same way as for the filter coefficients at the same position (x+i, y+j). For Chroma, they are processed in the same way as what was described for the filter coefficient derivation process in step 303 of FIG. **3-*a* (but with Chroma clipping parameters); and for Luma they are processed in the same way as what was described for the filter coefficient derivation process in step 406 of FIG. 4-*a*** (but with Luma filter clipping parameters).

In an alternative embodiment, there is only one clipping parameter per filter, this clipping parameter is used for all the filter (i, j)≠(0,0) positions.

In an alternative embodiment, the number of clipping parameters is lower than the number of filter coefficients. In a variant of this embodiment, these clipping parameters are used for a subset (which may be predefined or determined) of filter positions with offset (i, j). For the other filter positions, the usual linear filtering is performed (or in other words, at those other filter positions, K is taken as being the identity function) or alternatively predefined clipping parameter values are used.

Variants of such an embodiment are described with reference to FIG. **16-*a* and FIG. 16-*b***. In these variants, clipping function(s) is/are applied to a subset of filter positions, i.e. a clipping pattern/shape/support/mask includes only a subset of the filter positions in a filter shape/pattern so that only a subset of neighbouring sample values/positions are clipped during the filtering process (e.g. the nonlinear function is applied to sample values from only that subset). As clipping operations can be computationally expensive, reducing the number of clipping operations involved in the filtering in this way can reduce the complexity and computation costs for the filtering process.

FIG. 16-*a* provides 7×7 diamond filter shapes with reduced number of clipped/clipping positions, illustrating three possible arrangements/configurations of the clipped/clipping positions for reducing the number of clipping operations required when performing the filtering with the 7×7 filter shape, for example with an ALF for luma. By using clipping patterns shown in FIG. 16-*a*, the number of clipping operations for performing the filtering is reduced because the clipping operations are not applied to all filter (input) positions, i.e. only a subset (which may be predefined or signalled or inferred) of filter positions are used for the clipping operations (i.e. used with the nonlinear function). In FIG. 16-*a*, the clipped sample positions are marked by a 'X' in the clipping patterns 1601, 1602 and 1603. The clipping patterns 1601 and 1602 reduce the number of clipping operations by two thirds, while the clipping pattern 1603 reduces this number by a half. These clipping patterns 1601, 1602 and 1603 strike a good compromise between accuracy of the output and complexity involved in the filtering process when using a 7×7 diamond filter shape. The clipping patterns 1601, 1602 and 1603 work well for a nonlinear ALF which is based on an orientation based ALF (i.e. a filter built for classifications based on local content orientation and level of activity, e.g. the Luma filter(s) in VTM3.0). But if no classification is used, it is preferable to use pattern 1602 or 1603.

It is understood that according to other variants, more or less clipped positions may be used. For example, a whole column and a whole row (except the central position) may be clipped instead of the clipping pattern 1601 (i.e. a cross from top to bottom and left to right, except central position), or positions on the outer edge (i.e. a larger diamond/parallelogram clipping patterns) may be clipped instead of the clipping pattern 1602. In other variants of clipped positions, the clipping pattern/shape/support/mask forms a diagonal cross "X" (except the central position), a vertical segment "|" (except the central position), a horizontal segment "-" (except the central position), a diagonal segment from top-left to bottom right "\" (except the central position), a diagonal segment from top-right to bottom left "/" (except the central position), or any combination of aforementioned clipping patterns/shapes/supports/masks.

FIG. 16-*b* provides 5×5 diamond filter shapes with reduced number of clipped/clipping positions, illustrating two possible arrangements/configurations of the clipped/clipping positions for reducing the number of clipping operations required when performing the filtering with the 5×5 filter shape. Like in FIG. 16-*a*, by using clipping patterns shown in FIG. 16-*b*, i.e. the clipping pattern 1604 and 1605, when filtering with a 5×5 diamond filter shape it is possible to reduce the number of clipping operations involved during this filtering process. The clipping patterns 1604 and 1605 work well for a nonlinear ALF which is based on an orientation based ALF (i.e. a filter built for classifications based on local content orientation and level of activity, e.g. the Luma filter(s) in VTM3.0). But if no classification is used, it is preferable to use pattern 1605.

Clipping patterns 1602 and 1605 work better for filters which do not use classification based on orientation (e.g. they are better for a chroma filter, in contrast with luma filters which rely on classification in horizontal, vertical or diagonals orientation in VTM-3.0) because horizontal and vertical direction neighbours are statistically more reliable than the diagonal ones (because of their larger Euclidean distance). Thus, it is more advantageous to use clipping operations on only the less reliable diagonal neighbouring samples' filter positions rather than on the more reliable horizontal and vertical direction neighbouring samples' filter positions.

With orientation based filters, (i.e. filters obtained for orientation based classification) clipping operations are generally applied to samples at filter positions that are perpendicular to the filter orientations. For instance, the clipping pattern in 1601 will perform better with filters for classes with horizontal or vertical orientation than with filters for classes with diagonal orientation. The clipping pattern 1602 will perform roughly as well for the four classes orientations, but will be less efficient than pattern 1601 for horizontal and vertical orientations. So that the clipping pattern in 1601 and 1602 perform nearly equivalently on average for Luma filters using 7×7 filter pattern and the clipping pattern in 1604 and 1605 will perform nearly equivalently on average for Luma filters using 5×5 filter pattern.

According to a variant, to improve orientation based filter, the clipping pattern is selected from predefined patterns based on the filter orientation. For instance, clipping pattern 1601 is used on horizontal or vertical filters while clipping pattern 1602 is used on diagonal filters. In yet another variant, a clipping pattern selected for a vertical filter is different from a clipping pattern selected for a horizontal filter (each one is a 900 rotated version of the other, for instance), and a clipping pattern for two diagonal filter orientations are also different (each one is a 90° rotated version of the other, for instance). In yet another variant, the clipping pattern is selected according to the transposition index (tranposeIdx) for each 4×4 block of sample values.

According to a variant, there is one predetermined clipping pattern for each filter. According to another variant, there are a plurality (e.g. a predetermined number) of clipping patterns available for use, and for each filter index, a (clipping pattern) index for the selected clipping patterns is encoded/signalled with the ALF parameters, in the APS or tile group header for instance. According to yet another variant, the clipping pattern(s) is/are signaled with the ALF parameters. For instance, the signaling of a clipping pattern may be performed by encoding/decoding a sequence of flags, one flag per filter (pattern) position index (e.g. equivalent to an encoded/decoded filter coefficient index), each flag indicating whether the clipping is to be applied, or indeed to be not applied, for the corresponding index. Alternatively, the signaling of a clipping pattern may be performed by encoding/decoding the clipped position indexes themselves, or by encoding decoding the filter (pattern) position index of not to be clipped positions (preferably, whichever requires less number of bits is signaled).

According to a variant, when a clipping pattern is used (predetermined or not), the clipping parameters are only signaled for the filter (pattern) positions where a clipping operation is applied.

In some variants, to not break Single instruction, multiple data (SIMD) parallelized implementation, the clipping is applied to all filter positions, but the clipping parameter for positions where no clipping parameter is provided is taken to have a linear output (e.g. in a variant, an identity function's output).

In an alternative embodiment, the number of clipping parameters is lower than the number of filter coefficients because one or more clipping parameter(s) are shared. For instance, in the filter shapes of FIG. 3-*b* and FIG. 4-*b*, some coefficient indexes can share the same clipping parameters. According to a variant, an index of the clipping parameter is indicated in a table containing a number of elements, the number being equal to half of the shape size (because of the symmetry) minus one (because there is no clipping parameter for the centre coefficient position). This table allow associating a clipping parameter index to each filter coefficient. According to a variant, this table is fixed/preset by the codec. According to a variant, multiple fixed/preset tables are defined, and an index for identifying a clipping parameter from the table is signalled, for instance in the slice header. In an alternative variant, the content of such a table is signalled, in the slice header for instance, and is shared by all the Luma filters.

In an embodiment, the number of values the clipping parameters can take is restricted to be small (to reduce the encoder complexity and the encoding cost versus the small quality benefits). The values authorized for the clipping parameter are indexed with an integer value index, preferably in an increasing or a decreasing order. Then, these indexes can map to each element of a table of clipping parameters. Then, instead of signalling the clipping parameter values, an index (p) of the relevant clipping parameter value in the table are signalled. In an embodiment where p is a filter index in a table, there is no need to use an intermediate table to reduce the number of possible values for p. It is possible to directly reduce the number of functions available in the table of functions, and hence reduce its size.

In one embodiment, the clipping parameter values are restricted to be powers of two: $2^p$. What is encoded is then p. The maximum value of p is the bit depth $B_d$ of the input image (higher values are not necessary as they would provide the same results). In an alternative embodiment instead of p, what is encoded is $B_d-p$. In another embodiment the range of p is restricted to be between $p_{min}$ and $p_{max}$. For instance, $p_{min}=3$ and $p_{max}=B_d-1$. Then $p-p_{min}$ or $p_{max}-p$ can be signalled.

In an embodiment, the authorized/allowable/available clipping parameter values for the Chroma filter are not the same as those for the Luma filters.

According to an embodiment, the minimum index in the table $p_{min}$ and the maximum index in the table $p_{max}$ which are used for the clipping parameters in the slice are provided in the slice header so that the number of possible clipping parameter values can be restricted/limited when signalling them. According to an embodiment, $p_{min}$ and $p_{max}$ are shared by the Luma and Chroma filters. In an alternative embodiment, $p_{min}$ and $p_{max}$ are only provided for Luma, Chroma indexes being not restricted. In another alternative embodiment, $p_{min}$ and $p_{max}$ are provided in Slice Header for Luma and for Chroma.

According to an alternative embodiment, one table of authorized clipping parameter values is signalled in the slice header for both Luma and Chroma components, or alternatively two tables: one for Luma and one for Chroma.

In an embodiment of the invention, the clipping parameters 511 and 512 are not signalled in the slice header. Instead, the clipping parameters are determined at the encoder/decoder using the quantization parameter (QP) that was used to signal the filtered sample, and based on a class index of the filter.

In an alternative embodiment, the clipping parameters 511 and 512 are signalled in the slice header. But in the filtering process they are not used directly. Instead, the clipping parameters are scaled depending on the quantization parameter (QP) that was used to signal the filtered sample.

In an embodiment, the clipping parameters for the luma filter are not provided for each filter. Only two tables of clipping parameters are shared by all the luma filters, and signalled in slice header. One table is for the horizontal/vertical classes while the other is for the diagonal classes. The clipping parameters of each class are derived from those two tables according to the class orientation, using coefficient arrangements of FIG. 4-b, and scaling (i.e multiplying) the clipping parameters accordingly to a fixed value determined from the level of activity of the class. The scaling takes into account of the level of activity when classifying 4×4 blocks. For example, for areas of high levels of activity (e.g. near edges) higher clipping values may be used when compared to areas of low levels of activity (e.g. in homogeneous areas).

In an embodiment, one bit in the slice header signals that the clipping is enabled/disabled for each filter clipping index for each filter. In embodiments where there is only one allowed clipping value per clipping parameter, if the bit indicates that clipping is active, that clipping value is used (i.e. nothing else is signalled for the clipping parameter value). Alternatively, when more than one clipping values are allowed, if the bit for one clipping index indicates that the clipping is disabled for that filter clipping index, the clipping value is not signalled, whereas in other case it is signalled.

Here the filter clipping index corresponds to an index of the clipping parameter associated with a filter coefficient index in the filter shapes.

In an embodiment, the allowed clipping values depend on the slice type (which can be INTRA, B or P, for example).

In variants of an embodiment, the allowed clipping values are: {6, 32, 181, 1024} for Luma in a B or P slice; {4, 25, 161, 1024} for Chroma in a B or P_slice; {10, 102, 1024} for Luma in an INTRA slice; or/and {4, 24, 1024} for Chroma in an INTRA slice. Thus any clipping parameter can take a value belonging to one of those sets (accordingly to the slice type and to the filtered component). And, the index of that value in the set is encoded in the slice header for each filter, for each clipping parameter.

In a variant, a table of allowed clipping values is defined as follows:

$$\left\{ \text{round}\left(\left((M)^{\frac{1}{N}}\right)^n\right) \text{ for } n \in 1 \ldots N] \right\},$$

where N is the number of clipping values in the table (i.e the size of the table), M is the maximum clipping value (which is the latest entry in the table, for instance $M=2^D$ or $M=2^D-1$ where D is the sample bit depth of the component for which the table is defined), and where 'round' is a rounding operator (to the nearest integer for instance).

In a variant, a table of allowed clipping values is defined as follows:

$$\left\{ A \cdot \text{round}\left(\left(\left(\frac{M}{A}\right)^{\frac{1}{N-1}}\right)^{n-1}\right) \text{ for } n \in 1 \ldots N] \right\},$$

where N is the number of clipping values in the table (i.e the size of the table), M is the maximum clipping value (which is the latest entry in the table, for instance $M=2^D$ or $M=2^D-1$ where D is the sample bit depth), A is the smallest clipping value (which is the first entry in the table), and where 'round' is a rounding operator (to the nearest integer for instance).

In an embodiment the allowed clipping values are not the same for each filter clipping index.

In variants of embodiments using a clipping function on a difference value, i.e. applying function K of equation (11) or equation (12) to the difference between a neighbour sample value and the centre value, the maximum allowed clipping value is defined so that the number of bits at the output of the clipping is reduced. It allows to limit the number of bits that are needed to be handled for a hardware implementation which performs the filtering according to those variants. Thus it allows to reduce the number of logic gates/transistors in a chip, for instance. Reducing the number of bits at the input end of a multiplication operator is particularly interesting because multiplication needs many logic gates. For instance, setting the maximum allowed clipping value to two to the power of the sample bitdepth minus one, minus one; (i.e. maximum clipping equal to $2^{\wedge}(\text{bit depth}-1)-1$) allows to reduce the maximum number of bits by one at the output end of the clipping and so at the input end of the multiplication operator. And using the sample bitdepth minus two (i.e. maximum clipping equal to $2^{\wedge}(\text{bit depth}-2)-1$) allows to reduce the maximum number of bits by two.

In an embodiment that uses an APS, the distinction between an INTRA slice and an INTER slice (or INTRA and INTER picture/image portion/tile group) may not be possible during a clipping value derivation because the APS is shared by the INTRA and INTER slices/pictures/tile groups/image portions. Then, a predefined table of allowed clipping values cannot depends on the slice/image portion/tile group type anymore. Thus, one default clipping value table is shared by all slice/picture/tile group/image portion types. In a variant, it is then up to the encoder to decide (and then signal to a decoder) whether the clipping values are restricted to a subset of the clipping values from the default clipping value table, for complexity reduction considerations for instance.

In a variant, a clipping value table of useable clipping values is signalled in the APS with the ALF parameters. Thus an encoder (and a decoder) can use any clipping values and signal the used clipping values with its own clipping value table.

In a variant, there are more than one default clipping value tables, e.g. one used for INTER slices and another for INTRA slices. Information for identifying the used table, e.g. an index of the used table, is then provided in the APS with the ALF parameters. In a variant, the default clipping value tables are different for Luma and for Chroma.

In an embodiment the output value of the filter is also clipped depending on the input sample value and an additional clipping parameter (which may be added to the table of clipping parameters).

According to an embodiment, in addition to the ALF active flag, a NLALF (NonLinear ALF) active flag is put at sequence level, in the SPS for instance, or alternatively at frame level, in picture header for instance, to indicate that nonlinear ALF is active/used/enabled. If this flag is active (i.e. indicates that nonlinear ALF is active), the syntax elements for the ALF include filter parameters for nonlinear filters, the one of FIG. 5 for instance. If the flag is inactive (i.e. does not indicate that a nonlinear ALF is active), the syntax elements for the ALF only contains filter parameters for linear filter, the one of FIG. 2 for instance.

According to an embodiment, a NLALF active flag is put in the Slice header, if ALF flag is active in the slice header. If this NLALF flag is active, the clipping parameters for each Luma filter syntax element 511 and the clipping parameters for the chroma filter 512 are present in the slice header. If this NLALF flag is inactive, syntax elements 511 and 512 are not present in the slice header, and the ALF uses the usual linear filtering.

According to an alternative embodiment, a separate NLALF active flag is provided for each component type Luma and Chroma, and either one or both of these flags is/are used to indicate whether a nonlinear ALF is to be used on a particular component's sample (e.g. they are provided in the same place as the NLALF active flag such as at sequence level or in the slice header). In a variant, a nonlinear ALF is used on Luma and a linear ALF is used on Chroma. In an alternative variant, a nonlinear ALF is used on Chroma and a linear ALF is used on Luma.

In a variant, a NLALF Luma active flag and a NLALF Chroma active flag are provided in the Slice header. The NLALF Luma active flag indicates whether a nonlinear adaptive loop filter is used on the Luma component, and so whether the nonlinear ALF's clipping parameters are signalled for each Luma filter. The NLALF Chroma active flag indicates whether a nonlinear adaptive loop filter is used on the Chroma component, and so whether the nonlinear ALF's clipping parameters are signalled for the Chroma Filter.

In a variant, the NLALF Chroma active flag is not signalled but it is inferred to be equal to zero if the NLALF Luma active flag is equal to zero, so that a nonlinear ALF cannot be used on only Chroma.

In a variant, a nonlinear ALF is always used on Luma (by default—so a NLALF Luma active flag may not be used or assumed to be the corresponding default value), and a NLALF Chroma active flag is used to indicate whether a nonlinear ALF or a linear ALF is used on Chroma. In another variant, a linear ALF is as always used on Luma (by default—so a NLALF Luma active flag may not be used or assumed to be the corresponding default value) and a NLALF Chroma active flag is used to indicate whether a nonlinear ALF or a linear ALF is used on Chroma. In a variant, a NLALF Luma active flag is used to indicate whether a nonlinear ALF or a linear ALF is used on Luma, and a nonlinear ALF is always used on Chroma (by default—so a NLALF Chroma active flag may not be used or assumed to be the corresponding default value). In a variant, a NLALF Luma active flag is used to indicate whether a nonlinear ALF or a linear ALF is used on Luma, and a linear ALF is always used on Chroma (by default—so a NLALF Chroma active flag may not be used or assumed to be the corresponding default value).

In one embodiment, a NLALF active flag (or a NLALF Luma active flag or a NLALF Chroma active flag) is put in the slice header only if the NLALF flag is active in the SPS. In the case where NLALF active flag (or a NLALF Luma active flag or a NLALF Chroma active flag) is not present, it is considered as inactive by default.

In one embodiment, the NLALF flag replaces the ALF flag in SPS and slice header. The classic (linear only) ALF cannot be used anymore except in embodiments where the clipping function allows a linear output for the allowed clipping parameter values.

According to an embodiment, the signalling of the clipping parameters is done in a similar way as for filter coefficients. The parameters for (exp-)Golomb encoding of the clipping parameters are first signalled: a VLC code is used to signal the minimum order of the (exp-)Golomb codes, then for each (exp-)Golomb index (for instance 3 indexes for Luma filters and 2 indexes for chroma) a flag is used to signal whether the (exp-)Golomb order has to be increased for the current index and for the next ones (starting with the minimum order).

Then, the clipping parameters are signalled for each (not disabled) filter, using (exp-)Golomb code (for unsigned integer), with (exp-)Golomb order taken with the (exp-)Golomb index associated with the coefficient index (in a fixed table, the same as for filter coefficients for instance) from the table storing (exp-)Golomb parameters.

According to an alternative embodiment, for each encoded filter, a (exp-)Golomb encoding parameter value is signalled, in the slice header for instance, and each clipping parameter value is encoded using the provided (exp-)Golomb encoding parameter value for an unsigned integer (exp-)Golomb encoding.

According to an embodiment, the (exp-)Golomb encoding parameter value is signalled as an index in a table of available (exp-)Golomb encoding parameter values.

According to an embodiment, a flag is signalled in the slice header for instance, the flag indicating whether the clipping parameters for Luma filters are signalled using a delta mode. When the delta mode is active, the first filter clipping parameters are encoded as previously described, but each following filter clipping parameters are encoded as a difference between the following filter clipping parameter and the previously encoded filter clipping parameter. In that case the difference is encoded using a signed integer (exp-)Golomb encoding.

According to an embodiment, a flag is signalled in the slice header for instance, the flag indicating whether the clipping parameter for the filters can use a delta mode. According to an embodiment when the delta mode is active, a flag is signalled for each filter, the flag indicating whether the clipping parameter for the filter uses delta mode or not. According to an embodiment, when the delta mode is active for encoding the clipping parameters of a given filter, the clipping parameters are encoded one by one, the first one using an unsigned (exp-)Golomb encoding, and the following ones using a signed (exp-)Golomb encoding of the difference between the clipping parameter and the value of the previously encoded clipping parameter.

According to an alternative embodiment, the number of values a clipping parameter can take is limited to two different values. Then a single bit is used to signal which clipping parameter value has to be used (there is no need to provide (exp-)Golomb parameters).

According to an embodiment, a conditional signalling of a clipping parameter is performed so that signalling of unnecessary data (e.g. where the filter coefficient is zero or equal to a known value to a filter at the decoder side) is minimised. In a variant, filter coefficients are signalled, in the slice header for instance, before the clipping parameters are signalled, and for each i-th filter coefficient of a filter that is equal to zero, its corresponding i-th clipping parameter is not signalled. This is because the i-th clipping will not be useful for the filter since its result will be multiplied by the zero coefficient so that there is no effect from the i-th clipping on the filtered output. In one variant that clipping is set to a default value (e.g. the maximum possible value according to the sample bit depth). In another variant, the filtering process does not apply clipping on the input(s) sample(s) that are then expected to be multiplied by a zero coefficient.

According to an embodiment, a flag is signalled for each Luma filter to indicate whether a nonlinear filter is used with that Luma filter or not. In a variant, clipping parameters/values of the Luma filter are signalled only if the nonlinear filter is used (i.e. if the flag is active) for that Luma filter.

According to an embodiment, a flag is signalled for a Chroma filter to indicate whether a nonlinear filter is used with that Chroma filter or not. In a variant, clipping parameters/values of the Chroma filter are signalled only if the nonlinear filter is used (i.e. if the flag is active) for that Chroma filter.

According to an embodiment, signalling ALF related information such as ALF parameters and flags is performed using one or more of: an APS syntax (Table 1); a tile group header syntax (Table 2); a coding tree unit syntax (Table 3); and/or a nonlinear ALF data syntax (Table 4) shown below, which use the same syntax naming convention as in VVC draft version 3. According to a variant, all four syntaxes (e.g. Tables 1-4) are used to signal ALF related information. According to an alternative variant, a subset of the four syntaxes are used to signal ALF related information.

Table 1 and Table 2 provide high-level syntax elements for providing/signalling ALF parameter(s), e.g. alf_data( ).

TABLE 1

Adaptation Parameter Set (APS) syntax

| | Descriptor |
|---|---|
| adaptation_parameter_set_rbsp( ) { | |
|   adaptation_parameter_set_id | ue(v) |
|   alf_data( ) | |
| } | |

TABLE 2

Tile Group Header syntax

| | Descriptor |
|---|---|
| tile_group_header( ) { | |
|   ... | |
|   if( sps_alf_enabled_flag ) { | |
|     tile_group_alf_enabled_flag | u(1) |
|     if( tile_group_alf_enabled_flag ) | |
|       tile_group_aps_id | ue(v) |
|   } | u(1) |
|   ... | |
| } | |

A slice (header) described in relation to other embodiments (or variants thereof) is replaced by a tile group (header) as shown by the tile group header syntax of Table 2. Thus 'tile_group_alf_enabled_flag' corresponds to the syntax element for 202 in FIGS. 2 and 502 in FIG. 5, and it indicates whether the ALF is active or not for the tile group. Further, ALF data syntax element is not provided in the tile group header (in other embodiments with a slice, it may be provided in a slice header). Instead, the ALF data syntax element is provided in a specific parameter set called Adaptation Parameter Set (APS) as shown in Table 1. ALF data includes ALF syntax elements, and the provision of ALF data syntax element in the APS enables sharing of ALF parameters among more than one tile groups, e.g. among a plurality of tile groups in the same and/or in different decoded Pictures.

The adaptation parameter set (APS) syntax of Table 1 is used to define the signalling of any adaptation parameter set. In a variant, the APS is included in a non-'Video Coding Layer' (VCL) 'Network Abstraction Layer' (NAL) unit (e.g. called "APS_NUT" or APS NAL unit type).

The semantics of each syntax elements for an APS are as follow:

Adaptation Parameter Set Semantics adaptation_parameter_set_id identifies the APS for reference by other syntax elements. The value of adaptation_parameter_set_id shall be in the range of 0 to 63, inclusive.

The tile group header syntax of Table 2 is used to define each tile group header. A tile group header is provided for each tile group. A tile group includes a set of tile(s), each tile including a set of CTU(s).

The semantics of the syntax elements for a tile group header are as follow:

Tile Group Header Semantics tile_group_aps_id specifies the adaptation_parameter_set_id of the APS that the tile group refers to. The value of tile_group_aps_id shall be in the range of 0 to 63, inclusive.

The TemporalId of the APS NAL unit having adaptation_parameter_set_id equal to tile_group_aps_id shall be less than or equal to the TemporalId of the coded tile group NAL unit.

Table 3 provides syntax elements for signalling, at CTU level, ALF (enable) flags used for each component on which ALF is active. It corresponds to syntax elements used in 208, 209 & 210 in FIGS. 2 and 508, 509 & 510 in FIG. 5.

TABLE 3

| coding tree unit syntax | |
|---|---|
| | Descriptor |
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   ... | |
|   if( tile_group_alf_enabled_flag ){ | |
|     alf_ctb_flag[ 0 ][ xCtb >> Log2CtbSize ][ yCtb >> Log2CtbSize ] | ae(v) |
|     if( alf_chroma_idc = = 1 \| \| alf_chroma_idc = = 3 ) | |
|       alf_ctb_flag[ 1 ][ xCtb >> Log2CtbSize ][ yCtb >> Log2CtbSize ] | ae(v) |
|     if( alf_chroma_idc = = 2 \| \| alf_chroma_idc = = 3 ) | |
|       alf_ctb_flag[ 2 ][ xCtb >> Log2CtbSize ][ yCtb >> Log2CtbSize ] | ae(v) |
|   } | |
|   ... | |

The coding tree unit syntax of Table 3 is used to define an (encoded) coding tree unit. The semantics of each syntax elements for a Coding Tree Unit are as follow:

Coding Tree Unit Semantics

The CTU is the root node of a coding quadtree structure.

alf_ctb_flag[cIdx][xCtb>>Log 2CtbSize][yCtb>>Log 2CtbSize] equal to 1 specifies that the adaptive loop filter is applied to the coding tree block of the colour component indicated by cIdx of the coding tree unit at luma location (xCtb, yCtb). alf_ctb_flag[cIdx][xCtb>>Log 2CtbSize][yCtb>>Log 2CtbSize] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>Log 2CtbSize][yCtb>>Log 2CtbSize] is not present, it is inferred to be equal to 0.

Table 4 provides syntax elements for signalling nonlinear ALF parameters (i.e. a nonlinear ALF data syntax), which build on ALF data syntax elements of the VVC Draft version 3. These syntax elements build on those used in the variant described herein with reference to the nonlinear ALF syntax elements of FIG. 5, which build on the syntax elements of FIG. 2.

TABLE 4

| nonlinear ALF data syntax | |
|---|---|
| | Descriptor |
| alf_data( ) { | |
|   alf_chroma_idc | tu(v) |
|   alf_luma_clip | u(1) |
|   if( alf_choma_idc ) | |
|     alf_chroma_clip | u(1) |
|   if( alf_luma_clip ) { | |
|     alf_luma_clip_default_table | u(1) |
|     if( !alf_luma_clip_default_table ) { | |
|       alf_luma_num_clipping_values_minus1 | ue(v) |
|       for( clipIdx = 0; clipIdx <= alf_luma_num_clipping_values_minus1; clipIdx++ ) | |
|         alf_luma_clipping_value[ clipIdx ] | u(bitDepthY) |
|     } | |
|   } | |
|   if( alf_chroma_clip ) { | |
|     alf_chroma_clip_default_table | u(1) |
|     if( !alf_chroma_clip_default_table ) { | |
|       alf_chroma_num_clipping_values_minus1 | ue(v) |
|       for( clipIdx = 0; clipIdx <= alf_chroma_num_clipping_values_minus1; clipIdx++ ) | |
|         alf_chroma_clipping_value[ clipIdx ] | u(bitDepthC) |

TABLE 4-continued nonlinear ALF data syntax

| | Descriptor |
|---|---|
|     } | |
|   } | |
|   alf_luma_num_filters_signalled_minus1 | |
|   if( alf_luma_num_filters_signalled_minus1 > 0 ) { | |
|     for( filtIdx = 0; filtIdx < NumAlfFilters; filtIdx++ ) | |
|       alf_luma_coeff_delta_idx[ filtIdx ] | tb(v) |
|     if( alf_luma_clip ) { | |
|       for( sigFiltIdx = 0; sigFiltIdx <= alf_luma_num_filters_signalled_minus1; sigFiltIdx++ ) | |
|         alf_luma_filter_clip[ sigFiltIdx ] | u(1) |
|     } | |
|   } | |
|   alf_luma_coeff_delta_flag | u(1) |
|   if ( !alf_luma_coeff_delta_flag && alf_luma_num_filters_signalled_minus1 > 0 ) | |
|     alf_luma_coeff_delta_prediction_flag | u(1) |
|   alf_luma_min_eg_order_minus1 | ue(v) |
|   for( i = 0; i < 3; i++ ) | |
|     alf_luma_eg_order_increase_flag[ i ] | u(1) |
|   if ( alf_luma_coeff_delta_flag ) { | |
|     for( sigFiltIdx = 0; sigFiltIdx <= alf_luma_num_filters_signalled_minus1; sigFiltIdx++ ) | |
|       alf_luma_coeff_flag[ sigFiltIdx ] | u(1) |
|   } | |
|   for( sigFiltIdx = 0; sigFiltIdx <= alf_luma_num_filters_signalled_minus1; sigFiltIdx++ ) { | |
|     if ( alf_luma_coeff_flag[ sigFiltIdx ] ) { | |
|       for( j = 0; j < 12; j++ ) { | |
|         alf_luma_coeff_delta_abs[ sigFiltIdx ][ j ] | uek(v) |
|         if( alf_luma_coeff_delta_abs[ sigFiltIdx ][ j ] ) | |
|           alf_luma_coeff_delta_sign[ sigFiltIdx ][ j ] | u(1) |
|       } | |
|     } | |
|   } | |
|   if ( alf_chroma_idc > 0 ) { | |
|     alf_chroma_min_eg_order_minus1 | ue(v) |
|     for( i = 0; i < 2; i++ ) | |
|       alf_chroma_eg_order_increase_flag[ i ] | u(1) |
|     for( j = 0; j < 6; j++ ) { | |
|       alf_chroma_coeff_abs[ j ] | uek(v) |
|       if( alf_chroma_coeff_abs[ j ] > 0 ) | |
|         alf_chroma_coeff_sign[ j ] | u(1) |
|     } | |
|   } | |
|   if( alf_luma_clip ) { | |
|     alf_luma_clip_min_eg_order_minus1 | ue(v) |
|     for( i = 0; i < 3; i++ ) | |
|       alf_luma_clip_eg_order_increase_flag[ i ] | u(1) |
|     for( sigFiltIdx = 0; sigFiltIdx <= alf_luma_num_filters_signalled_minus1; sigFiltIdx++ ) { | |
|       if ( alf_luma_coeff_flag[ sigFiltIdx ] && alf_luma_filter_clip[ sigFiltIdx ] ) { | |
|         for ( j = 0; j < 12; j++ ) { | |
|           if(AlfCoeff$_L$[ filtIdx ][ j ] ) | |
|             alf_luma_clip_idx[ sigFiltIdx ][ j ] | uek(v) |
|         } | |
|       } | |
|     } | |
|   } | |
|   if ( alf_chroma_idc > 0 && alf_chroma_clip ) { | |
|     alf_chroma_clip_min_eg_order_minus1 | ue(v) |
|     for( i = 0; i < 2; i++ ) | |
|       alf_chroma_clip_eg_order_increase_flag[ i ] | u(1) |
|     for( j = 0; j < 6; j++ ) { | |
|       if( AlfCoeff$_C$[ j ] ) | |
|         alf_chroma_clip_idx[ j ] | uek(v) |
|     } | |
|   } | |
| } | |

The nonlinear adaptive loop filter (ALF) data syntax of Table 4 is used to define an adaptation parameter set (shown in Table 1). The semantics of nonlinear ALF data syntax elements are as follow:

Adaptive Loop Filter Data Semantics alf_chroma_idc equal to 0 specifies that the adaptive loop filter is not applied to Cb and Cr colour components. alf_chroma_idc equal to 1 indicates that the adaptive loop filter is applied to the Cb colour component. alf_chroma_idc equal to 2 indicates that the adaptive loop filter is applied to the Cr colour component. alf_chroma_idc equal to 3 indicates that the adaptive loop filter is applied to Cb and Cr colour components.

The maximum value maxVal of the truncated unary binarization tu(v) is set equal to 3.

The variable NumAlfFilters specifying the number of different adaptive loop filters is set equal to 25.

alf_luma_num_filters_signalled_minus1 plus 1 specifies the number of adaptive loop filter classes for which luma coefficients can be signalled. The value of alf_luma_num_filters_signalled_minus1 shall be in the range of 0 to NumAlfFilters−1, inclusive.

The maximum value maxVal of the truncated binary binarization tb(v) is set equal to NumAlfFilters−1.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0.

The maximum value maxVal of the truncated binary binarization tb(v) is set equal to alf_luma_num_filters_signalled_minus1.

alf_luma_coeff_delta_flag equal to 1 indicates that alf_luma_coeff_delta_prediction_flag is not signalled. alf_luma_coeff_delta_flag equal to 0 indicates that alf_luma_coeff_delta_prediction_flag may be signalled.

alf_luma_coeff_delta_prediction_flag equal to 1 specifies that the signalled luma filter coefficient deltas are predicted from the deltas of the previous luma coefficients. alf_luma_coeff_delta_prediction_flag equal to 0 specifies that the signalled luma filter coefficient deltas are not predicted from the deltas of the previous luma coefficients. When not present, alf_luma_coeff_delta_prediction_flag is inferred to be equal to 0.

alf_luma_min_eg_order_minus1 plus 1 specifies the minimum order of the exp-Golomb code for luma filter coefficient signalling. The value of alf_luma_min_eg_order_minus1 shall be in the range of 0 to 6, inclusive.

alf_luma_eg_order_increase_flag[i] equal to 1 specifies that the minimum order of the exp-Golomb code for luma filter coefficient signalling is incremented by 1. alf_luma_eg_order_increase_flag[i] equal to 0 specifies that the minimum order of the exp-Golomb code for luma filter coefficient signalling is not incremented by 1.

The order expGoOrderY[i] of the exp-Golomb code used to decode the values of alf_luma_coeff_delta_abs[sigFiltIdx][j] is derived as follows:

expGoOrderY[i]=alf_luma_min_eg_order_minus1+1+alf_luma_eg_order_increase_flag[i]

alf_luma_coeff_flag[sigFiltIdx] equal 1 specifies that the coefficients of the luma filter indicated by sigFiltIdx are signalled. alf_luma_coeff_flag[sigFiltIdx] equal to 0 specifies that all filter coefficients of the luma filter indicated by sigFiltIdx are set equal to 0. When not present, alf_luma_coeff_flag[sigFiltIdx] is set equal to 1.

alf_luma_coeff_delta_abs[sigFiltIdx][j] specifies the absolute value of the j-th coefficient delta of the signalled luma filter indicated by sigFiltIdx. When alf_luma_coeff_delta_abs[sigFiltIdx][j] is not present, it is inferred to be equal 0.

The order k of the exp-Golomb binarization uek(v) is derived as follows:

golombOrderIdxY[ ]={0, 0, 1, 0, 0, 1, 2, 1, 0, 0, 1, 2}
k=expGoOrderY[golombOrderIdxY[j]]

alf_luma_coeff_delta_sign[sigFiltIdx][j] specifies the sign of the j-th luma coefficient of the filter indicated by sigFiltIdx as follows:

If alf_luma_coeff_delta_sign[sigFiltIdx][j] is equal to 0, the corresponding luma filter coefficient has a positive value.

Otherwise (alf_luma_coeff_delta_sign[sigFiltIdx][j] is equal to 1), the corresponding luma filter coefficient has a negative value.

When alf_luma_coeff_delta_sign[sigFiltIdx][j] is not present, it is inferred to be equal to 0.

The variable filterCoefficients[sigFiltIdx][j] with sigFiltIdx=0 . . . alf_luma_num_filters_signalled_minus1, j=0 . . . 11 is initialized as follows: filterCoefficients[sigFiltIdx][j]=alf_luma_coeff_delta_abs[sigFiltIdx][L]*(1−2*alf_luma_coeff_delta_sign[sigFiltIdx][j])

When alf_luma_coeff_delta_prediction_flag is equal 1, filterCoefficients[sigFiltIdx][j] with sigFiltIdx=1 . . . alf_luma_num_filters_signalled_minus1 and j=0 . . . 11 are modified as follows:

filterCoefficients[sigFiltIdx][j]+=filterCoefficients[sigFiltIdx−1][j]

The luma filter coefficients AlfCoeffL with elements AlfCoeffL[filtIdx][j], with filtIdx=0 . . . NumAlfFilters−1 and j=0 . . . 11 are derived as follows AlfCoeffL[filtIdx][j]=filterCoefficients[alf_luma_coeff_delta_idx[filtIdx]][j]

The last filter coefficients AlfCoeffL[filtIdx][12] for filtIdx=0 . . . NumAlfFilters−1 are derived as follows:

AlfCoeffL[filtIdx][12]=128

It is a requirement of bitstream conformance that the values of AlfCoeffL[filtIdx][j] with filtIdx=0 . . . NumAlfFilters−1, j=0 . . . 11 shall be in the range of −2^7 to 2^7−1, inclusive and that the values of AlfCoeffL[filtIdx][12] shall be in the range of 0 to 2^8−1, inclusive.

alf_chroma_min_eg_order_minus1 plus 1 specifies the minimum order of the exp-Golomb code for chroma filter coefficient signalling. The value of alf_chroma_min_eg_order_minus1 shall be in the range of 0 to 6, inclusive.

alf_chroma_eg_order_increase_flag[i] equal to 1 specifies that the minimum order of the exp-Golomb code for chroma filter coefficient signalling is incremented by 1. alf_chroma_eg_order_increase_flag[i] equal to 0 specifies that the minimum order of the exp-Golomb code for chroma filter coefficient signalling is not incremented by 1

The order expGoOrderC[i] of the exp-Golomb code used to decode the values of alf_chroma_coeff_abs[j] is derived as follows:

expGoOrderC[i]=alf_chroma_min_eg_order_minus1+1+alf_chroma_eg_order_increase_flag[i]

alf_chroma_coeff_abs[j] specifies the absolute value of the j-th chroma filter coefficient. When alf_chroma_coeff_abs[j] is not present, it is inferred to be equal 0. It is a requirement of bitstream conformance that the values of alf_chroma_coeff_abs[j] shall be in the range of 0 to 2^7−1, inclusive.

The order k of the exp-Golomb binarization uek(v) is derived as follows:

golombOrderIdxC[ ]={0, 0, 1, 0, 0, 1}
k=expGoOrderC[golombOrderIdxC[j]]

alf_chroma_coeff_sign[j] specifies the sign of the j-th chroma filter coefficient as follows:

If alf_chroma_coeff_sign[j] is equal to 0, the corresponding chroma filter coefficient has a positive value.

Otherwise (alf_chroma_coeff_sign[j] is equal to 1), the corresponding chroma filter coefficient has a negative value.

When alf_chroma_coeff_sign[j] is not present, it is inferred to be equal to 0.

The chroma filter coefficients AlfCoeffC with elements cC[j], with j=0 . . . 5 are derived as follows:

AlfCoeffC[j]=alf_chroma_coeff_abs[j]*(1-2*alf_chroma_coeff_sign[j])

The last filter coefficient for j=6 is derived as follows:

AlfCoeffC[6]=128

It is a requirement of bitstream conformance that the values of AlfCoeffC[j] with j=0 . . . 5 shall be in the range of $-2^7-1$ to $2^7-1$, inclusive and that the values of AlfCoeffC[6] shall be in the range of 0 to $2^8-1$, inclusive.

alf_luma_clip equal to 0 specifies that linear adaptive loop filter is applied on luma component. alf_luma_clip equal to 1 specifies that non-linear adaptive loop filter may be applied on luma component.

alf_chroma_clip equal to 0 specifies that linear adaptive loop filter is applied chroma components; alf_chroma_clip equal to 1 specifies that non-linear adaptive loop filter is applied on chroma component. If not present alf_chroma_clip is inferred as 0.

alf_luma_clip_default_table equal to 1 specifies that default alf_luma_clipping_value[ ] table is used for converting clipping index to clipping value. Alf_luma_clip_default_table equal to 0 indicated that alf_luma_clipping_value[ ] table is present in alf_data( ).

alf_luma_num_clipping_values_minus1 plus one indicates the size of the alf_luma_clipping_value[ ] table. If not present it is inferred equal bitDepthY.

alf_luma_clipping_value[clipIdx] specifies the clipping value to use when clipping index clipIdx is signaled in alf_luma_clip_idx[ ][ ] table. When not present, it is inferred to be alf_luma_clipping_value[ ]={1<<bitDepthY, 1<<(bitDepthY-1), . . . , 8, 4, 2}.

For convenience, alf_luma_clipping_value[alf_luma_num_clipping_values_minus1+1] is inferred equal to 1<<bitDepthY.

alf_chroma_clip_default_table equal to 1 specifies that default alf_chroma_clipping_value[ ] table is used for converting clipping index to clipping value; alf_chroma_clip_default_table equal to 0 indicated that alf_chroma_clipping_value[ ] table is present in alf_data( ).

alf_chroma_num_clipping_values_minus1 plus one indicates the size of the alf_chroma_clipping_value[ ] table. If not present it is inferred equal bitDepthC.

alf_chroma_clipping_value[clipIdx] specifies the clipping value to use when clipping index clipIdx is signaled in alf_chroma_clip_idx[ ][ ] table. When not present, it is inferred to be alf_chroma_clipping_value[ ]={1<<bitDepthC, 1<<(bitDepthC-1), . . . , 8, 4, 2}.

For convenience, alf_chroma_clipping_value[alf_chroma_num_clipping_values_minus1+1] is inferred equal to 1<<bitDepthC.

alf_luma_filter_clip[sigFiltIdx] equal to 0 specifies that linear adaptive loop filter is applied with the luma filter indicated by sigFiltIdx. alf_luma_filter_clip[sigFiltIdx] equal to 1 specifies that non-linear adaptive loop filter is applied with the luma filter indicated by sigFiltIdx.

alf_luma_clip_min_eg_order_minus1 plus 1 specifies the minimum order of the exp-Golomb code for luma filter coefficient signalling. The value of alf_luma_clip_min_eg_order_minus1 shall be in the range of 0 to 6, inclusive.

alf_luma_clip_eg_order_increase_flag[i] equal to 1 specifies that the minimum order of the exp-Golomb code for luma filter coefficient signalling is incremented by 1. alf_luma_clip_eg_order_increase_flag[i] equal to 0 specifies that the minimum order of the exp-Golomb code for luma filter coefficient signalling is not incremented by 1.

The order expGoOrderYClip[i] of the exp-Golomb code used to decode the values of alf_luma_clip_idx[sigFiltIdx][j] is derived as follows:

expGoOrderYClip[i]=alf_luma_clip_min_eg_order_minus1+1+alf_luma_clip_eg_order_increase_flag[i]

alf_luma_clip_idx[sigFiltIdx][j] specifies the clipping index of the clipping to use before multiplying by the j-th coefficient of the signalled luma filter indicated by sigFiltIdx. When alf_luma_clip_idx[sigFiltIdx][j] is not present, it is inferred to be equal alf_luma_num_clipping_values_minus1+1 (no clipping).

The order k of the exp-Golomb binarization uek(v) is derived as follows:

golombOrderIdxYClip[ ]={0, 0, 1, 0, 0, 1, 2, 1, 0, 0, 1, 2} k=expGoOrderYClip[golombOrderIdxYClip[j]]

The variable filterClips[sigFiltIdx][j] with sigFiltIdx=0 . . . alf_luma_num_filters_signalled_minus1, j=0 . . . 11 is initialized as follows:

filterClips[sigFiltIdx][j]=alf_luma_clipping_value[alf_luma_clip_idx[sigFiltIdx][j]]

The luma filter clipping values AlfClipL with elements AlfClipL[filtIdx][j], with filtIdx=0 . . . NumAlfFilters-1 and j=0 . . . 11 are derived as follows AlfClipL[filtIdx][j]=filterClips[alf_luma_coeff_delta_idx[filtIdx]][j]

alf_chroma_clip_min_eg_order_minus1 plus 1 specifies the minimum order of the exp-Golomb code for chroma filter coefficient signalling. The value of alf_chroma_clip_min_eg_order_minus1 shall be in the range of 0 to 6, inclusive.

alf_chroma_clip_eg_order_increase_flag[i] equal to 1 specifies that the minimum order of the exp-Golomb code for chroma filter coefficient signalling is incremented by 1. alf_chroma_clip_eg_order_increase_flag[i] equal to 0 specifies that the minimum order of the exp-Golomb code for chroma filter coefficient signalling is not incremented by 1

The order expGoOrderC[i] of the exp-Golomb code used to decode the values of alf_chroma_coeff_abs[j] is derived as follows:

expGoOrderC[i]=alf_chroma_clip_min_eg_order_minus1+1+alf_chroma_clip_eg_order_increase_flag[i]

alf_chroma_clip_idx[j] specifies the clipping index of the clipping to use before multiplying by the j-th coefficient of the chroma filter. When alf_chroma_clip_idx[j] is not present, it is inferred to be equal alf_chroma_num_clipping_values_minus1+1 (no clipping).

The order k of the exp-Golomb binarization uek(v) is derived as follows:

golombOrderIdxC[ ]={0, 0, 1, 0, 0, 1} k=expGoOrderC[golombOrderIdxC[j]]

The chroma filter clipping values AlfClipC with elements AlfClipC [j], with j=0 . . . 5 are derived as follows:

AlfClipC[j]=alf_chroma_clipping_value[alf_chroma_clip_idx[j]]

According to a variant, alf_luma_num_clipping_values_minus1 is replaced by alf_luma_num_clipping_values_minus2 and the clipping values are provided from index=1 to alf_luma_num_clipping_values_minus2+1, and the first value of alf_luma_clipping_value[ ] is inferred as alf_luma_clipping_value[0]=1<<bitDepthY. alf_chroma_num_clipping_values_minus1 is replaced by alf_chroma_num_clipping_values_minus2 and the clipping values are provided from index=1 to alf_chroma_num_clipping_values_minus2+1, and the first value of alf_chroma_clipping_value[ ] is inferred as alf_chroma_clipping_value[0]=1<<bitDepthC.

According to a variant, an adaptive loop filtering process uses above syntax elements. Such a variant is described using notation convention of VVC draft specification below.

Adaptive Loop Filter Process

General

Inputs of this process are the reconstructed picture sample arrays prior to adaptive loop filter recPictureL, recPictureCb and recPictureCr.

Outputs of this process are the modified reconstructed picture sample arrays after adaptive loop filter alfPictureL, alfPictureCb and alfPictureCr.

The sample values in the modified reconstructed picture sample arrays after adaptive loop filter alfPictureL, alfPictureCb and alfPictureCr are initially set equal to the sample values in the reconstructed picture sample arrays prior to adaptive loop filter recPictureL, recPictureCb and recPictureCr, respectively.

When tile_group_alf_enabled_flag is equal to 1, for every coding tree unit with luma coding tree block location (rx, ry), where rx=0 . . . PicWidthInCtbs−1 and ry=0 . . . PicHeightInCtbs−1, the following applies:

When alf_ctb_flag[0][rx][ry] is equal to 1, the coding tree block filtering process for luma samples as specified in clause 'Coding tree block filtering process for luma samples' is invoked with recPictureL, alfPictureL, and the luma coding tree block location (xCtb, yCtb) set equal to (rx<<CtbLog 2SizeY, ry<<CtbLog 2SizeY) as inputs, and the output is the modified filtered picture alfPictureL.

When alf_ctb_flag[1][rx][ry] is equal to 1, the coding tree block filtering process for chroma samples as specified in clause 'Coding tree block filtering process for chroma samples' is invoked with recPicture set equal to recPictureCb, alfPicture set equal to alfPictureCb, and the chroma coding tree block location (xCtbC, yCtbC) set equal to (rx<<(CtbLog 2SizeY−1), ry<<(CtbLog 2SizeY−1)) as inputs, and the output is the modified filtered picture alfPictureCb.

When alf_ctb_flag[2][rx][ry] is equal to 1, the coding tree block filtering process for chroma samples as specified in clause 'Coding tree block filtering process for chroma samples' is invoked with recPicture set equal to recPictureCr, alfPicture set equal to alfPictureCr, and the chroma coding tree block location (xCtbC, yCtbC) set equal to (rx<<(CtbLog 2SizeY−1), ry<<(CtbLog 2SizeY−1)) as inputs, and the output is the modified filtered picture alfPictureCr.

Coding Tree Block Filtering Process for Luma Samples

Inputs of this process are: a reconstructed luma picture sample array recPictureL prior to the adaptive loop filtering process, a filtered reconstructed luma picture sample array alfPictureL, a luma location (xCtb, yCtb) specifying the top-left sample of the current luma coding tree block relative to the top left sample of the current picture.

Output of this process is the modified filtered reconstructed luma picture sample array alfPictureL.

The derivation process for filter index clause 'Derivation process for ALF transpose and filter index for luma samples' is invoked with the location (xCtb, yCtb) and the reconstructed luma picture sample array recPictureL as inputs, and filtIdx[x][y] and transposeIdx[x][y] with x, y=0 . . . CtbSizeY−1 as outputs.

For the derivation of the filtered reconstructed luma samples alfPictureL[x][y], each reconstructed luma sample inside the current luma coding tree block recPictureL[x][y] is filtered as follows with x, y=0 . . . CtbSizeY−1:

The array of luma filter coefficients f[j] and the array of luma filter clipping c[j] corresponding to the filter specified by filtIdx[x][y] are derived as follows with j=0 . . . 12:

f[j]=AlfCoeffL[filtIdx[x][y]][j]

c[j]=AlfClipL[filtIdx[x][y]][j]

The luma filter coefficients filterCoeff and the filter clipping values filterClip are derived depending on transposeIdx[x][y] as follows:

If transposeIndex[x][y]==1, filterCoeff[ ]={f[9], f[4], f[10], f[8], f[1], f[5], f[11], f[7], f[3], f[0], f[2], f[6], f[12] } filterClip[ ]={c[9], c[4], c[10], c[8], c[1], c[5], c[11], c[7], c[3], c[0], c[2], c[6], c[12] }

Otherwise, if transposeIndex[x][y]==2, filterCoeff[ ]={f[0], f[3], f[2], f[1], f[8], f[7], f[6], f[5], f[4], f[9], f[10], f[11], f[12] } filterClip[ ]={c[0], c[3], c[2], c[1], c[8], c[7], c[6], c[5], c[4], c[9], c[10], c[11], c[12] }

Otherwise, if transposeIndex[x][y]==3, filterCoeff[ ]={f[9], f[8], f[10], f[4], f[3], f[7], f[11], f[5], f[1], f[0], f[2], f[6], f[12] } filterClip[ ]={c[9], c[8], c[10], c[4], c[3], c[7], c[11], c[5], c[1], c[0], c[2], c[6], c[12] }

Otherwise, filterCoeff[ ]={f[0], f[1], f[2], f[3], f[4], f[5], f[6], f[7], f[8], f[9], f[10], f[11], f[12] } filterClip[ ]={c[0], c[1], c[2], c[3], c[4], c[5], c[6], c[7], c[8], c[9], c[10], c[11], c[12] }

The locations (hx, vy) for each of the corresponding luma samples (x, y) inside the given array recPicture of luma samples are derived as follows:

hx=Clip3(0, pic_width_in_luma_samples−1, xCtb+x)

vy=Clip3(0, pic_height_in_luma_samples−1, yCtb+y)

The variable curr is derived as follow: curr=recPictureL[hx, vy]

The variable sum is derived as follows:

sum=filterCoeff[0]*(Clip3(−filterClip[0], filterClip[0], recPictureL[hx, vy+3]−curr)+Clip3(−filterClip[0], filterClip[0], recPictureL[hx, vy−3]−curr))

+filterCoeff[1]*(Clip3(−filterClip[1], filterClip[1], recPictureL[hx+1, vy+2]+curr)+Clip3(−filterClip[1], filterClip[1], recPictureL[hx−1, vy−2]−curr))

+filterCoeff[2]*(Clip3(−filterClip[2], filterClip[2], recPictureL[hx, vy+2]−curr)+Clip3(−filterClip[2], filterClip[2], recPictureL[hx, vy−2]−curr))

+filterCoeff[3]*(Clip3(−filterClip[3], filterClip[3], recPictureL[hx−1, vy+2]−curr)+Clip3(−filterClip[3], filterClip[3], recPictureL[hx+1, vy−2]−curr))

+filterCoeff[4]*(Clip3(−filterClip[4], filterClip[4], recPictureL[hx+2, vy+1]−curr)+Clip3(−filterClip[4], filterClip[4], recPictureL[hx−2, vy−1]−curr))

+filterCoeff[5]*(Clip3(−filterClip[5], filterClip[5], recPictureL[hx+1, vy+1]−curr)+Clip3(−filterClip[5], filterClip[5], recPictureL[hx−1, vy−1]−curr))

+filterCoeff[6]*(Clip3(−filterClip[6], filterClip[6], recPictureL[hx, vy+1]−curr)+Clip3(−filterClip[6], filterClip[6], recPictureL[hx, vy−1]−curr))

+filterCoeff[7]*(Clip3(−filterClip[7], filterClip[7], recPictureL[hx−1, vy+1]−curr)+Clip3(−filterClip[7], filterClip[7], recPictureL[hx+1, vy−1]−curr))

+filterCoeff[8]*(Clip3(−filterClip[8], filterClip[8], recPictureL[hx−2, vy+1]−curr)+Clip3(−filterClip[8], filterClip[8], recPictureL[hx+2, vy−1]−curr))

+filterCoeff[9]*(Clip3(−filterClip[9], filterClip[9], recPictureL[hx+3, vy]−curr)+Clip3(−filterClip[9], filterClip[9], recPictureL[hx−3, vy]−curr))

+filterCoeff[10]*(Clip3(−filterClip[10], filterClip[10], recPictureL[hx+2, vy]−curr)+Clip3(−filterClip[10], filterClip[10], recPictureL[hx−2, vy]−curr))

+filterCoeff[11]*(Clip3(−filterClip[11], filterClip[11], recPictureL[hx+1, vy]−curr)+Clip3(−filterClip[11], filterClip[11], recPictureL[hx−1, vy]−curr))

+filterCoeff[12]*recPictureL[hx, vy]

sum=(sum+64)>>7

The modified filtered reconstructed luma picture sample alfPictureL[xCtb+x][yCtb+y] is derived as follows:

alfPictureL[xCtb+x][yCtb+y]=Clip3(0, (1<<BitDepthY)−1, sum)

Derivation Process for ALF Transpose and Filter Index for Luma Samples

Inputs of this process are: a luma location (xCtb, yCtb) specifying the top-left sample of the current luma coding tree block relative to the top left sample of the current picture, a reconstructed luma picture sample array recPictureL prior to the adaptive loop filtering process.

Outputs of this Process are the classification filter index array filtIdx[x][y] with x, y=0 . . . CtbSizeY−1, the transpose index array transposeIdx[x][y] with x, y=0 . . . CtbSizeY−1.

The locations (hx, vy) for each of the corresponding luma samples (x, y) inside the given array recPicture of luma samples are derived as follows:

hx=Clip3(0, pic_width_in_luma_samples−1, x)

vy=Clip3(0, pic_height_in_luma_samples−1, y)

The classification filter index array filtIdx and the transpose index array transposeIdx are derived by the following ordered steps:

1) The variables filtH[x][y], filtV[x][y], filtD0[x][y] and filtD1[x][y] with x, y=−2 . . . CtbSizeY+1 are derived as follows:

If both x and y are even numbers or both x and y are uneven numbers, the following applies:

filtH[x][y]=Abs((recPicture[hxCtb+x, vyCtb+y]<<1)−recPicture[hxCtb+x−1, vyCtb+y]−recPicture[hxCtb+x+1, vyCtb+y])

filtV[x][y]=Abs((recPicture[hxCtb+x, vyCtb+y]<<1)−recPicture[hxCtb+x, vyCtb+y−1]−recPicture[hxCtb+x, vyCtb+y+1])

filtD0[x][y]=Abs((recPicture[hxCtb+x, vyCtb+y]<<1)−recPicture[hxCtb+x−1, vyCtb+y−1]−recPicture[hxCtb+x+1, vyCtb+y+1])

filtD1[x][y]=Abs((recPicture[hxCtb+x, vyCtb+y]<<1)−recPicture[hxCtb+x+1, vyCtb+y−1]−recPicture[hxCtb+x−1, vyCtb+y+1])

Otherwise, filtH[x][y], filtV[x][y], filtD0[x][y] and filtD1[x][y] are set equal to 0.

2) The variables varTempH1[x][y], varTempV1[x][y], varTempD01[x][y], varTempD11[x][y] and varTemp[x][y] with x, y=0 . . . (CtbSizeY−1)>>2 are derived as follows:

sumH[x][y]=ΣiΣj filtH[(x<<2)+i][(y<<2)+j] with i, j=−2 . . . 5 sumV [x][y]=ΣiΣj filtV [(x<<2)+i][(y<<2)+j] with i, j=−2 . . . 5 sumD0[x][y]=ΣiΣj filtD0[(x<<2)+i][(y<<2)+j] with i, j=−2 . . . 5 sumD1[x][y]=ΣiΣj filtD1[(x<<2)+i][(y<<2)+j] with i, j=−2 . . . 5 sumOfHV[x][y]=sumH[x][y]+sumV[x][y]

3) The variables dir1[x][y], dir2[x][y] and dirS[x][y] with x, y=0 . . . CtbSizeY−1 are derived as follows:

The variables hv1, hv0 and dirHV are derived as follows:

If sumV [x>>2][y>>2] is greater than sumH[x>>2][y>>2], the following applies:

hv1=sumV[x>>2][y>>2]

hv0=sumH[x>>2][y>>2]

dirHV=1

Otherwise, the following applies:

hv1=sumH[x>>2][y>>2]

hv0=sumV[x>>2][y>>2]

dirHV=3

The variables d1, d0 and dirD are derived as follows:

If sumD0[x>>2][y>>2] is greater than sumD1[x>>2][y>>2], the following applies:

d1=sumD0[x>>2][y>>2]

d0=sumD1[x>>2][y>>2]

dirD=0

Otherwise, the following applies:

d1=sumD1[x>>2][y>>2]

d0=sumD0[x>>2][y>>2]

dirD=2

The variables hvd1, hvd0, are derived as follows:

hvd1=(d1*hv0>hv1*d0)? d1: hv1 hvd0=(d1*hv0>hv1*d0)? d0: hv0

The variables dirS[x][y], dir1[x][y] and dir2[x][y] derived as follows:

dir1[x][y]=(d1*hv0>hv1*d0)? dirD: dirHV dir2[x][y]=(d1*hv>hv1*d0)? dirHV: dirD dirS[x][y]=(hvd1>2*hvd0)? 1: ((hvd1*2>9*hvd0)? 2:0)

4) The variable avgVar[x][y] with x, y=0 . . . CtbSizeY−1 is derived as follows:

varTab[ ]={0, 1, 2, 2, 2, 2, 2, 3, 3, 3, 3, 3, 3, 3, 3, 4} avgVar[x][y]=varTab[Clip3(0, 15, (sumOfHV[x>>2][y>>2]*64)>>(3+BitDepthY))]

5) The classification filter index array filtIdx[x][y] and the transpose index array transposeIdx[x][y] with x=y=0 . . . CtbSizeY−1 are derived as follows:

transposeTable[ ]={0, 1, 0, 2, 2, 3, 1, 3} transposeIdx[x][y]=transposeTable[dir1[x][y]*2+(dir2[x][y]>>1)]

filtIdx[x][y]=avgVar[x][y]

When dirS [x][y] is not equal 0, filtIdx[x][y] is modified as follows:

filtIdx[x][y]+=(((dir1[x][y]& 0x1)<<1)+dirS[x][y])*5

Coding Tree Block Filtering Process for Chroma Samples

Inputs of this process are: a reconstructed chroma picture sample array recPicture prior to the adaptive loop filtering process, a filtered reconstructed chroma picture sample array alfPicture, a chroma location (xCtbC, yCtbC) specifying the top-left sample of the current chroma coding tree block relative to the top left sample of the current picture.

Output of this process is the modified filtered reconstructed chroma picture sample array alfPicture.

The size of the current chroma coding tree block ctbSizeC is derived as follows: ctbSizeC=CtbSizeY/SubWidthC For the derivation of the filtered reconstructed chroma samples alfPicture[x][y], each reconstructed chroma sample inside the current chroma coding tree block recPicture[x][y] is filtered as follows with x, y=0 . . . ctbSizeC−1:

The locations (hx, vy) for each of the corresponding chroma samples (x, y) inside the given array recPicture of chroma samples are derived as follows:

hx=Clip3(0, pic_width_in_luma_samples/SubWidthC−1, xCtbC+x)

vy=Clip3(0, pic_height_in_luma_samples/SubHeightC−1, yCtbC+y)

The variable curr is derived as follow:
curr=recPicture[hx, vy]
The variable sum is derived as follows:
sum=AlfCoeffC[0]*(Clip3(−AlfClipC[0], AlfClipC[0], recPicture[hx, vy+2]−curr)+Clip3(−AlfClipC[0], AlfClipC[0], recPicture[hx, vy−2]−curr))
+AlfCoeffC[1]*(Clip3(−AlfClipC[1], AlfClipC[1], recPicture[hx+1, vy+1]−curr)+Clip3(−AlfClipC[1], AlfClipC[1], recPicture[hx−1, vy−1]−curr))
+AlfCoeffC[2]*(Clip3(−AlfClipC[2], AlfClipC[2], recPicture[hx, vy+1]−curr)+Clip3(−AlfClipC[2], AlfClipC[2], recPicture[hx, vy−1]−curr))
+AlfCoeffC[3]*(Clip3(−AlfClipC[3], AlfClipC[3], recPicture[hx−1, vy+1]−curr)+Clip3(−AlfClipC[3], AlfClipC[3], recPicture[hx+1, vy−1]−curr))
+AlfCoeffC[4]*(Clip3(−AlfClipC[4], AlfClipC[4], recPicture[hx+2, vy]−curr)+Clip3(−AlfClipC[4], AlfClipC[4], recPicture[hx−2, vy]−curr))
+AlfCoeffC[5]*(Clip3(−AlfClipC[5], AlfClipC[5], recPicture[hx+1, vy]−curr)+Clip3(−AlfClipC[5], AlfClipC[5], recPicture[hx−1, vy]−curr))
+AlfCoeffC[6]*recPicture[hx, vy]
sum=(sum+64)>>7

The modified filtered reconstructed chroma picture sample alfPicture[xCtbC+x][yCtbC+y] is derived as follows:
alfPicture[xCtbC+x][yCtbC+y]=Clip3(0, (1<<BitDepthC)−1, sum)

In the above variant, the clipping operation is applied to the difference between a neighbour sample and the filtered sample (i.e. equation (7) is used). In another variant which uses equation (9), its semantics and filtering process are modified as follow (modified based on the above variant's semantics and filtering process):

AlfCoeffL[filtIdx][12] would be derived as: AlfCoeffL[filtIdx][12]=128−$\Sigma_k$ (AlfCoeffL[filtIdx][k]<<1), with k=0 . . . 11

AlfCoeffC[6] would be derived as: AlfCoeffC[6]=128−$\Sigma_k$ (AlfCoeffC[k]<<1), with k=0 . . . 5

The restriction on the bit depth of AlfCoeffL[filtIdx][12] and AlfCoeffC[6], which is that they shall be in the range of 0 to 2^8−1 inclusive, is relaxed to the range of 0 to 2^9−1 Or even to the range of 0 to 2^10−1 in order to obtain better filtering performances.

This is because with clipping operations, it often occurs that coefficients associated with neighbour sample positions have to be higher (in absolute value) for better efficiency (because filter input samples are more reliable, i.e. more likely to provide better filtering, once non-linear function has been applied). As a result it occurs frequently that the sum of those coefficients (so, not including the centre coefficient) is lower −128 (in fixed point representation) so that the centre coefficient has to be higher than 256 (in fixed point representation). Thus, restricting centre coefficient to be in a normative range of 0 to 2^8−1, implies that the encoder needs to find sub-optimal coefficients, by reducing their dynamic/amplitude, resulting in a less efficient filtering. By using a normative range of 10-bits precision (i.e. a range of 0 to 2^10−1) on the centre coefficient, it is much less frequent that the encoder has to use sub-optimal filter coefficients, and thus the overall filtering quality is increased compared to the 8 bits precision. For ALF linear filtering the restriction to 8-bits on the centre coefficient does not affect so much the filter efficiency because neighbour filter input samples often have smaller weight (i.e. smaller coefficients). While with clipping, i.e. ALF nonlinear filtering, optimal filters may give more weight to neighbour samples, which once clipped are more reliable.

The variable sum in the 'coding tree block filtering process for luma samples' is derived as follows:
sum=filterCoeff[0]*(Clip3(curr−filterClip[0], curr+filterClip[0], recPictureL[hx, vy+3])+Clip3(curr−filterClip[0], curr+filterClip[0], recPictureL[hx, vy−3]))
+filterCoeff[1]*(Clip3(curr−filterClip[1], curr+filterClip[1], recPictureL[hx+1, vy+2])+Clip3(curr−filterClip[1], curr+filterClip[1], recPictureL[hx−1, vy−2]))
+filterCoeff[2]*(Clip3(curr−filterClip[2], curr+filterClip[2], recPictureL[hx, vy+2])+Clip3(curr−filterClip[2], curr+filterClip[2], recPictureL[hx, vy−2]))
+filterCoeff[3]*(Clip3(curr−filterClip[3], curr+filterClip[3], recPictureL[hx−1, vy+2])+Clip3(curr−filterClip[3], curr+filterClip[3], recPictureL[hx+1, vy−2]))
+filterCoeff[4]*(Clip3(curr−filterClip[4], curr+filterClip[4], recPictureL[hx+2, vy+1])+Clip3(curr−filterClip[4], curr+filterClip[4], recPictureL[hx−2, vy−1]))
+filterCoeff[5]*(Clip3(curr−filterClip[5], curr+filterClip[5], recPictureL[hx+1, vy+1])+Clip3(curr−filterClip[5], curr+filterClip[5], recPictureL[hx−1, vy−1]))
+filterCoeff[6]*(Clip3(curr−filterClip[6], curr+filterClip[6], recPictureL[hx, vy+1])+Clip3(curr−filterClip[6], curr+filterClip[6], recPictureL[hx, vy−1]))
+filterCoeff[7]*(Clip3(curr−filterClip[7], curr+filterClip[7], recPictureL[hx−1, vy+1])+Clip3(curr−filterClip[7], curr+filterClip[7], recPictureL[hx+1, vy−1]))
+filterCoeff[8]*(Clip3(curr−filterClip[8], curr+filterClip[8], recPictureL[hx−2, vy+1])+Clip3(curr−filterClip[8], curr+filterClip[8], recPictureL[hx+2, vy−1]))
+filterCoeff[9]*(Clip3(curr−filterClip[9], curr+filterClip[9], recPictureL[hx+3, vy])+Clip3(curr−filterClip[9], curr+filterClip[9], recPictureL[hx−3, vy]))
+filterCoeff[10]*(Clip3(curr−filterClip[10], curr+filterClip[10], recPictureL[hx+2, vy])+Clip3(curr−filterClip[10], curr+filterClip[10], recPictureL[hx−2, vy]))
+filterCoeff[11]*(Clip3(curr−filterClip[11], curr+filterClip[11], recPictureL[hx+1, vy])+Clip3(curr−filterClip[11], curr+filterClip[11], recPictureL[hx−1, vy]))
+filterCoeff[12]*recPictureL[hx, vy]
sum=(sum+64)>>7

The variable sum in the 'coding tree block filtering process for chroma samples' is derived as follows:
sum=AlfCoeffC[0]*(Clip3(curr−AlfClipC[0], curr+AlfClipC[0], recPicture[hx, vy+2])+Clip3(curr−AlfClipC[0], AlfClipC[0], recPicture[hx, vy−2]))
+AlfCoeffC[1]*(Clip3(curr−AlfClipC[1], curr+AlfClipC[1], recPicture[hx+1, vy+1])+Clip3(curr−AlfClipC[1], curr+AlfClipC[1], recPicture[hx−1, vy−1]))
+AlfCoeffC[2]*(Clip3(curr−AlfClipC[2], curr+AlfClipC[2], recPicture[hx, vy+1])+Clip3(curr−AlfClipC[2], curr+AlfClipC[2], recPicture[hx, vy−1]))
+AlfCoeffC[3]*(Clip3(curr−AlfClipC[3], curr+AlfClipC[3], recPicture[hx−1, vy+1])+Clip3(curr−AlfClipC[3], curr+AlfClipC[3], recPicture[hx+1, vy−1]))
+AlfCoeffC[4]*(Clip3(curr−AlfClipC[4], curr+AlfClipC[4], recPicture[hx+2, vy])+Clip3(curr−AlfClipC[4], curr+AlfClipC[4], recPicture[hx−2, vy]))
+AlfCoeffC[5]*(Clip3(curr−AlfClipC[5], curr+AlfClipC[5], recPicture[hx+1, vy])+Clip3(curr−AlfClipC[5], curr+AlfClipC[5], recPicture[hx−1, vy]))
+AlfCoeffC[6]*recPicture[hx, vy]
sum=(sum+64)>>7

In another variant using a 5×5 diamond filter shape for Luma filters (to reduce the number of buffer lines needed for applying the ALF), which also uses clipping applied to a difference between a neighbour sample value and the centre sample value, a nonlinear ALF data syntax of Table 4 is modified as follows (changes made to the previously presented ALF data syntax are both underlined and in bold, and repeated portions are omitted wherever possible):

TABLE 5 a modified portion of a nonlinear ALF data syntax

```
Alf_data( ) {
    ...
    for( sigFiltIdx = 0; sigFiltIdx <=
    alf_luma_num_filters_signalled_minus1; sigFiltIdx++ ) {
        if ( alf_luma_coeff_flag[ sigFiltIdx ] ) {
            for ( j = 0; j < 6; j++ ) {
                alf_luma_coeff_delta_abs[ sigFiltIdx ][ j ]              uek(v)
                if( alf_luma_coeff_delta_abs[ sigFiltIdx ][ j ] )
                    alf_luma_coeff_delta_sign[ sigFiltIdx ][ j ]         u(1)
            }
        }
    }
    ...
    for( sigFiltIdx = 0; sigFiltIdx <=
    alf_luma_num_filters_signalled_minus1; sigFiltIdx++ ) {
        if ( alf_luma_coeff_flag[ sigFiltIdx ] &&
        alf_luma_filter_clip[ sigFiltIdx ] ) {
            for ( j = 0; j < 6; j++ ) {
                if(AlfCoeff_L[ filtIdx ][ j ] )
                    alf_luma_clip_idx[ sigFiltIdx ][ j ]                 uek(v)
            }
        }
    ...
```

The number of ALF coefficients for luma filters becomes 13 and so the last coefficient filter initialisation process becomes:

The last filter coefficients AlfCoeffL[filtIdx][6] for filtIdx=0 . . . NumAlfFilters−1 are derived as follows:
AlfCoeffL[filtIdx][6]=128

It is a requirement of bitstream conformance that the values of AlfCoeffL[filtIdx][j] with filtIdx=0 . . . NumAlfFilters−1, j=0 . . . 41 shall be in the range of −2^7 to 2^7−1, inclusive and that the values of AlfCoeffL[filtIdx][6] shall be in the range of 0 to 2^8−1, inclusive.

For "Coding tree block filtering process for luma samples", the derivation process for filter index clause 'Derivation process for ALF transpose and filter index for luma samples' is modified as follows (changes made to the previously presented ALF data syntax are both underlined and in bold, and repeated portions are omitted wherever possible):

The derivation process for filter index clause 'Derivation process for ALF transpose and filter index for luma samples' is invoked with the location (xCtb, yCtb) and the reconstructed luma picture sample array recPictureL as inputs, and filtIdx[x][y] and transposeIdx[x][y] with x, y=0 . . . CtbSizeY−1 as outputs.

For the derivation of the filtered reconstructed luma samples alfPictureL[x][y], each reconstructed luma sample inside the current luma coding tree block recPictureL[x][y] is filtered as follows with x, y=0 . . . CtbSizeY−1:

The array of luma filter coefficients f[j] and the array of luma filter clipping c[j] corresponding to the filter specified by filtIdx[x][y] are derived as follows with j=0 . . . 6:
f[j]=AlfCoeffL[filtIdx[x][y]][j]
c[j]=AlfClipL[filtIdx[x][y]][j]

The luma filter coefficients filterCoeff and the filter clipping values filterClip are derived depending on transposeIdx[x][y] as follows:

If transposeIndex[x][y]==1,
filterCoeff[ ]={f[4], f[1], f[5], f[3], f[0], f[2], f[6]}
filterClip[ ]={c[4], c[1], c[5], c[3], c[0], c[2], c[6]}
Otherwise, if transposeIndex[x][y]==2,
filterCoeff[ ]={f[0], f[3], f[2], f[1], f[4], f[5], f[6]}
filterClip[ ]={c[0], c[3], c[2], c[1], c[4], c[5], c[6]}
Otherwise, if transposeIndex[x][y]==3,
filterCoeff[ ]={f[4], f[3], f[5], f[1], f[0], f[2], f[6]}
filterClip[ ]={c[4], c[3], c[5], c[1], c[0], c[2], c[6]}
Otherwise,
filterCoeff[ ]={f[0], f[1], f[2], f[3], f[4], f[5], f[6]}
filterClip[ ]={c[0], c[1], c[2], c[3], c[4], c[5], c[6]}

The locations (hx, vy) for each of the corresponding luma samples (x, y) inside the given array recPicture of luma samples are derived as follows:
hx=Clip3(0, pic_width_in_luma_samples−1, xCtb+x)
vy=Clip3(0, pic_height_in_luma_samples−1, yCtb+y)

The variable curr is derived as follow: curr=recPictureL[hx, vy]

The variable sum is derived as follows:
sum=filterCoeff[0]*(Clip3(−filterClip[0], filterClip[0], recPictureL[hx, vy+2]−curr)+Clip3(−filterClip[0], filterClip[0], recPictureL[hx, vy−2]−curr))
+filterCoeff[1]*(Clip3(−filterClip[1], filterClip[1], recPictureL[hx+1, vy+1]−curr)+Clip3(−filterClip[1], filterClip[1], recPictureL[hx−1, vy−1]−curr))
+filterCoeff[2]*(Clip3(−filterClip[2], filterClip[2], recPictureL[hx, vy+1]−curr)+Clip3(−filterClip[2], filterClip[2], recPictureL[hx, vy−1]−curr))
+filterCoeff[3]*(Clip3(−filterClip[3], filterClip[3], recPictureL[hx−1, vy+1]−curr)+Clip3(−filterClip[3], filterClip[3], recPictureL[hx+1, vy−1]−curr))
+filterCoeff[4]*(Clip3(−filterClip[4], filterClip[4], recPictureL[hx+2, vy]−curr)+Clip3(−filterClip[4], filterClip[4], recPictureL[hx−2, vy]−curr))
+filterCoeff[5]*(Clip3(−filterClip[5], filterClip[5], recPictureL[hx+1, vy]−curr)+Clip3(−filterClip[5], filterClip[5], recPictureL[hx−1, vy]−curr))
+filterCoeff[6]*recPictureL[hx, vy]
sum=(sum+64)>>7

The modified filtered reconstructed luma picture sample alfPictureL[xCtb+x][yCtb+y] is derived as follows:
alfPictureL[xCtb+x][yCtb+y]=Clip3(0, (1<<BitDepthY)−1, sum)

In variants not using difference between neighbours and centre, AlfCoeffL[filtIdx][6]=128−$\Sigma_k$ (AlfCoeffL[filtIdx][k]<<1), with k=0 . . . 5 is used. For the filtering, similar changes to the clipping parameters in the filtering are also made.

In another variant, using a 7×7 diamond shape for the filter but using the clipping pattern 1601 of FIG. 16-*a* for Luma filters, and the clipping pattern 1605 of FIG. 16-*b* for Chroma filter, a nonlinear ALF data syntax of Table 4 is modified as follows (changes made to the previously presented ALF data syntax of Table 4 are both underlined and in bold, and repeated portions are omitted wherever possible):

TABLE 6 a modified portion of a nonlinear ALF data syntax

```
Alf_data( ) {
    ...
    if( alf_luma_clip ) {
        alf_luma_clip_min_eg_order_minus1                                ue(v)
        for( i = 0; i < 3; i++ )
            alf_luma_clip_eg_order_increase_flag[ i ]                    u(1)
        for( sigFiltIdx = 0; sigFiltIdx <=
        alf_luma_num_filters_signalled_minus1; sigFiltIdx++ ) {
```

TABLE 6-continued a modified portion of a nonlinear ALF data syntax

```
    if ( alf_luma_coeff_flag[ sigFiltIdx ] &&
alf_luma_filter_clip[ sigFiltIdx ] ) {
        for ( j = 0; j < 12; j++ ) {
            if(AlfCoeff_L[ filtIdx ][ j ] && AlfClipPatL[ j ])
                alf_luma_clip_idx[ sigFiltIdx ][ j ]        uek(v)
        }
    }
}
if ( alf_chroma_idc > 0 && alf_chroma_clip ) {
    alf_chroma_clip_min_eg_order_minus1                    ue(v)
    for( i = 0; i < 2; i++ )
        alf_chroma_clip_eg_order_increase_flag[ i ]        u(1)
    for( j = 0; j < 6; j++ ) {
        if( AlfCoeff_C[ j ] && AlfClipPatC[ j ] )
            alf_chroma_clip_idx[ j ]                       uek(v)
    }
}
}
```

AlfClipPatL[ ] is a constant clipping pattern table for Luma filters and is set as follow:

AlfClipPatL[ ]={0, 0, 1, 0, 0, 0, 1, 0, 0, 0, 1, 1}

AlfClipPatC[ ] is a constant clipping pattern table for Chroma filter and is set as follow:

AlfClipPatC[ ]={1, 1, 0, 1, 1, 0}

Parts of the semantics are modified as follow:

The variable sum in the "Coding tree block filtering process for luma samples" is derived as follows:

sum=filterCoeff[0]*(recPictureL[hx, vy+3]−curr+recPictureL[hx, vy−3]−curr)

+filterCoeff[1]*(recPictureL[hx+1, vy+2]−curr+recPictureL[hx−1, vy−2]−curr)

+filterCoeff[2]*(Clip3(−filterClip[2], filterClip[2], recPictureL[hx, vy+2]−curr)+Clip3(−filterClip[2], filterClip[2], recPictureL[hx, vy−2]−curr))

+filterCoeff[3]*(recPictureL[hx−1, vy+2]−curr+recPictureL[hx+1, vy−2]−curr)

+filterCoeff[4]*(recPictureL[hx−2, vy+1]−curr+recPictureL[hx+2, vy−1]−curr)

+filterCoeff[5]*(recPictureL[hx+1, vy+1]−curr+recPictureL[hx−1, vy−1]−curr)

+filterCoeff[6]*(Clip3(−filterClip[6], filterClip[6], recPictureL[hx, vy+1]−curr)+Clip3(−filterClip[6], filterClip[6], recPictureL[hx, vy−1]−curr))

+filterCoeff[7]*(recPictureL[hx−1, vy+1]−curr+recPictureL[hx+1, vy−1]−curr)

+filterCoeff[8]*(recPictureL[hx−2, vy+1]−curr+recPictureL[hx+2, vy−1]−curr)

+filterCoeff[9]*(recPictureL[hx+3, vy]−curr+recPictureL[hx−3, vy]−curr)

+filterCoeff[10]*(Clip3(−filterClip[10], filterClip[10], recPictureL[hx+2, vy]−curr)+Clip3(−filterClip[10], filterClip[10], recPictureL[hx−2, vy]−curr))

+filterCoeff[11]*(Clip3(−filterClip[11], filterClip[11], recPictureL[hx+1, vy]−curr)+Clip3(−filterClip[11], filterClip[11], recPictureL[hx−1, vy]−curr))

+filterCoeff[12]*recPictureL[hx, vy]

sum=(sum+64)>>7

The variable sum in the 'coding tree block filtering process for chroma samples' is derived as follows:

sum=AlfCoeffC[0]*(Clip3(−AlfClipC[0], AlfClipC[0], recPicture[hx, vy+2]−curr)+Clip3(−AlfClipC[0], AlfClipC[0], recPicture[hx, vy−2]−curr))

+AlfCoeffC[1]*(Clip3(−AlfClipC[1], AlfClipC[1], recPicture[hx+1, vy+1]−curr)+Clip3(−AlfClipC[1], AlfClipC[1], recPicture[hx−1, vy−1]−curr))

+AlfCoeffC[2]*(recPicture[hx, vy+1]−curr+recPicture[hx, vy−1]−curr)

+AlfCoeffC[3]*(Clip3(−AlfClipC[3], AlfClipC[3], recPicture[hx−1, vy+1]−curr)+Clip3(−AlfClipC[3], AlfClipC[3], recPicture[hx+1, vy−1]−curr))

+AlfCoeffC[4]*(Clip3(−AlfClipC[4], AlfClipC[4], recPicture[hx+2, vy]−curr)+Clip3(−AlfClipC[4], AlfClipC[4], recPicture[hx−2, vy]−curr))

+AlfCoeffC[5]*(recPicture[hx+1, vy]−curr+recPicture[hx−1, vy]−curr)

+AlfCoeffC[6]*recPicture[hx, vy]

It is understood that other variants using other clipping patterns can be easily derived from the aforementioned variant, as well as other variants using a reduced number of clipping (i.e. reduced number of clipped positions, e.g. for the Luma component no clipping is applied to current (centre) sample value "curr" so that there is no "f[12]", no "c[12]", no "filterCoeff[12]", & "sum=curr+((sum+64)>>7)" as in Equation (17) and FIG. 7) and/or not using the difference between the neighbour samples and the centre sample.

Figure 8:
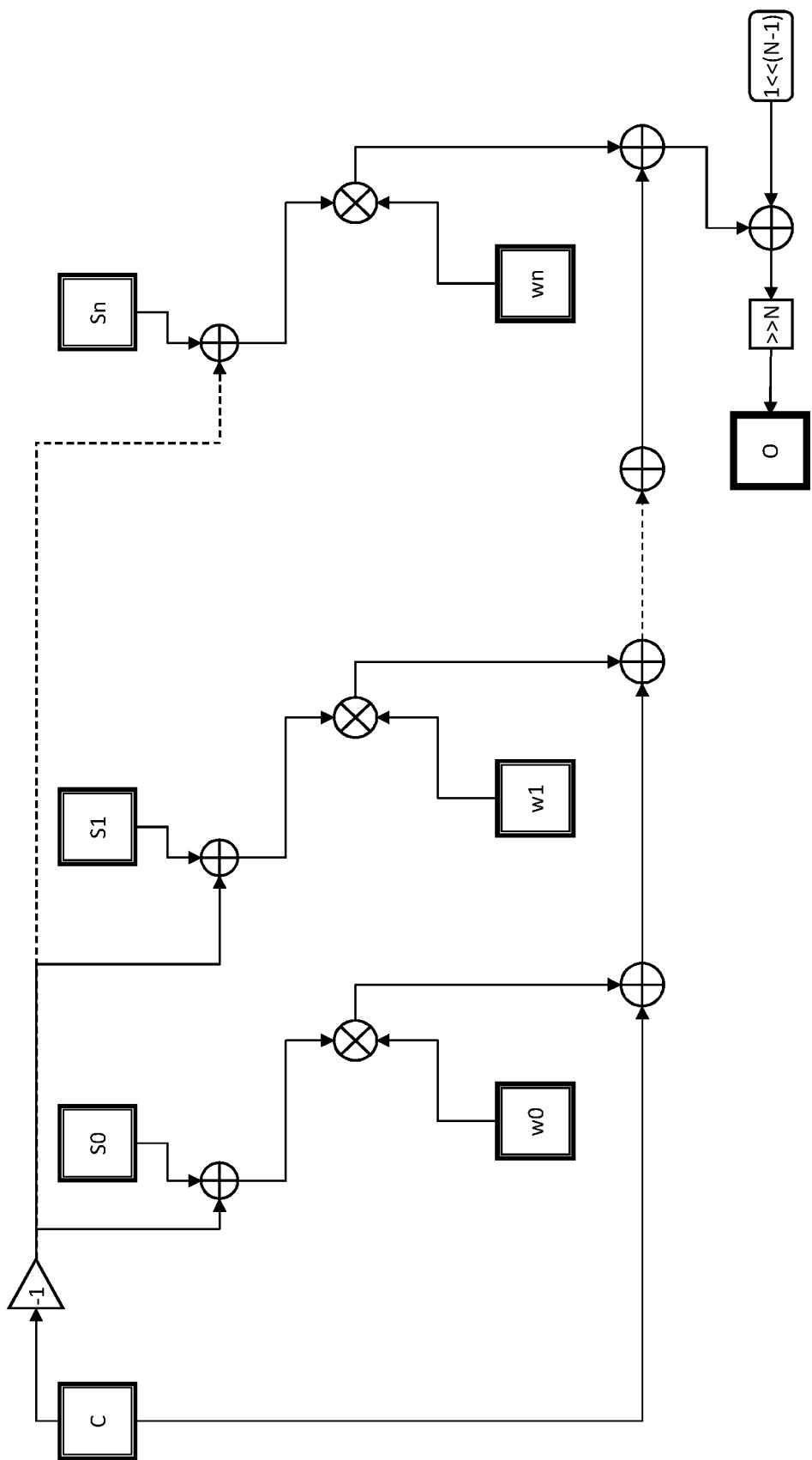
FIG. 8 is a block diagram of the linear filter obtained when the nonlinear part of the filter in FIG. 7 is disabled according to an embodiment of the invention.

FIG. 8 is a block diagram of the linear filter obtained when the nonlinear part of the filter in FIG. 7 is disabled according to an embodiment of the invention. According to an embodiment, when ALF is active and nonlinear ALF is inactive then linear ALF is used for filtering. In a variant of such an embodiment, nonlinear ALF is used as defined with equation (7) and illustrated in FIG. 7, instead of using linear ALF as defined with equation (4) and illustrated in FIG. 6, linear filtering is performed as defined with equation (6) and illustrated in FIG. 8. In a hardware design, it allows to share a common circuit part between the nonlinear and the linear filters. When comparing FIG. 7 and FIG. 8, the min/max operations are just by-passed, proceeding directly to the sample value. One other advantage of using this approach is that when an encoder designs its filters, it does not have to ensure that the sum of all the filter coefficients of each filter is one. The result of this design is that we add one subtraction per coefficient, except for the current sample, and we remove one multiplication for the current sample.

The design of FIG. 7 also has advantages in saving hardware bits for implementing multiplications, when the maximum value that the clipping parameter can take is sufficiently low.

According to an embodiment, syntax elements of ALF signalled in slice header in FIG. 5 are not signalled in the slice header anymore, but are signalled at a frame level instead, in a picture header for instance. Then in the slice header there is one or more flag/syntax elements to signal that the parameters provided at the frame level are directly used in the slice; or that the parameters provided at the frame level have to be "refreshed" (i.e. updated) at the slice level. The refresh at the slice level is done in the slice header. The refresh of the filter coefficients and/or of the clipping parameters is done by encoding the difference between the values indicated at the frame level and the values to use in the slice. According to an embodiment, an additional syntax element in the slice header indicates if the values of the filter coefficients and/or clipping parameters are encoded in the slice header as a difference, or if their values are encoded.

According to an embodiment, the filter coefficients and/or clipping parameters defined at the slice level (in the slice header), may be updated at a finer granularity level (for each CTU for instance). A syntax element that indicates if the update has to be performed is entropy-coded in the slice data as well as the update data when the syntax element indicates that the update has to be performed. In one embodiment, in the encoded bitstream, for each CTU, the encoded slice data includes one entropy-coded flag that indicates whether the Luma filters/clipping parameters have to be updated. If the flag indicates that update shall be done, for each table of filter coefficients an entropy coded flag indicates if the filter has to be updated. If the filter has to be updated, the offsets (difference with reference values in the slice or alternatively difference with reference values in a previously encoded CTU belonging to the same slice) for the coefficients and/or the offsets for the clipping parameters are entropy coded.

According to an embodiment, from an encoder point of view, the main logical steps of the ALF encoding process of VTM-3.0 described with reference to FIG. 9 are kept. The main changes are the nature of the statistics that are extracted in order to build filters, and the way the filter is determined. Instead of a simple Wiener Filter computation, clipping parameters are iteratively optimized to find the best clipping parameters and associated nonlinear Wiener Filter coefficients.

According to an embodiment, we define $N_K$, a limit on the number of values one clipping parameter can take. $N_K$ can be small, for instance $N_K=12$ or even less. Then instead of computing covariance and cross covariance matrices statistics, in step 902 the encoder builds a two-entry table E of $N_K \times N_K$ clipping-covariance matrices statistics and a one-entry table y of $N_K$ clipping-cross-covariance matrices statistics (instead of one covariance matrix statistics and one cross-covariance matrix statistics).

The clipping-covariance matrix $E_c[a][b]$ is a covariance matrix estimated from $1/N\ X^a X^{b^t}$ where $X^m$ contains the N realizations (observed values) of the inputs when using the $C_m$-th clipping value. For instance using the shapes of the FIG. 4-*b*, $X_i^m$ is the i-th column of $X^m$ obtained for a given sample position, and $X_{i,j}^m$ contains: for $i<N_c$ ($N_c=12$ for a Luma filter of FIG. 4-*b* is the number of filter coefficients minus one), the sum of the results of the clipping of the difference between the neighbour sample (of the j-th filtered sample) and the j-th filtered sample using the m-th clipping value, for the two symmetric neighbours with index i in the shape; and for i=12, the j-th filtered sample; where $X_{i,j}^m$ is the value in matrix $X^m$ at row i and column j.

The clipping-cross-covariance matrix $y_c[c]$ is a cross-covariance matrix between the realisations of the desired filter output (i.e. original samples) and the realisations of XC.

Thus when we need to build/test a filter using clipping parameters equal to $C_0, \ldots, C_{N_c-1}$ we define $C=[C_0, \ldots, C_{N_c-1}, 0]$ ($N_c=12$ for a Luma filter for instance, is the number of filter coefficients minus one, last value equal to zero is convenient, another value could be used and would have same results since the centre coefficient 12 is not clipped). We compute the covariance matrix E and the cross-covariance matrix y these clipping parameters such that $E[i,j]=E_c[c[i]][c[j]][i,j]$ for each $i<N_c, j<N_c$ and $y[k]=y_c[c[k]][k]$ for each $k<N_c$. Then we build a Wiener filter using these two matrix, as previously explained for linear ALF.

In step 904, instead of combining the statistics of covariance and cross-covariance matrices, the encoder combines the statistics of each clipping-covariance and clipping-cross-covariance matrices (here also, the combination is done by summing the statistics).

In step 905, the way used to find the optimized groups of filters (i.e. the optimized merged filter) is similar as before. The main difference is that for each tested/compared filter, instead of computing only one Wiener filter, the clipping parameters are iteratively optimized, each step computing a Wiener filter for specific clipping parameters, to minimize the output error of the filter (computed on statistics matrices). A simple optimization algorithm is to start with all clipping parameter values ($c_i$) set to zero (or alternatively to the median clipping value or any default value), then follow the following steps in loops while it improves the filter (i.e. it reduces the output error): for each clipping parameter value take the next clipping parameter value, if available/allowed (i.e. index <maximum index value), if the Wiener filter computed with this clipping parameter value is better, or take the previous clipping parameter value, if available/allowed (i.e. index>0), if the Wiener filter computed with this clipping parameter value is better. When grouping two filters, one strategy might be to start optimization with each clipping parameter value set to the average of each clipping parameter value of the two filters.

There is no real change to step 906, 907, 908, 909, 910 and 911.

In step 912, a combined statistics change is the same as described for step 904. The determination on the Chroma filter in step 913 corresponds to the filter optimization described for step 905. The other steps are not changed except step 918 where the ALF parameters include the clipping parameters determined for each filter.

Note that in VTM-3.0 with the "normal" ALF, when the encoder derives integer filter coefficients from floating point values, it first performs a quantization of the floating point value to fixed point ones: for each filter coefficient it rounds the filter coefficient multiplication by the fixed point precision to the nearest integer value. Then it tries to improve the filter efficiency by iteratively adjusting the filter coefficients (to compensate for the rounding error). The encoder must also ensure that the sum of all the filter coefficients is equal to one (multiplied by the fixed point precision), and that the filter coefficient for the centre sample does not exceed a maximum value (to ensure that its use in the multiplication does not end up using too many bits).

With embodiments of the invention where the difference with neighbouring samples is used as an input for the filter, since the centre coefficient is always one, there is no need to ensure that it does not exceed the maximum value. Also, there is no need to often track the value of the sum of all the filter coefficients.

The advantage of these embodiments is a coding efficiency improvement.

The descriptions of these embodiments mention the luma and the chroma component but they can easily be adapted to other components such as a single luma component or RGB components.

In a foregoing embodiment or variant, the invention results in modifying the filtering in 304 and 407 in FIG. 3-*a* and FIG. 4-*a* to use non-linear functions on filter inputs to obtain a non-linear filtering effect. FIG. 2 is also modified to add new syntax elements for signalling additional parameters for the non-linear functions (an example of embodiment was described with reference to FIG. 5). Implicitly, the input filtering parameters in 302 and 402 are modified to further include the additional parameters for the non-linear functions. Finally, the filter derivation in 303 and 406 is modified to derive the non-linear functions for the filters (i.e. to derive the "nonlinear filters"). Therefore, in most situations, the output image portion 305 and 408 are not the same as those produced in VTM-3.0 and have a higher quality for equivalent/comparable input samples and/or achieves better compromise between output image quality and coding efficiency. It is understood that in another embodiment/variant, the ALF itself is modified so that it operates to filter using any of the aforementioned non-linear functions.

Implementation of Embodiments of the Invention

One or more of the foregoing embodiments may be implemented in the form of an encoder or a decoder, which performs the method steps of the one or more foregoing embodiments. Following embodiments illustrate such implementations.

Figure 10:
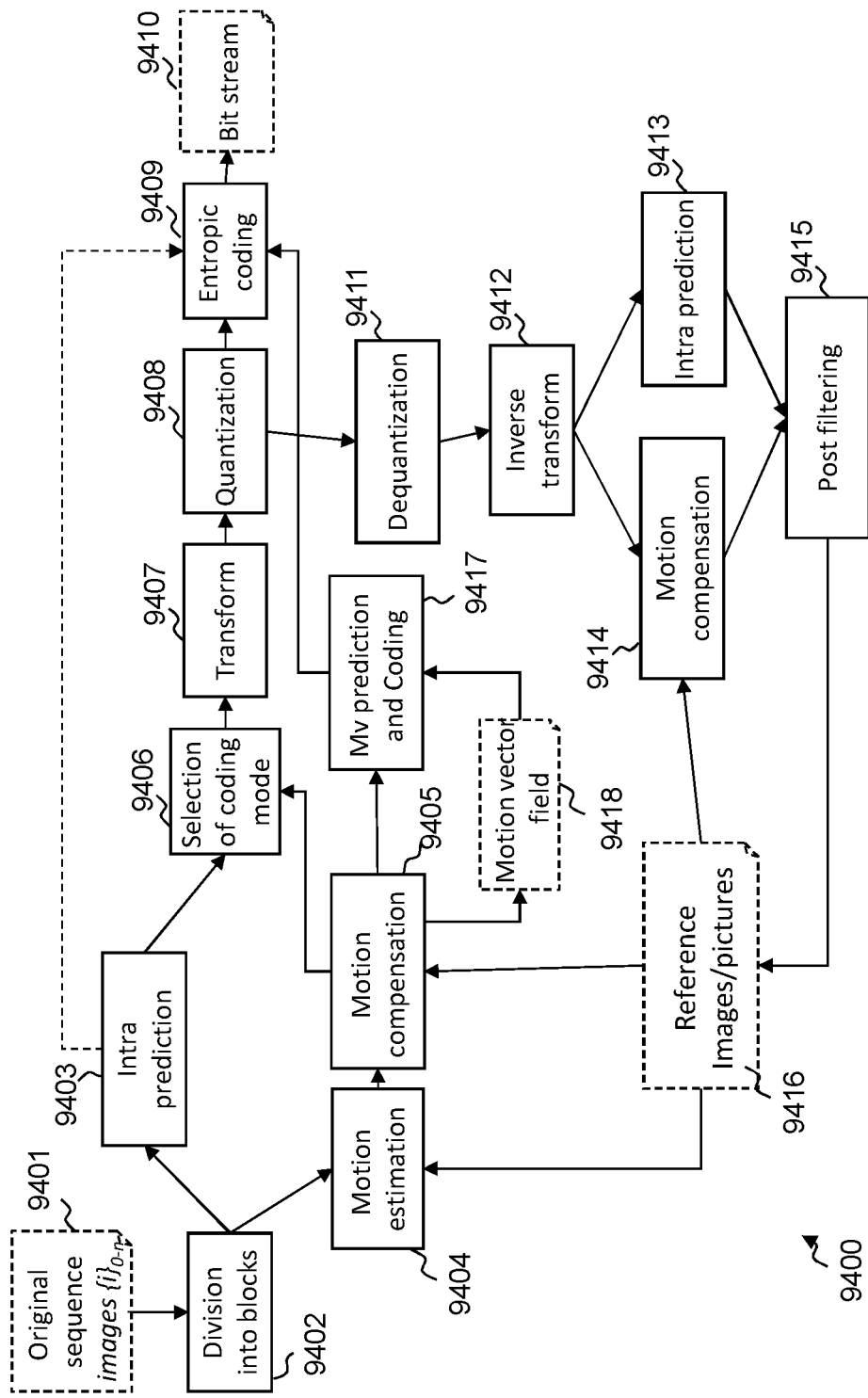
FIG. 10 is a flow chart illustrating steps of an encoding method according to embodiments of the invention.
Figure 11:
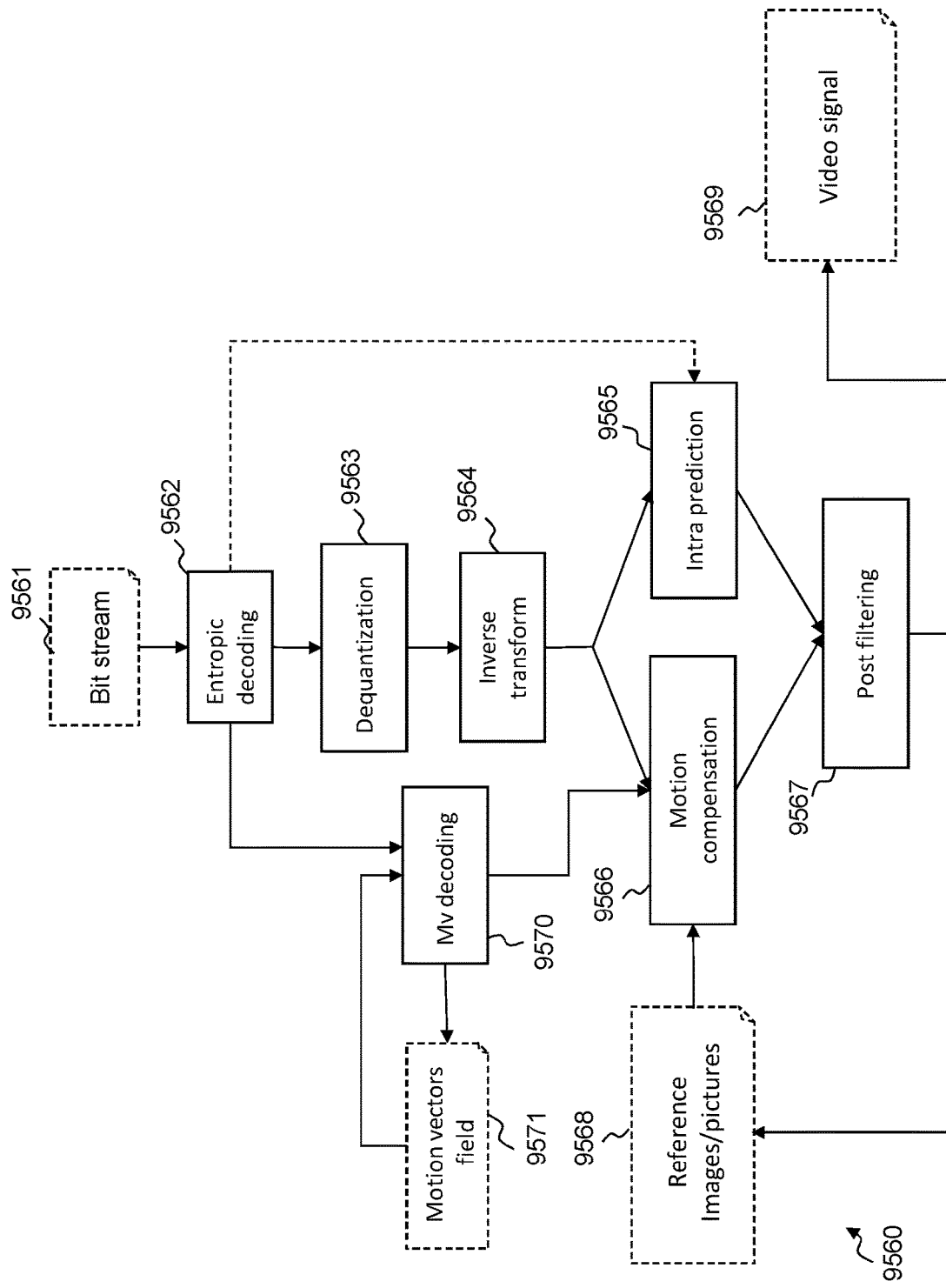
FIG. 11 is a flow chart illustrating steps of a decoding method according to embodiments of the invention.

For example, an Adaptive Loop Filter according to any of the foregoing embodiments may be used in a post filtering 9415 performed by an encoder in FIG. 10 or a post filtering 9567 performed by a decoder in FIG. 11.

FIG. 10 illustrates a block diagram of an encoder according to an embodiment of the invention. The encoder is represented by connected modules, each module being adapted to implement, for example in the form of programming instructions to be executed by a Central Processing Unit (CPU) of a device, at least one corresponding step of a method implementing at least one embodiment of encoding an image of a sequence of images according to one or more embodiments of the invention.

An original sequence of digital images i0 to in 9401 is received as an input by the encoder 9400. Each digital image is represented by a set of samples, sometimes also referred to as pixels (hereinafter, they are referred to as pixels). A bitstream 9410 is output by the encoder 9400 after implementation of the encoding process. The bitstream 9410 comprises data for a plurality of encoding units or image portions such as slices, each slice comprising a slice header for transmitting encoding values of encoding parameters used to encode the slice and a slice body, comprising encoded video data.

The input digital images i0 to in 9401 are divided into blocks of pixels by a module 9402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, MERGE, SKIP). The possible coding modes are tested.

Module 9403 implements an Intra prediction process, in which the given block to be encoded is predicted by a predictor computed from pixels of the neighborhood of said block to be encoded. An indication of the selected Intra predictor and the difference between the given block and its predictor is encoded to provide a residual if the Intra coding is selected.

A temporal prediction is implemented by a motion estimation module 9404 and a motion compensation module 9405. Firstly a reference image from among a set of reference images 9416 is selected, and a portion of the reference image, also called reference area or image portion, which is the closest area (closest in terms of pixel value similarity) to the given block to be encoded, is selected by the motion estimation module 9404. The motion compensation module 9405 then predicts the block to be encoded using the selected area. The difference between the selected reference area and the given block, also called a residual block/data, is computed by the motion compensation module 9405. The selected reference area is indicated using a motion information (e.g. a motion vector).

Thus, in both cases (spatial and temporal prediction), a residual is computed by subtracting the predictor from the original block when it is not in the SKIP mode.

In the INTRA prediction implemented by the module 9403, a prediction direction is encoded. In the Inter prediction implemented by the modules 9404, 9405, 9416, 9418, 9417, at least one motion vector or information (data) for identifying such motion vector is encoded for the temporal prediction. Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 9418 by a motion vector prediction and coding module 9417.

The encoder 9400 further comprises a selection module 9406 for selecting a coding mode by applying an encoding cost criterion, such as a rate-distortion criterion. In order to further reduce redundancies, a transform (such as DCT) is applied by a transform module 9407 to the residual block, and the transformed data obtained is then quantized by a quantization module 9408 and entropy encoded by an entropy encoding module 9409. Finally, the encoded residual block of the current block being encoded is inserted into the bitstream 9410 when it is not in the SKIP mode and the selected coding mode requires encoding of the residual block.

The encoder 9400 also performs decoding of the encoded image in order to produce a reference image (e.g. those in the Reference images/pictures 9416) for the motion estimation of the subsequent images. This enables the encoder and a decoder receiving the bitstream to have the same reference frames (e.g. reconstructed images or reconstructed image portions are used). An inverse quantization ("dequantization") module 9411 performs an inverse quantization ("dequantization") of the quantized data, which is then followed by an inverse transform performed by an inverse transform module 9412. An intra prediction module 9413 uses prediction information to determine which predictor to use for a given block and a motion compensation module 9414 actually adds the residual obtained by the module 9412 to the reference area obtained from the set of reference images 9416. Post filtering is then applied by a module 9415 to filter the reconstructed frame (image or image portions) of pixels to obtain another reference image for the set of reference images 9416.

FIG. 11 illustrates a block diagram of a decoder 9560 which may be used to receive data from an encoder according to an embodiment of the invention. The decoder is represented by connected modules, each module being adapted to implement, for example in the form of programming instructions to be executed by a CPU of device, a corresponding step of a method implemented by the decoder 9560.

The decoder 9560 receives a bitstream 9561 comprising encoded units (e.g. data corresponding to an image portion, a block or a coding unit), each one being composed of a header containing information on encoding parameters and a body containing the encoded video data. As explained with respect to FIG. 10, the encoded video data is entropy encoded, and the motion information (e.g. motion vector predictors' indexes) are encoded, for a given image portion (e.g. a block or a CU), on a predetermined number of bits. The received encoded video data is entropy decoded by a module 9562. The residual data is then dequantized by module 9563 and then an inverse transform is applied by a module 9564 to obtain pixel values.

The mode data indicating the coding mode are also entropy decoded and based on the mode, an INTRA type decoding or an INTER type decoding is performed on the encoded blocks (units/sets/groups) of image data. In the case of INTRA mode, an INTRA predictor is determined by an intra prediction module 9565 based on the intra prediction mode specified in the bitstream (e.g. the intra prediction mode is determinable using data provided in the bitstream). If the mode is INTER mode, the motion prediction information is extracted/obtained from the bitstream so as to find (identify) the reference area used by the encoder. The motion prediction information comprises the reference frame index and the motion vector residual, for example. The motion vector predictor is added to the motion vector residual by a motion vector decoding module 9570 in order to obtain the motion vector.

The motion vector decoding module 9570 applies motion vector decoding for each image portion (e.g. current block or CU) encoded by motion prediction. Once an index of the motion vector predictor for the current block has been obtained, the actual value of the motion vector associated with the image portion (e.g. current block or CU) can be decoded and used to apply motion compensation by a module 9566. The reference image portion indicated by the decoded motion vector is extracted/obtained from a set of Reference images 9568 so that the module 9566 can perform the motion compensation. Motion vector field data 9571 is updated with the decoded motion vector in order to be used for the prediction of subsequently decoded motion vectors.

Finally, a decoded block is obtained. Where appropriate, post filtering is applied by a post filtering module 9567. A decoded video signal 9569 is finally obtained and provided by the decoder 9560.

Figure 12:
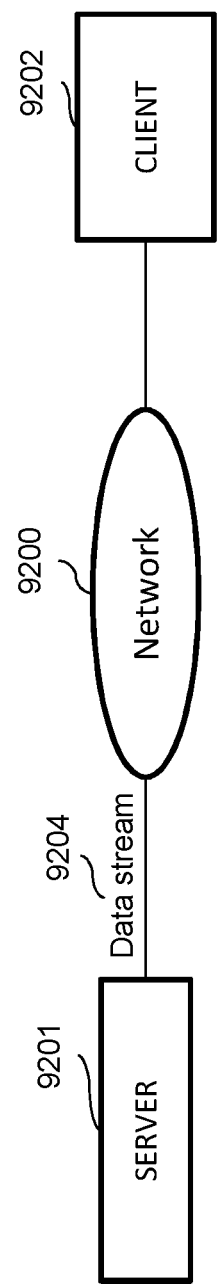
FIG. 12 is a block diagram schematically illustrating a data communication system in which one or more embodiments of the invention may be implemented.

FIG. 12 illustrates a data communication system in which one or more embodiments of the invention may be implemented. The data communication system comprises a transmission device, in this case a server 9201, which is operable to transmit data packets of a data stream 9204 to a receiving device, in this case a client terminal 9202, via a data communication network 9200. The data communication network 9200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 9201 sends the same data content to multiple clients.

The data stream 9204 provided by the server 9201 may be composed of multimedia data representing video and audio data. Audio and video data streams may, in some embodiments of the invention, be captured by the server 9201 using a microphone and a camera respectively. In some embodiments data streams may be stored on the server 9201 or received by the server 9201 from another data provider, or generated at the server 9201. The server 9201 is provided with an encoder for encoding video and audio streams in particular to provide a compressed bitstream for transmission that is a more compact representation of the data presented as input to the encoder. In order to obtain a better ratio of the quality of transmitted data to quantity of transmitted data, the compression of the video data may be for example in accordance with the High Efficiency Video Coding (HEVC) format or H.264/Advanced Video Coding (AVC) format or Versatile Video Coding (VVC) format. The client 9202 receives the transmitted bitstream and decodes the reconstructed bitstream to reproduce video images on a display device and the audio data by a loud speaker.

Although a streaming scenario is considered in this embodiment, it will be appreciated that in some embodiments of the invention the data communication between an encoder and a decoder may be performed using for example a media storage device such as an optical disc. In one or more embodiments of the invention a video image may be transmitted with data representative of compensation offsets for application to reconstructed pixels of the image to provide filtered pixels in a final image.

Figure 13:
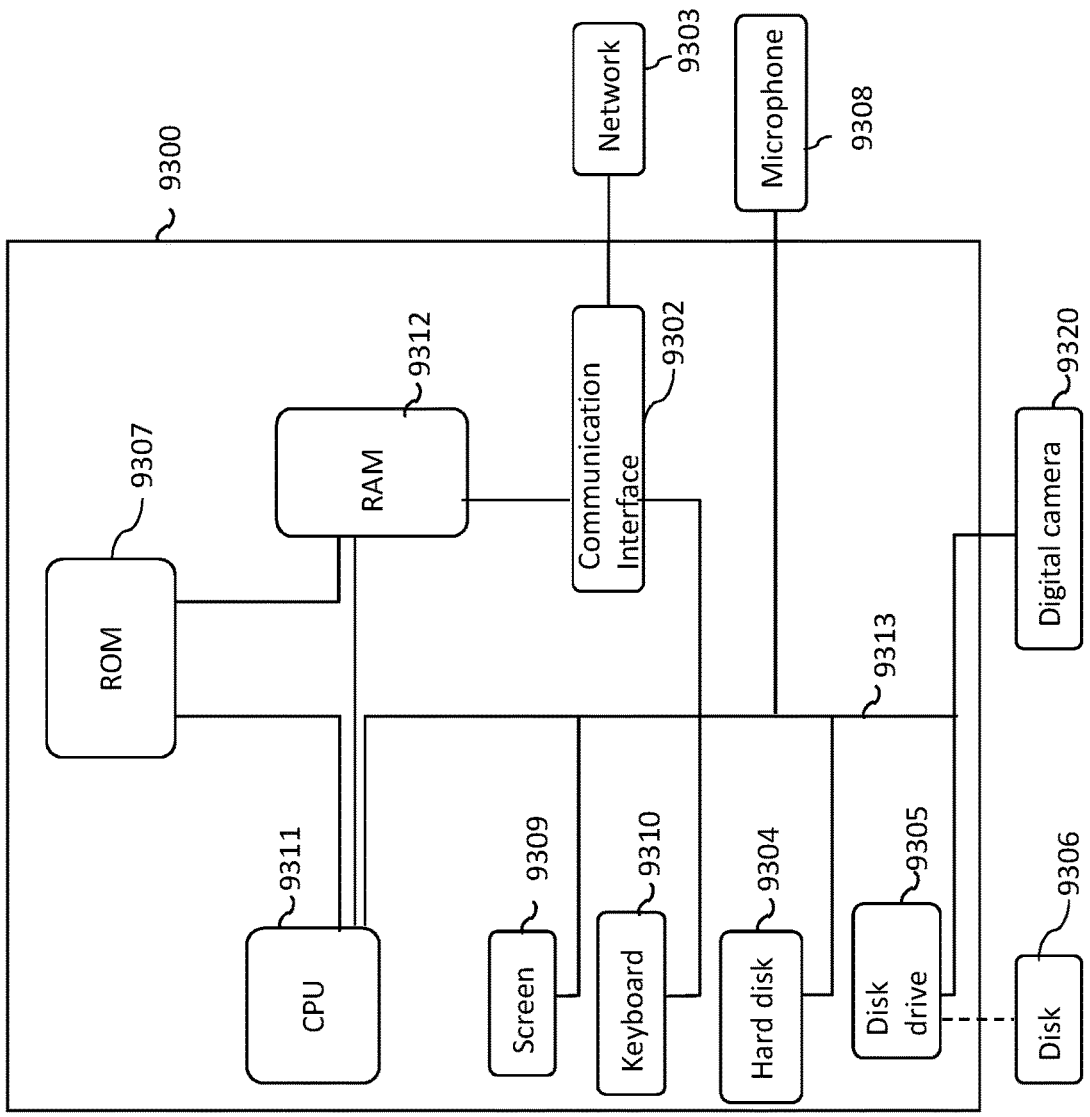
FIG. 13 is a block diagram illustrating components of a processing device in which one or more embodiments of the invention may be implemented.

FIG. 13 schematically illustrates a processing device 9300 configured to implement at least one embodiment of the invention. The processing device 9300 may be a device such as a micro-computer, a workstation, a user terminal or a light portable device.

The device/apparatus 9300 comprises a communication bus 9313 connected to:
- a central processing unit 9311, such as a microprocessor, denoted CPU;
- a read only memory 9307, denoted ROM, for storing computer programs/instructions for operating the device 9300 and/or implementing the invention;
- a random access memory 9312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 9302 connected to a communication network 9303 over which digital data to be processed are transmitted or received.

Optionally, the apparatus 9300 may also include following components:
- a data storage means 9304 such as a hard disk, for storing computer programs for implementing methods of one or more embodiments of the invention and data used or produced during the implementation of one or more embodiments of the invention;
- a disk drive 9305 for a disk 9306 (e.g. a storage medium), the disk drive 9305 being adapted to read data from the disk 9306 or to write data onto said disk 9306; or
- a screen 9309 for displaying data and/or serving as a graphical interface with a user, by means of a keyboard 9310, a touchscreen or any other pointing/input means.

The apparatus 9300 can be connected to various peripherals, such as for example a digital camera 9320 or a microphone 9308, each being connected to an input/output card (not shown) so as to supply multimedia data to the apparatus 9300.

The communication bus 9313 provides communication and interoperability between the various elements included in the apparatus 9300 or connected to it. The representation of the bus is not limiting and in particular the central processing unit 9311 is operable to communicate instructions to any element of the apparatus 9300 directly or by means of another element of the apparatus 9300.

The disk 9306 can be replaced by any information medium such as for example a compact disk (CD-ROM), rewritable or not, a ZIP disk or a memory card and, in general terms, by an information storage means that can be read by a microcomputer or by a processor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 9307, on the hard disk 9304 or on a removable digital medium such as for example a disk 9306 as described previously. According to a variant, the executable code of the programs can be received by means of the communication network 9303, via the interface 9302, in order to be stored in one of the storage means of the apparatus 9300 before being executed, for example in the hard disk 9304.

The central processing unit 9311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 9304, the disk 9306 or in the read only memory 9307, are transferred into the random access memory 9312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Implementation of Embodiments of the Invention

It is also understood that according to other embodiments of the present invention, a decoder according to an aforementioned embodiment is provided in a user terminal such as a computer, a mobile phone (a cellular phone), a tablet or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such embodiments are provided below with reference to FIGS. 14 and 15.

Figure 14:
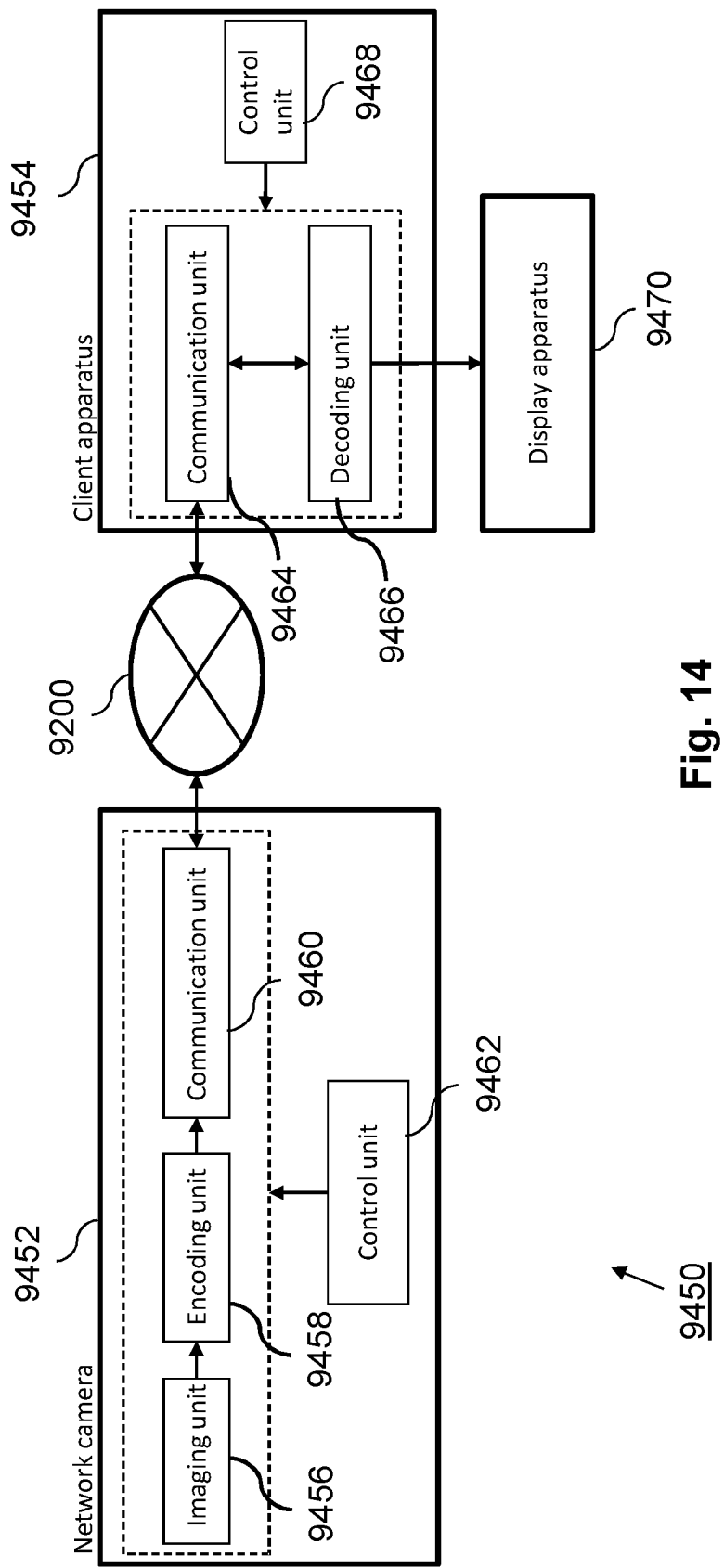
FIG. 14 is a diagram illustrating a network camera system in which one or more embodiments of the invention may be implemented.

FIG. 14 is a diagram illustrating a network camera system 9450 comprising a network camera 9452 and a client apparatus 9454.

The network camera 9452 comprises an imaging unit 9456, an encoding unit 9458, a communication unit 9460, and a control unit 9462. The network camera 9452 and the client apparatus 9454 are mutually connected to be able to communicate with each other via the network 9200. The imaging unit 9456 comprises a lens and an image sensor (e.g., a charge coupled device (CCD) or a complementary metal oxide semiconductor (CMOS)), and captures an image of an object and generates image data based on the image. This image can be a still image or a video image. The imaging unit may also comprise zooming means and/or panning means which are adapted to zoom or pan (either optically or digitally) respectfully. The encoding unit 9458 encodes the image data by using said encoding methods explained in one or more of the foregoing embodiments. The encoding unit 9458 uses at least one of encoding methods explained in the foregoing embodiments. For another instance, the encoding unit 9458 can use combination of encoding methods explained in the foregoing embodiments.

The communication unit 9460 of the network camera 9452 transmits the encoded image data encoded by the encoding unit 9458 to the client apparatus 9454. Further, the communication unit 9460 may also receive commands from client apparatus 9454. The commands comprise commands to set parameters for the encoding by the encoding unit 9458. The control unit 9462 controls other units in the network camera 9452 in accordance with the commands received by the communication unit 9460 or user input.

The client apparatus 9454 comprises a communication unit 9464, a decoding unit 9466, and a control unit 9468. The communication unit 9464 of the client apparatus 9454 may transmit commands to the network camera 9452. Further, the communication unit 9464 of the client apparatus 9454 receives the encoded image data from the network camera 9452. The decoding unit 9466 decodes the encoded image data by using said decoding methods explained in one or more of the foregoing embodiments. For another instance, the decoding unit 9466 can use combination of decoding methods explained in the foregoing embodiments. The control unit 9468 of the client apparatus 9454 controls other units in the client apparatus 9454 in accordance with the user operation or commands received by the communication unit 9464. The control unit 9468 of the client apparatus 9454 may also control a display apparatus 9470 so as to display an image decoded by the decoding unit 9466.

The control unit 9468 of the client apparatus 9454 may also control the display apparatus 9470 so as to display GUI (Graphical User Interface) to designate values of the parameters for the network camera 9452, for example of the parameters for the encoding by the encoding unit 9458. The control unit 9468 of the client apparatus 9454 may also control other units in the client apparatus 9454 in accordance with user operation input to the GUI displayed by the display apparatus 9470. The control unit 9468 of the client apparatus 9454 may also control the communication unit 9464 of the client apparatus 9454 so as to transmit commands to the network camera 9452 which designate values of the parameters for the network camera 9452, in accordance with the user operation input to the GUI displayed by the display apparatus 9470.

Figure 15:
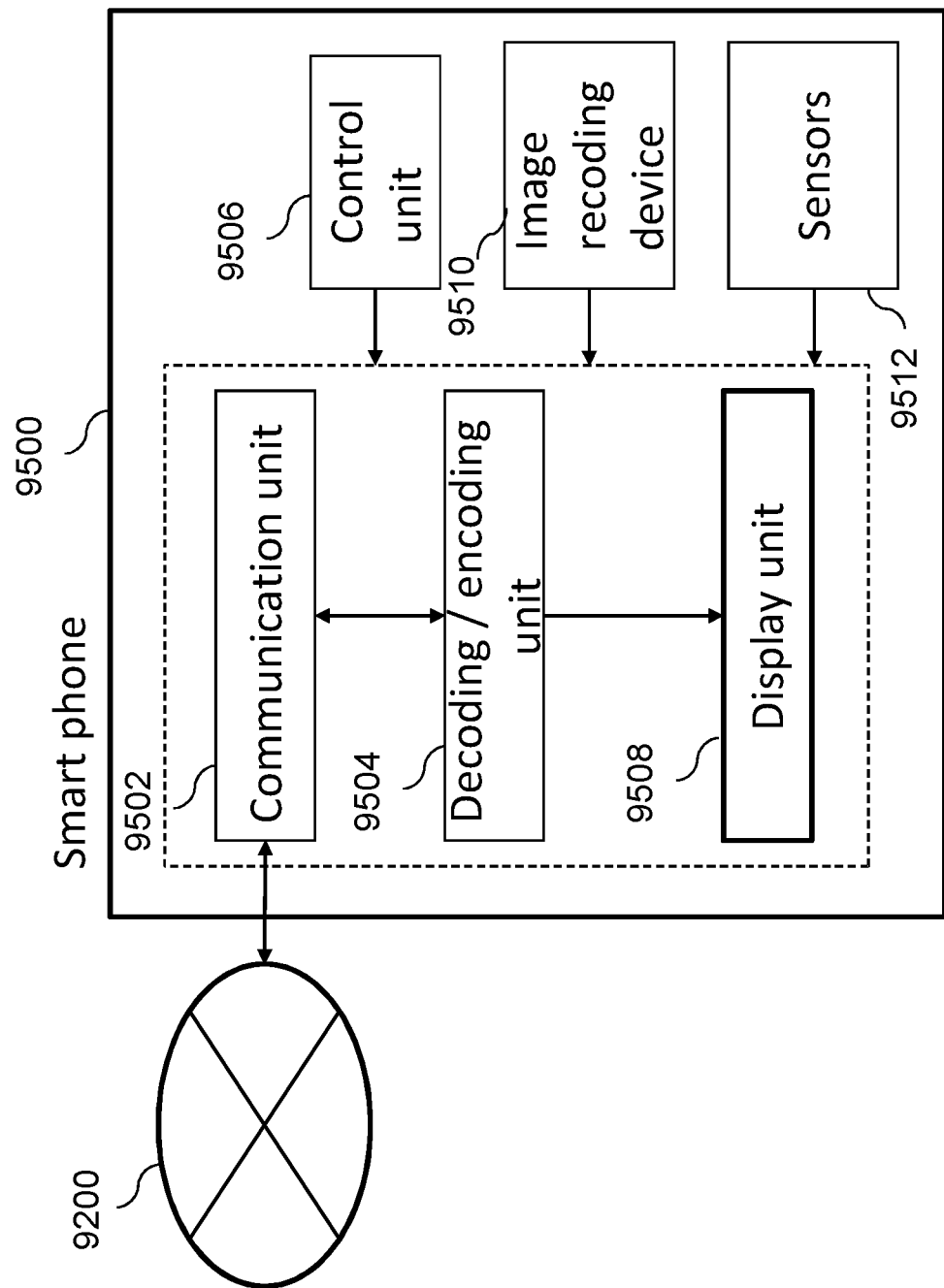
FIG. 15 is a diagram illustrating a smart phone in which one or more embodiments of the invention may be implemented.

FIG. 15 is a diagram illustrating a smart phone 9500. The smart phone 9500 comprises a communication unit 9502, a decoding/encoding unit 9504, a control unit 9506, and a display unit 9508.

The communication unit 9502 receives the encoded image data via network 9200. The decoding/encoding unit 9504 decodes the encoded image data received by the communication unit 9502. The decoding/encoding unit 9504 decodes the encoded image data by using said decoding methods explained in one or more of the foregoing embodiments. The decoding/encoding unit 9504 can also use at least one of encoding or decoding methods explained in the foregoing embodiments. For another instance, the decoding/encoding unit 9504 can use a combination of decoding or encoding methods explained in the foregoing embodiments. The control unit 9506 controls other units in the smart phone 9500 in accordance with a user operation or commands received by the communication unit 9502. For example, the control unit 9506 controls a display unit 9508 so as to display an image decoded by the decoding/encoding unit 9504.

The smart phone may further comprise an image recording device 9510 (for example a digital camera and an associated circuitry) to record images or videos. Such recorded images or videos may be encoded by the decoding/encoding unit 9504 under instruction of the control unit 9506. The smart phone may further comprise sensors 9512 adapted to sense the orientation of the mobile device. Such sensors could include an accelerometer, gyroscope, compass, global positioning (GPS) unit or similar positional sensors. Such sensors 9512 can determine if the smart phone changes orientation and such information may be used when encoding a video stream.

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, e.g. a flag or information indicative of the result, so that the indicated or determined/inferred result can be used in the processing instead of actually performing the comparison, determination, assessment, selection, execution, performing, or consideration, e.g. during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Reference numerals appearing in the claims are by way of illustration only and shall have no limiting effect on the scope of the claims.

In the preceding embodiments, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate/logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

While the present invention has been described with reference to embodiments, it is to be understood that the invention is not limited to the disclosed embodiments. For the avoidance of doubt the following statements form part of the description. The claims follow the statements and are labelled as such.

Statement 1. A method of controlling an Adaptive Loop Filter for one or more image portions of an image, the method comprising controlling filtering of a first sample of an image portion based on a plurality of neighbouring sample values of the first sample value, wherein the controlling comprises using a nonlinear function, the nonlinear function having one or more variable(s) based on one or more of the neighbouring sample value(s) and one or more filter variable(s) signalled in an Adaptation Parameter Set.

Statement 2. The method of Statement 1, wherein the nonlinear function comprises one or more clipping function(s) and the one or more filter variable(s) comprises one or more clipping parameter(s) determined using information provided in the Adaptation Parameter Set.

Statement 3. The method of Statement 2, wherein two or more clipping functions share the same clipping parameter determined using the information signalled in the Adaptation Parameter Set.

Statement 4. The method of Statement 2 or 3, wherein a clipping parameter for use with a clipping function is determinable using an index for identifying a clipping parameter value from a plurality of clipping parameter values, and one of the plurality of clipping parameter values corresponds to a maximum sample value based on a bit-depth. Suitably, the index is provided in the Adaptation Parameter Set.

Statement 5. The method of any one of Statements 2 to 4, wherein a clipping parameter for use with a clipping function is determinable using an index for identifying a clipping parameter value from a plurality of clipping parameter values, and the plurality of clipping parameter values includes the same number of values for both when the first sample value is a Luma sample value and when the first sample value is a Chroma sample value. Suitably, the plurality of clipping parameter values includes four (allowable/available/possible) values. Suitably, the plurality of clipping parameter values includes the same number of (allowable/available/possible) values for two or more of the one or more image portions of the image. Suitably, the plurality of clipping parameter values includes four (allowable/available/possible) values for two or more of the one or more image portions of the image. Suitably, the plurality of clipping parameter values includes the same number of (allowable/available/possible) values for all the image portions of the image, or all the image portions of a sequence of images. Suitably, the plurality of clipping parameter values includes four (allowable/available/possible) values for all the image portions of the image, or all the image portions of a sequence of images.

Statement 6. The method of any preceding Statement, wherein the number of signalled one or more filter variable(s) is less than the number of the one or more variable(s) based on the one or more of the neighbouring sample value(s). Suitably, the number of signalled one or more filter variable(s) is half the number of the one or more variable(s) based on the one or more of the neighbouring sample value(s).

Statement 7. The method of any preceding Statement, wherein the one or more variables based on one or more of the neighbouring sample value(s) comprise(s) difference(s) between the first sample value and each of the one or more neighbouring sample value(s).

Statement 8. The method of any preceding Statement, wherein an output of the nonlinear function is used as an input parameter for the Adaptive Loop Filter. Suitably, outputs from two or more nonlinear functions (or clipping functions) are used as input parameters for the Adaptive Loop Filter.

Statement 9. The method of Statement 8, wherein: the Adaptive Loop Filter uses one or more filter coefficient(s); and a filter coefficient and its associated filter variable are determinable using an index for a neighbouring sample value.

Statement 10. The method of Statement 9, wherein the index for a neighbouring sample value is associated with its position in a scan order, and said association is derivable using a transpose index. Suitably, said derived association corresponds to one of four possible arrangements in FIG. 4-b: {0, 1, 2, 3, 4, 5, 6, 7, 8, 9, 10, 11} of 409; {9, 4, 10, 8, 1, 5, 11, 7, 3, 0, 2, 6} of 410; {0, 3, 2, 1, 8, 7, 6, 5, 4, 9, 10, 11} of 411; or {9, 8, 10, 4, 3, 7, 11, 5, 1, 0, 2, 6} of 412.

Statement 11. The method of any preceding Statement, wherein the nonlinear function comprises one or more clipping function(s), and each of the one or more clipping function(s) returns one of: max(−b, min(b,d)), min(b, max(−b,d)), max(c−b, min(c+b,n)), min(c+b, max(c−b,n)), max(−b, min(b,d1+d2)), min(b, max(−b,d1+d2)), max(2*c−b, min(2*c+b,n1+n2)), or min(2*c+b, max(2*c−b,n1+n2)) wherein c is the first sample value, n or n1 or n2 is a neighbouring sample value, d=n−c, d1=n1−c, d2=n2−c, and b is a clipping parameter.

Statement 12. A method of processing one or more portions of an image, an image portion having associated therewith chroma samples and luma samples, wherein the method comprises determining, based on information obtained from a bitstream or a first sample value and its one or more neighbouring sample value(s) of the image portion, at least one of: whether to use or not use a filter controlled using the method of any preceding Statement; enabling or disabling use of said filter; or a filtering parameter, a filter coefficient or a filter variable for use with said filter when filtering the first sample value.

Statement 13. The method of Statement 12, wherein the information obtained from the bitstream comprises a flag provided for one of luma or chroma component, the flag indicating for that component at least one of: whether to use or not use the filter controlled using the method of any one of Statements 1 to 10; or enabling or disabling use of said filter. Statement 14. The method of Statement 12 or 13, wherein the information obtained from the bitstream comprises a flag provided for the one or more image portions, the flag indicating for one or more image portions at least one of: whether to use or not use the filter controlled using the method of any one of Statements 1 to 10; or enabling or disabling use of said filter.

Statement 15. A method of encoding one or more image(s), the method comprising, for one or more portions of an image, controlling a filter according to the method of any one of Statements 1 to 10, or processing according to the method of any one of Statements 12 to 14.

Statement 16. The method of Statement 15 further comprising: receiving an image; encoding the received image and generating a bitstream; and processing the encoded image, wherein the processing comprises the controlling according to the method of any one of Statements 1 to 11, or the processing according to the method of any one of Statements 12 to 14.

Statement 17. The method of Statement 15 when dependent on any one of Statements 12 to 14, further comprising providing said information in the bitstream.

Statement 18. The method of Statement 17 when dependent on Statement 11, wherein: the variables of the nonlinear function further comprise one or more filter coefficient(s) which are dependent on an index/indices of the one or more neighbouring sample value(s); and providing said information comprises providing, in the bitstream, an index/indices for determining one or more clipping parameter(s) and one or more transpose index/indices for deriving an association between an index of a neighbouring sample value and its position in a scan order. Suitably, the derived association corresponds to one of four possible arrangements in FIG. 4-b: {0, 1, 2, 3, 4, 5, 6, 7, 8, 9, 10, 11} of 409; {9, 4, 10, 8, 1, 5, 11, 7, 3, 0, 2, 6} of 410; {0, 3, 2, 1, 8, 7, 6, 5, 4, 9, 10, 11} of 411; or {9, 8, 10, 4, 3, 7, 11, 5, 1, 0, 2, 6} of 412.

Statement 19. The method of any one of Statements 16 to 18 further comprising: selecting the nonlinear function or the one or more clipping function(s) from a plurality of available functions; using the selected function when processing the encoded image; and providing, in the bitstream, information for identifying the selected function.

Statement 20. A method of decoding one or more image(s), the method comprising, for one or more portions of an image, controlling a filter according to the method of any one of Statements 1 to 11, or processing according to the method of any one of Statements 12 to 14.

Statement 21. The method of Statement 20 further comprising: receiving a bitstream; decoding information from the received bitstream to obtain an image; and processing the obtained image, wherein the processing comprises the controlling according to the method of any one of Statements 1 to 11, or the processing according to the method of any one of Statements 12 to 14.

Statement 22. The method of Statement 21 when dependent on any one of Statement 12 to 14, further comprising obtaining said information from the bitstream.

Statement 23. The method of Statement 21 when dependent on Statement 11, wherein: the variables of the nonlinear function further comprise one or more filter coefficient(s) which are dependent on an index/indices of the one or more neighbouring sample value(s); and the method further comprises obtaining, from the bitstream, an index/indices for determining one or more clipping parameter(s) and one or more transpose index/indices for deriving an association between an index of a neighbouring sample value and its position in a scan order. Suitably, the derived association corresponds to one of four possible arrangements in FIG. 4-b: {0, 1, 2, 3, 4, 5, 6, 7, 8, 9, 10, 11} of 409; {9, 4, 10, 8, 1, 5, 11, 7, 3, 0, 2, 6} of 410; {0, 3, 2, 1, 8, 7, 6, 5, 4, 9, 10, 11} of 411; or {9, 8, 10, 4, 3, 7, 11, 5, 1, 0, 2, 6} of 412.

Statement 24. The method of any one of Statements 21 to 23 further comprising: obtaining, from the bitstream, information for identifying the nonlinear function or the one or more clipping function(s) from a plurality of available functions; and using the identified function when processing the obtained image.

Statement 25. A device comprising one or more of: a controller configured to perform the method of any one of Statements 1 to 11, or 12 to 14; an encoder configured to perform the method of any one of Statements 15 to 19; or a decoder configured to perform the method of any one of Statements 20 to 24.

Statement 26. A program which, when run on a computer or processor, causes the computer or processor to carry out the method of any one of Statements 1 to 11, 12 to 14, 15 to 19, or 20 to 24.

Statement 27. A computer-readable storage medium storing a computer program of Statement 26.

Statement 28. A signal carrying an information dataset for an image encoded using the method of any one of Statements 15 to 19 and represented by a bitstream, the image comprising a set of reconstructable samples, each reconstructable sample having a sample value, wherein the information dataset comprises control data for controlling filtering on a first reconstructable sample based on sample values of neighbouring samples of the first reconstructable sample.

The invention claimed is:

1. A method of encoding one or more portions of an image using Adaptive Loop Filtering, the method comprising:
   obtaining data of an image for a bitstream;
   filtering a current sample of an image portion using a nonlinear equation comprising clipping functions each of which has clipping parameters for clipping a difference value between a value of a neighbouring sample of the current sample and a value of the current sample,
   wherein the clipping parameter indicates a value range of the clipping, and the clipping parameter of each of the clipping functions is dependent on a position of the neighbouring sample, and
   wherein, a clipping function among the clipping functions provides a result which corresponds to a result of max(−b, min(b,d)), wherein c is the value of the current sample, n is the value of the neighbouring sample, d=n−c, and b is the clipping parameter.

2. A method of decoding one or more portions of an image using Adaptive Loop Filtering, the method comprising:
   obtaining data of an image from a bitstream;
   filtering a current sample of an image portion using a nonlinear equation comprising clipping functions each of which has a clipping parameter for clipping a difference value between a value of a neighbouring sample of the current sample and a value of the current sample,
   wherein the clipping parameter indicates a value range of the clipping, and the clipping parameter of each of the clipping functions is dependent on a position of the neighbouring sample, and
   wherein a clipping function among the clipping functions provides a result which corresponds to a result of max(−b, min(b,d)), wherein c is the value of the current sample, n is the value of the neighbouring sample, d=n−c, and b is the clipping parameter.

3. A device for encoding one or more portions of an image using Adaptive Loop Filtering, the device comprising:
   an encoder which obtains data of an image for a bitstream;
   a filter which filters a current sample of an image portion using a nonlinear equation comprising clipping functions each of which has a clipping parameter for clipping a difference value between a value of a neighbouring sample of the current sample and a value of the current sample,
   wherein the clipping parameter indicates a value range of the clipping, and the clipping parameter of each of the clipping functions is dependent on a position of the neighbouring sample, and
   wherein, a clipping function among the clipping functions provides a result which corresponds to a result of max(−b, min(b,d)), wherein c is the value of the current sample, n is the value of the neighbouring sample, d=n−c, and b is the clipping parameter.

4. A device for decoding an image, the device comprising:
   a decoder which obtains data of an image from a bitstream;
   a filter which filters a current sample of an image portion using a nonlinear equation comprising clipping functions each of which has a clipping parameter for clipping a difference value between the value of the neighbouring sample of the current sample and a value of the current sample,
   wherein the clipping parameter indicates a value range of the clipping, and the clipping parameter of each of the clipping functions is dependent on a position of the neighbouring sample, and
   wherein a clipping function among the clipping functions provides a result which corresponds to a result of max(−b, min(b,d)), wherein c is the value of the current sample, n is the value of the neighbouring sample, d=n−c, and b is the clipping parameter.

5. A non-transitory computer-readable medium carrying a computer program comprising program instructions adapted to perform, when executed by one or more processors, a method for encoding one or more portions of an image using Adaptive Loop Filtering, the method comprising:
   obtaining data of an image for a bitstream;
   filtering a current sample of an image portion using a nonlinear equation comprising clipping functions each of which has a clipping parameter for clipping a difference value between a value of a neighbouring sample of the current sample and a value of the current sample,
   wherein the clipping parameter indicates a value range of the clipping, and the clipping parameter of each of the clipping functions is dependent on a position of the neighbouring sample, and
   wherein, a clipping function among the clipping functions provides a result which corresponds to a result of max(−b, min(b,d)), wherein c is the value of the current sample, n is the value of the neighbouring sample, d=n−c, and b is the clipping parameter.

6. A non-transitory computer-readable storage medium carrying a computer program comprising program instructions adapted to perform, when executed by one or more processors, a method of decoding one or more portions of an image using Adaptive Loop Filtering, the method comprising:

obtaining data of an image from a bitstream;

filtering a current sample of an image portion using a nonlinear equation comprising clipping functions each of which has a clipping parameter for clipping a difference value between a value of a neighbouring sample of the current sample and a value of the current sample, wherein the clipping parameter indicates a value range of the clipping, and the clipping parameter of each of the clipping functions is dependent on a position of the neighbouring sample, and wherein, a clipping function among the clipping functions provides a result which corresponds to a result of max(−b, min(b,d)), wherein c is the value of the current sample, n is the value of the neighbouring sample, d=n−c, and b is the clipping parameter.

* * * * *